US006615304B1

(12) United States Patent
Ishizuka

(10) Patent No.: US 6,615,304 B1
(45) Date of Patent: Sep. 2, 2003

(54) PROCESSING UNIT IN WHICH ACCESS TO SYSTEM MEMORY IS CONTROLLED

(75) Inventor: Takaharu Ishizuka, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 09/603,880

(22) Filed: Jun. 26, 2000

(30) Foreign Application Priority Data

Nov. 24, 1999 (JP) .......................................... 11-333466

(51) Int. Cl.[7] ................................................ G06F 9/48
(52) U.S. Cl. ...................................... 710/260; 712/244
(58) Field of Search ............................... 710/260, 264, 710/265; 712/40, 214, 218, 228, 244

(56) References Cited

U.S. PATENT DOCUMENTS 3,984,820 A * 10/1976 Stanley et al. .............. 710/265
4,788,639 A * 11/1988 Tamaru ....................... 710/264
5,083,261 A * 1/1992 Wilkie ......................... 710/265
6,070,221 A * 5/2000 Nakamura .................. 710/264

FOREIGN PATENT DOCUMENTS

JP          9-198247 A        7/1997

* cited by examiner

Primary Examiner—Glenn A. Auve
(74) Attorney, Agent, or Firm—Staas & Halsey LLP

(57) ABSTRACT

Has an instruction issuing unit that monitors a change in a memory access sequencing model as well as monitoring a change in an interruption level. When the memory access sequencing model has been changed following a change in the interruption level, the instruction issuing unit restricts the issuing of memory access instructions corresponding to the interruption level after the change until when the execution of all the instructions issued before the change in the interruption level has been finished.

8 Claims, 30 Drawing Sheets

FIG.5A
CHANGE IN THE INTERRUPTION LEVEL (1 → 2)

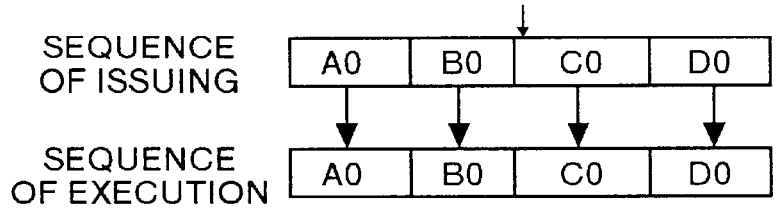

( IN THE CASE OF THE MEMORY MODEL
= 0 → 0 ; WITHOUT A SYNCHRONIZATION CONTROL )

FIG.5B
CHANGE IN THE INTERRUPTION LEVEL (2 → 3)

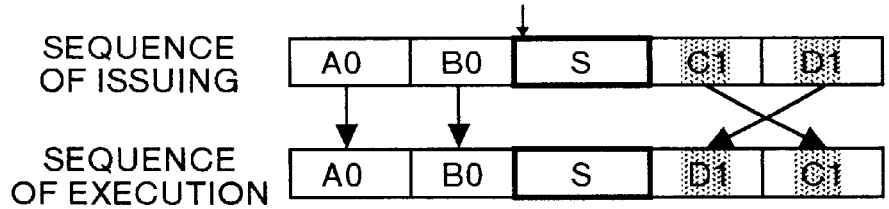

( IN THE CASE OF THE MEMORY MODEL
= 0 → 1 ; WITH A SYNCHRONIZATION CONTROL )

FIG.5C
CHANGE IN THE INTERRUPTION LEVEL (3 → 2)

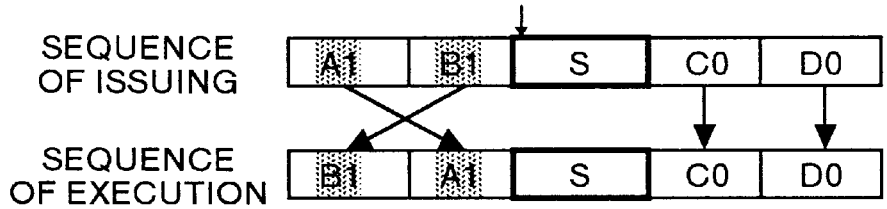

( IN THE CASE OF THE MEMORY MODEL
= 1 → 0 ; WITH A SYNCHRONIZATION CONTROL )

FIG.5D
CHANGE IN THE INTERRUPTION LEVEL (3 → 4)

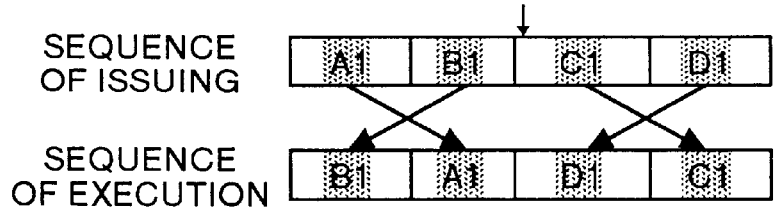

( IN THE CASE OF THE MEMORY MODEL
= 1 → 1 ; WITHOUT A SYNCHRONIZATION CONTROL )

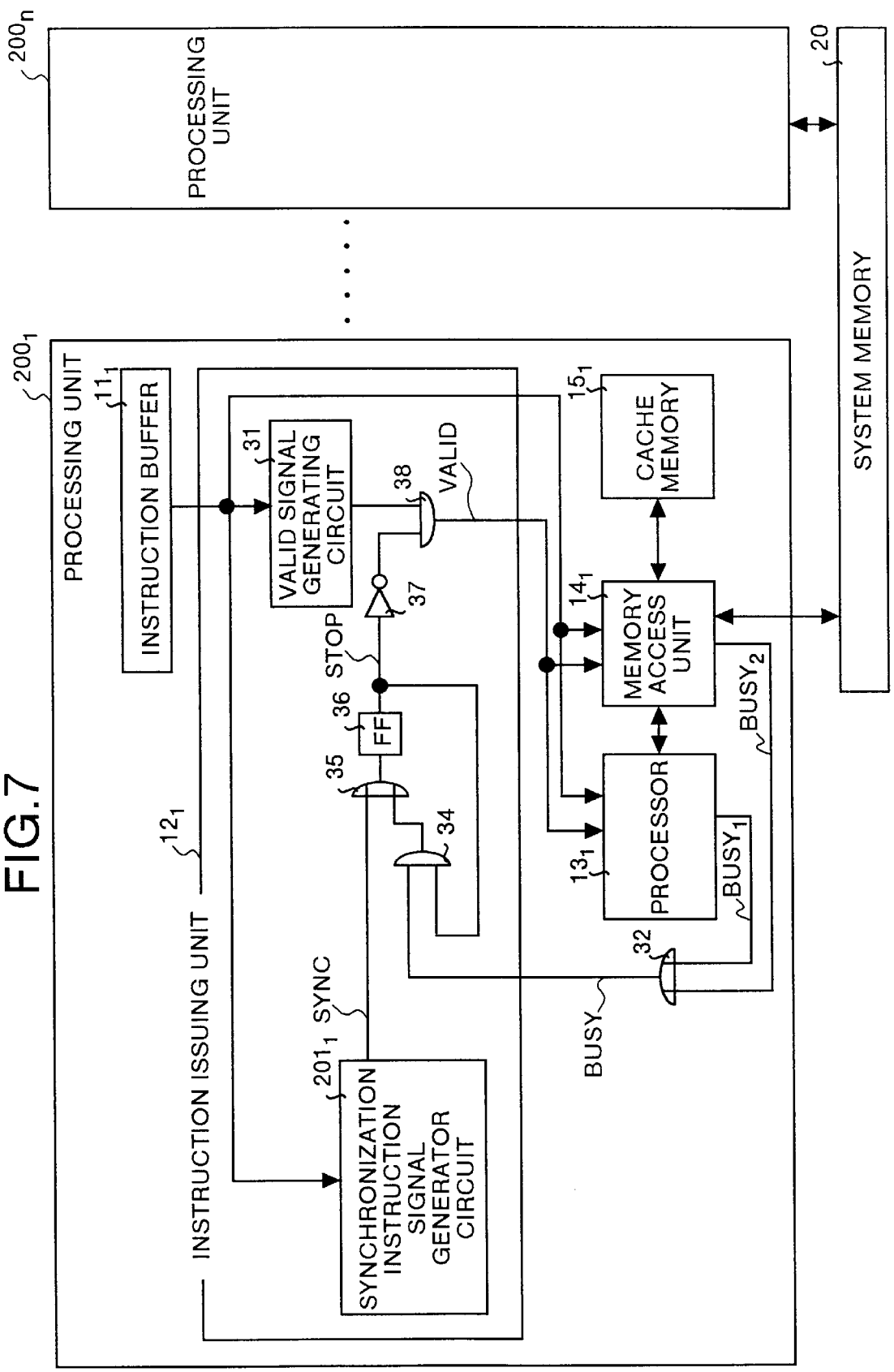

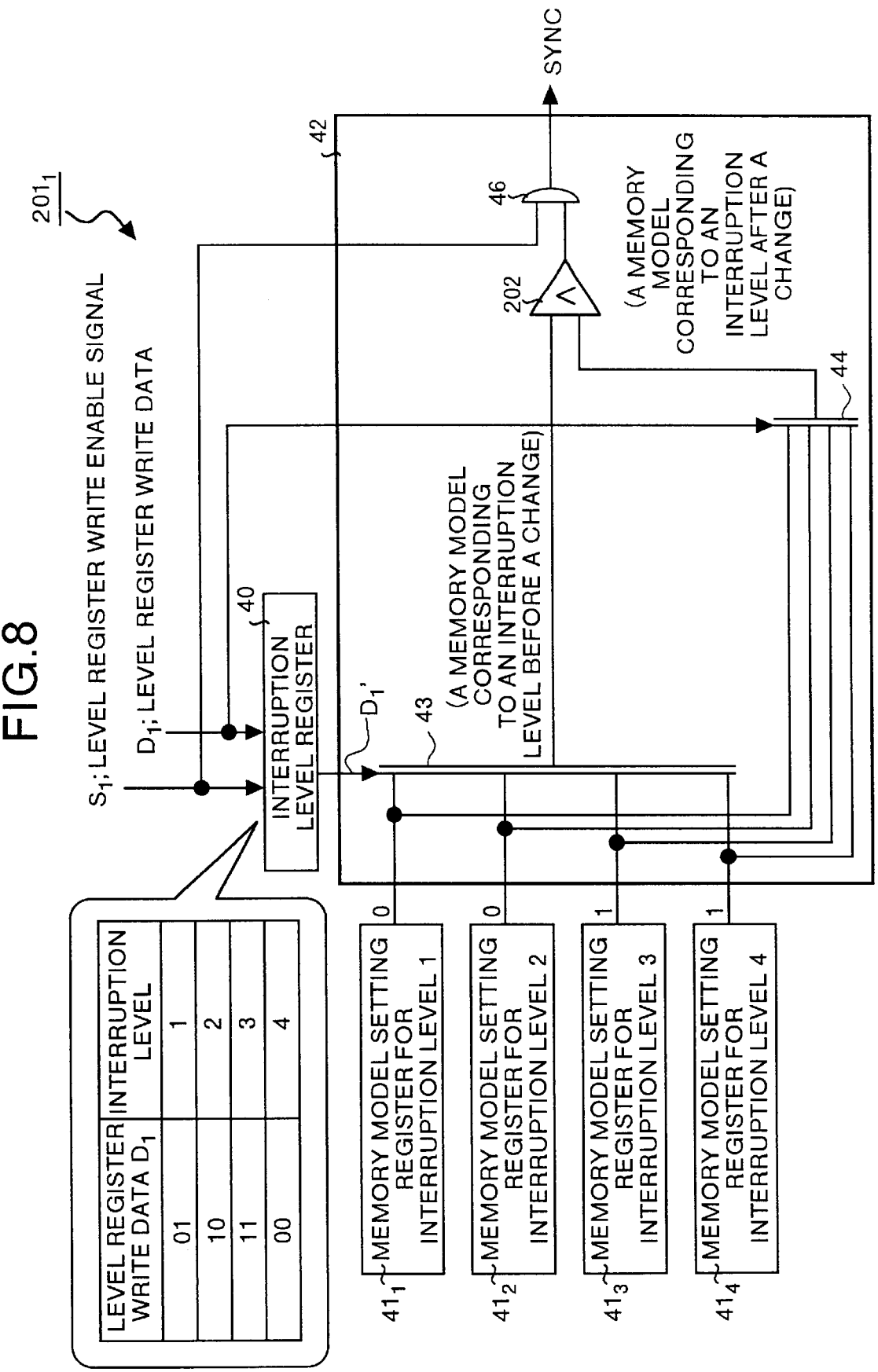

FIG.9A
CHANGE IN THE INTERRUPTION LEVEL (1 → 2)

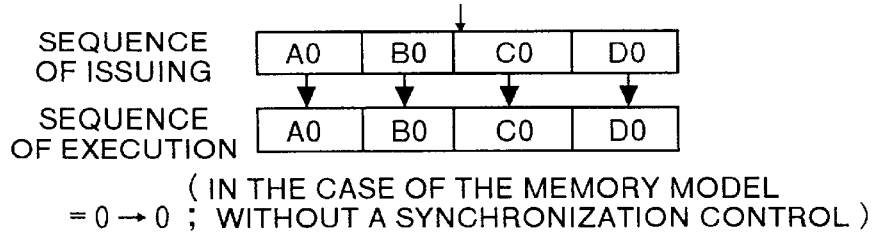

( IN THE CASE OF THE MEMORY MODEL
= 0 → 0 ; WITHOUT A SYNCHRONIZATION CONTROL )

FIG.9B
CHANGE IN THE INTERRUPTION LEVEL (2 → 3)

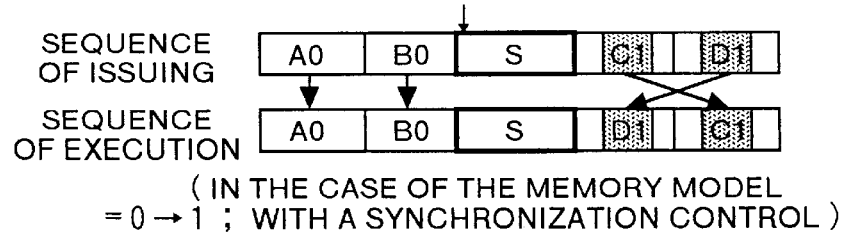

( IN THE CASE OF THE MEMORY MODEL
= 0 → 1 ; WITH A SYNCHRONIZATION CONTROL )

FIG.9C
CHANGE IN THE INTERRUPTION LEVEL (3 → 2)

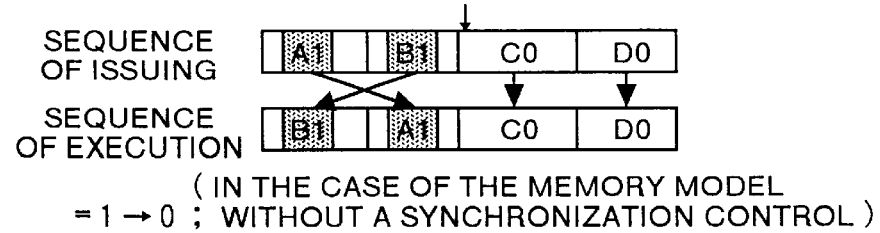

( IN THE CASE OF THE MEMORY MODEL
= 1 → 0 ; WITHOUT A SYNCHRONIZATION CONTROL )

FIG.9D
CHANGE IN THE INTERRUPTION LEVEL (3 → 4)

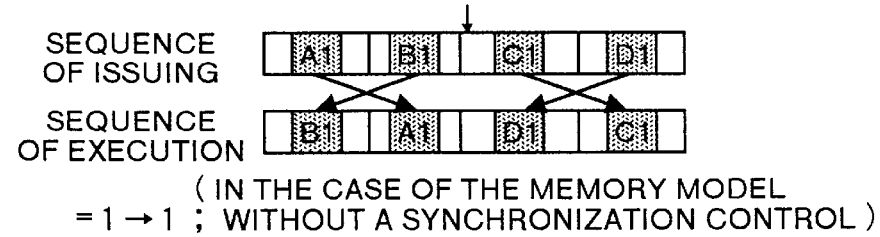

( IN THE CASE OF THE MEMORY MODEL
= 1 → 1 ; WITHOUT A SYNCHRONIZATION CONTROL )

FIG.9E
CHANGE IN THE INTERRUPTION LEVEL (2 → 3)

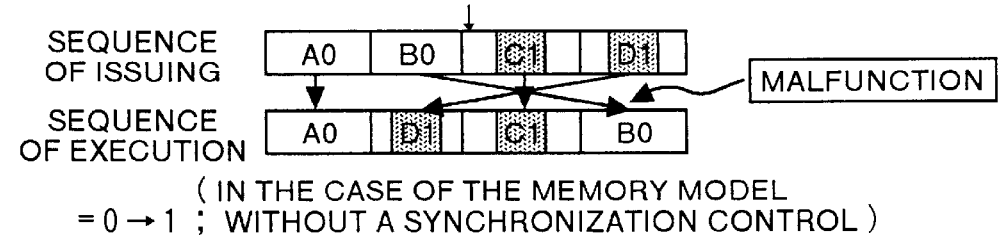

( IN THE CASE OF THE MEMORY MODEL
= 0 → 1 ; WITHOUT A SYNCHRONIZATION CONTROL )

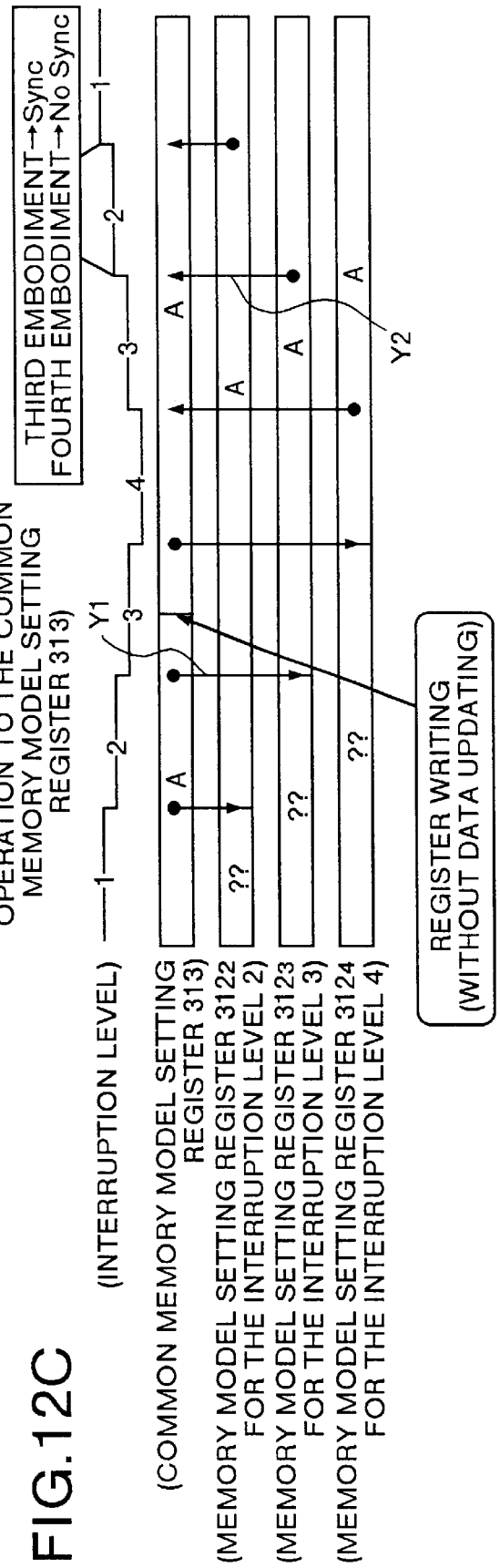

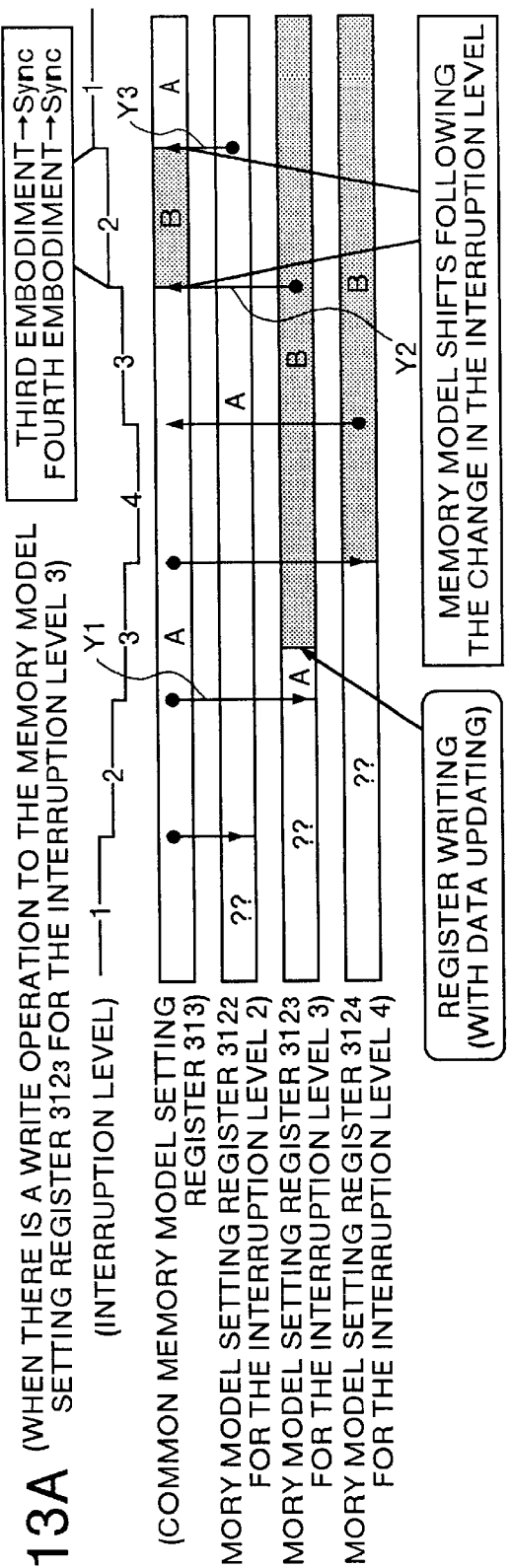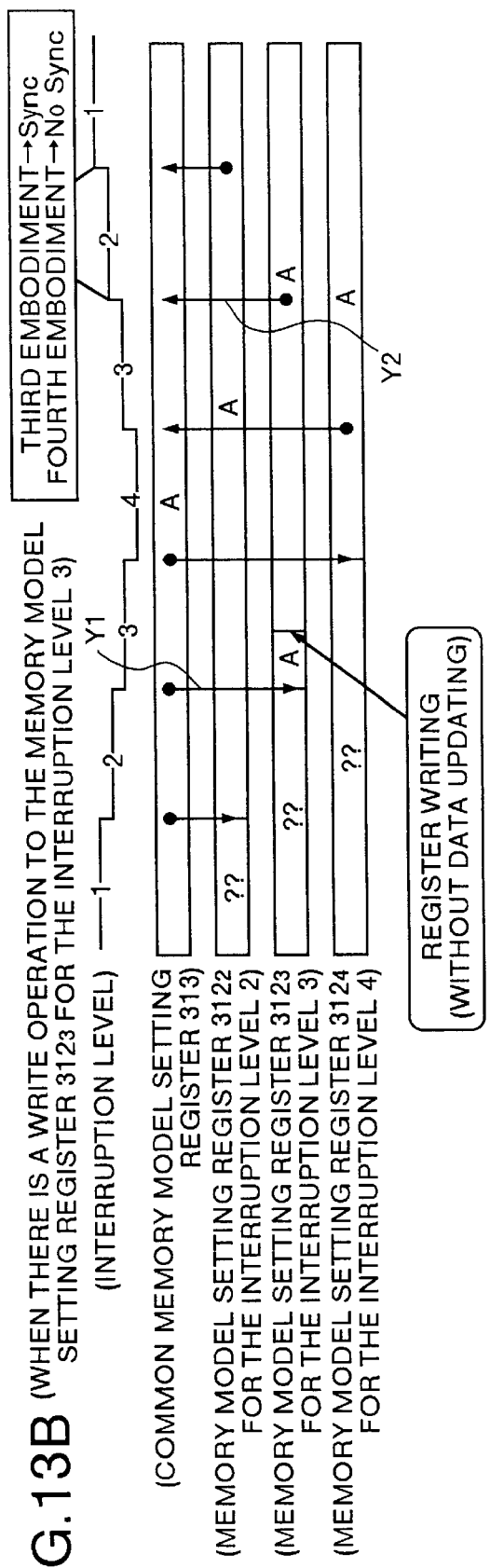

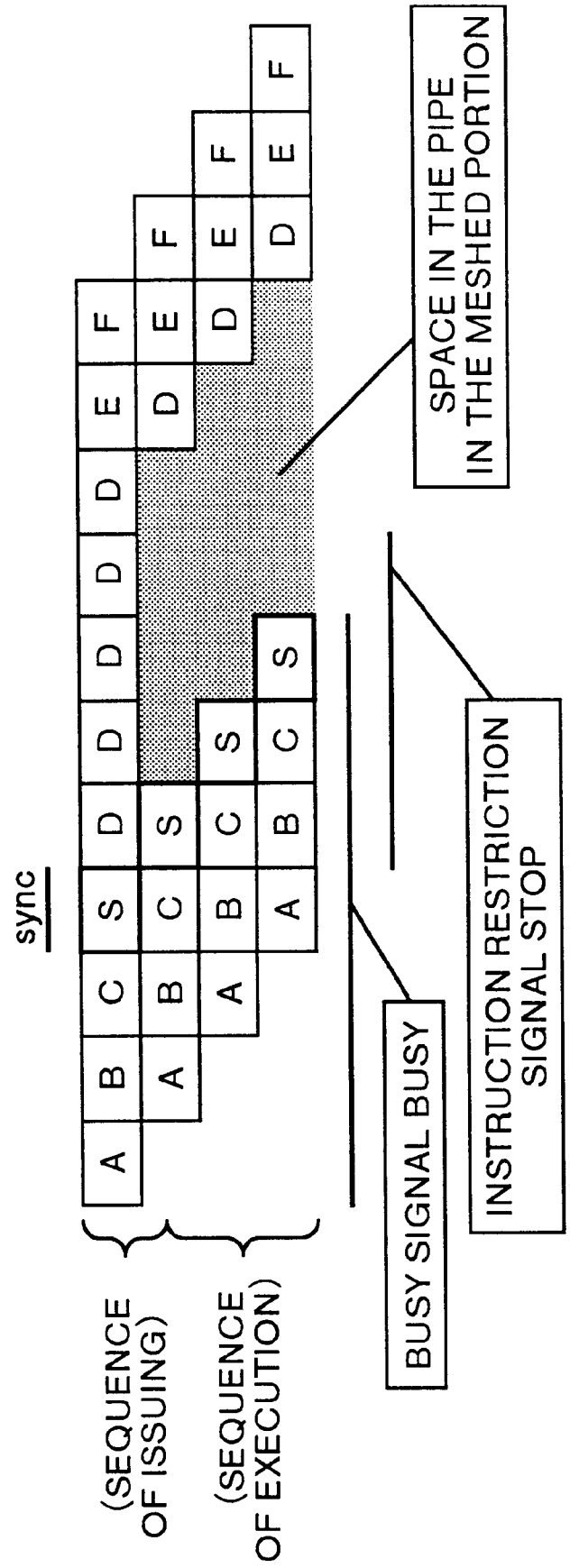

FIG.26

| MEMORY MODEL | DEFINITION |
|---|---|
| 0 | THE SEQUENCE OF ISSUING THE LOAD/STORE INSTRUCTION IS THE SAME AS THE SEQUENCE OF EXECUTING THESE INSTRUCTIONS<br>(BYPASS EXECUTION IS NOT POSSIBLE) |
| 1 | THERE IS NO LIMIT TO THE RELATIONSHIP BETWEEN THE SEQUENCE OF ISSUING THE LOAD/STORE INSTRUCTIONS AND THE SEQUENCE OF EXECUTING THESE INSTRUCTIONS<br>(BYPASS EXECUTION IS POSSIBLE) |

(WHEN THE MEMORY MODEL=0)

(WHEN THE MEMORY MODEL=1)

FIG.29

| A SHIFT OF THE MEMORY MODEL FOLLOWING A CHANGE IN THE INTERRUPTION LEVEL | PRESENCE/ABSENCE OF A SYNCHRONIZATION CONTROL (PRESENT:Sync ; ABSENT:No Sync) | | |
|---|---|---|---|
| | CONVENTIONAL | FIRST EMBODIMENT | SECOND EMBODIMENT |
| 0 → 0 | Sync | No Sync | No Sync |
| 0 → 1 | Sync | Sync | Sync |
| 1 → 0 | Sync | Sync | No Sync |
| 1 → 1 | Sync | No Sync | No Sync |

PROCESSING UNIT IN WHICH ACCESS TO SYSTEM MEMORY IS CONTROLLED

FIELD OF THE INVENTION

The present invention relates to a processing unit equipped with a function of controlling an access (load/store) to a system memory. Particularly, the invention relates to a processing unit capable of improving its processing capacity by reducing the number of synchronization control required at the time of changing over interruption levels (running level).

BACKGROUND OF THE INVENTION

In recent years, along with rapid development of computer technologies, there has been progressed an accelerated increase in the capacity of software to be executed and the capacity of a memory to higher levels. Accordingly, in order to meet this trend of increase in capacities, processing units to be mounted on computers are also required to have higher performance capacities that can execute processing at higher speed.

FIG. 24 is a block diagram that shows a structure of a conventional processing unit. FIG. 24 shows a structure that one system memory 7 is shared by n processing units $1_1$ to $1_n$. Each of the processing units $1_1$ to $1_n$ makes access to the system memory 7 (or a cache memory $6_1$) according to load/store instructions, thereby to execute loading/storing of data. Further, each of the processing units $1_1$ to $1_n$ executes various kinds of processing based on processing instructions such as an addition instruction and a subtraction instruction.

In the processing unit $1_1$, an instruction buffer $2_1$ buffers the processing instructions and load/store instructions in the sequence of issuance of the instructions. An instruction issuing unit $3_1$ issues the processing instruction or the load/store instruction buffered in the instruction buffer $2_1$ to a processor $4_1$ or to a memory access unit $5_1$. The processor $4_1$ executes various kinds of processing according to the processing instruction issued from the instruction issuing unit $3_1$. The processor $4_1$ also outputs a busy signal $BUSY_1$ that shows that the processor $4_1$ is currently executing a processing, to the instruction issuing unit $3_1$. After the processor $4_1$ has finished the processing, the processor $4_1$ stops outputting the busy signal $BUSY_1$.

The memory access unit $5_1$ stores data into the system memory 7 (or the cache memory $6_1$) or loads data from the system memory 7 (or the cache memory $6_1$), according to the load/store instruction issued from the instruction issuing unit $3_1$. The memory access unit $5_1$ also outputs a busy signal $BUSY_1$ that shows that the memory access unit $5_1$ is currently executing a load/store of data, to the instruction issuing unit $3_1$. After the memory access unit $5_1$ has finished the load/processing, the memory access unit $5_1$ stops outputting the busy signal $BUSY_1$.

The processing unit $1_n$ has a structure and functions that are the same as the structure and the functions of the processing unit $1_1$. In other words, the processing unit $1_n$ consists of an instruction buffer $2_n$, an instruction issuing unit $3_n$, a processor $4_n$, a memory access unit $5_n$, and a cache memory $6_n$.

An interruption level in the processing units $1_1$ to $1_n$ will be explained next with reference to FIG. 25A to FIG. 25C. When there has been a request for an interruption processing during a period while one of the processing units $1_1$ to $1_n$ is executing a processing (an arithmetic processing, or a load/store processing), the interruption level is a phase of the processing for executing this interruption processing by suspending the processing of the processing unit. As an example, FIG. 25A shows four stages of interruption levels from an interruption level 1 to an interruption level 4.

According to the example shown in FIG. 25A, the interruption level 1 is a level that shows a state that there is no request for an interruption. When an interruption has occurred during the execution of a processing at the interruption level 1, the interruption level 1 is changed to the interruption level 2 as shown in FIG. 25B. For example, when an interruption has occurred at time $t_1$ during the execution of a processing at the interruption level 1, the interruption level 1 is changed to the interruption level 2. Thus, the processing at the interruption level 1 shifts to the interruption processing at the interruption level 2 so that the interruption processing at the interruption level 2 is executed at and after the time $t_1$. When the interruption processing has been finished at the time $t_2$, the interruption level returns to the interruption level 1 from the interruption level 2. In this way, the interruption processing at the interruption level 2 finishes, and the processing returns to the interruption level 1.

When there has occurred a further interruption during the execution of an interruption processing at the interruption level 2, the interruption level 2 shifts to the interruption level 3 as shown in FIG. 25A. Similarly, when a further interruption has occurred during the execution of an interruption processing at the interruption level 3, the interruption level 3 shifts to the interruption level 4. On the other hand, when the interruption processing at the interruption level 4 has been finished, the interruption level returns from the interruption level 4 to the interruption level 3. When the interruption processing at the interruption level 3 has been finished, the interruption level returns from the interruption level 3 to the interruption level 2. Similarly, when the interruption processing at the interruption level 2 has been finished, the interruption level returns from the interruption level 2 to the interruption level 1.

According to the conventional processing unit, in order to improve the processing capacity, there has been introduced a concept called a memory access sequencing model (hereinafter to be referred to as a memory model) that prescribes a relationship between the sequence of issuing load/store instructions and the sequence of actually executing the load/store instructions. For example, there exist two kinds of memory models (0, 1) as shown in FIG. 26.

In the memory model 0 shown in FIG. 26, the sequence of issuing load/store instructions is the same as the execution sequence of the issued load/store instructions. Thus, this is a most severe control model. Therefore, in the memory model 0, it is not possible to bypass the execution, that is, it is not possible to replace the issued sequence of the load/store instructions at the execution stage. More specifically, in the case of the memory model=0, when the load/store instructions have been issued in the sequence of the load/store instructions A0, B0, C0 and D0, these load/store instructions A0, B0, C0 and D0 are executed in the same sequence as the issued sequence, as shown in FIG. 27A.

On the other hand, the memory model 1 shown in FIG. 26 is a model that has no limit between the sequence of issuing load/store instructions and the sequence of executing the issued load/store instructions. Therefore, in the memory model 1, it is possible to bypass the execution, that is, it is possible to replace the issued sequence of the load/store instructions at the execution stage. More specifically, in the case of the memory model =1, when the load/store instructions have been issued in the sequence of the load/store instructions A1, B1, C1 and D1, it is possible to execute these load/store instructions by replacing the sequence of the load/store instruction B1 with the load/store instruction C1, as shown in FIG. 27B.

The replacement of the execution (bypass execution) is effective when the execution of the later-issued load/store instruction C1 earlier than the execution of the earlier-issued load/store instruction B1 can improve the processing speed. In other words, in the case of the memory model 1, the load/store instructions are executed sequentially in the order of the instructions that can be executed, regardless of the issued sequence. Therefore, it is possible to reduce the time of waiting for the execution of the instructions, which can improve the total processing speed.

On the other hand, in the memory model=0 (refer to FIG. 27A), it is not possible to replace (bypass) the order of executing the load/store instructions. More specifically, as shown in FIG. 27A, even if it is possible to improve the processing speed when the load/store instruction C0 issued later is executed prior to the execution of the earlier-issued load/store instruction B0, it is not possible to replace the order of executing the load/store instruction B0 with the order of executing the load/store instruction C0. Therefore, in the case of the memory model 0, there is a tendency that the time of waiting for the execution of the load/store instructions becomes long, which lowers the total processing speed.

Further, in the conventional processing unit, the above memory models are set according to the interruption levels shown in FIG. 25A. For example, in the case of the interruption level 1, the memory model 0 (refer to FIG. 26) is set. When the interruption level 1 has been changed to the interruption level 2, the memory model 0 shifts to the memory model 1. However, as described later, there is a case where the memory model does not shift even if the interruption level has been changed.

The operation of the conventional processing unit will be explained next with reference to a flowchart shown in FIG. 28. In this case, it is assumed that the processing unit $1_1$ shown in FIG. 24 is executing the interruption processing at the interruption level 2 shown in FIG. 25B. In this operation state, at step SA1 in FIG. 28, the instruction issuing unit $3_1$ makes a decision as to whether a synchronization instruction has been issued or not.

When an interruption level has been changed, this synchronization instruction is issued to restrict the issuing of the instructions buffered to the instruction buffer $2_1$ after this change until when the execution of all the instructions buffered in the instruction buffer $2_1$ before the change has been finished. In other words, this synchronization instruction is an instruction to complete the execution of all the instructions before the synchronization point, prior to the execution of the instructions after the synchronization point. In short, the synchronization instruction is an instruction to execute a synchronization control between the change in the interruption level and the issuing of the instructions. Accordingly, in the conventional processing unit, the synchronization instruction is issued without exception when the interruption level has been changed.

It is assumed that the interruption level has not been changed, and that the synchronization instruction has not been issued either. The instruction issuing unit $3_1$ then makes a decision of "No" at the step SA1, and then proceeds to step SA3. At the step SA3, the instruction issuing unit $3_1$ issues to the memory access unit $5_1$ load/store instructions A, B and C for the interruption level 2 buffered in the instruction buffer $2_1$. The instruction issuing unit $3_1$ then returns to the step SA1.

Based on this operation, the memory access unit $5_1$ sequentially executes by pipeline processing the load/store instructions A, B and C in one clock cycle, as shown in FIG. 25C. In this case, the memory access unit $5_1$ outputs the busy signal $BUSY_1$ to the instruction issuing unit $3_1$.

When the interruption level 2 has been changed to the interruption level 1 at the time $t_2$ shown in FIG. 25B, a synchronization signal S (refer to FIG. 25C) is output. Then, the instruction issuing unit $3_1$ makes a decision of "Yes" at the step SA1, and then proceeds to step SA2. At the step SA2, the instruction issuing unit $3_1$ makes a decision as to whether there has been input the busy signal $BUSY_1$ or not.

In this case, the pipeline processing relating to the load/store instructions A, B and C is being executed, and the busy signal $BUSY_1$ is being input, as shown in FIG. 25C. Therefore, the instruction issuing unit $3_1$ makes a decision of "No" at the step SA2, and repeats a similar process of making a decision. In other words, during the period while the synchronization signal S is being issued and the busy signal $BUSY_1$ is being input, there arises a space in the pipe (refer to a meshed portion), as shown in FIG. 25C. This generates a loss.

When the pipeline processing relating to the load/store instructions A, B and C shown in FIG. 25C has been finished, the input of the busy signal $BUSY_1$ is stopped. Therefore, the instruction issuing unit $3_1$ makes a decision of "No" at the step SA2, and proceeds to step SA3.

At the step SA3, the instruction issuing unit $3_1$ issues to the memory access unit $5_1$ load/store instructions D, E and F for the interruption level 1 buffered in the instruction buffer $2_1$, and then returns to the step SA1. Based on this operation, the memory access unit $5_1$ sequentially executes by pipeline processing the load/store instructions D, E and F in one clock cycle, as shown in FIG. 25C.

As explained above, according to the conventional processing unit, when the interruption level has been changed, a synchronization control is carried out regardless of the presence or absence of a change in the memory model. FIG. 29 is a diagram that shows a conventional relationship between the shift of a memory model and the presence or absence of a synchronization control. As can be understood from this drawing, according to the conventional processing unit, a synchronization control is always carried out regardless of the shift (0→0, 0→1, 1→0, and 1→1) of the memory model following the change in the interruption level.

It has been explained in the above that, according to the conventional processing unit, when the interruption level has been changed, a synchronization control is carried out without an exception, as shown in FIG. 25B and FIG. 25C. This synchronization control is effective from the viewpoint of preventing an erroneous operation due to an erroneous replacement of the sequence of executing instructions when a memory model has also been changed along with a change in the interruption level. When there has been no change in the memory model from before a change in the interruption level to after the change in the interruption level, the processing unit operates normally without carrying out the synchronization control.

However, according to the conventional processing unit, when the interruption level has been changed, the processing unit carries out the synchronization control indiscriminately without taking the memory model into consideration.

Accordingly, the synchronization control is carried out unconditionally even if it is not necessary to carry out the synchronization control (that is, when there has been no change in the memory model). In this case, there arises a space in the pipe by the synchronization control, as shown in FIG. 25C, and this generates an unnecessary waiting for the execution of the instructions. Therefore, the conventional processing unit has had a problem that its processing capacity is lowered unnecessarily.

SUMMARY OF THE INVENTION

It is an object of this invention to provide a processing unit which can improve its processing capacity.

In order to achieve the above object, according to a first aspect of the present invention, there is provided a processing unit that can execute memory access instructions at a plurality of stages of interruption levels and that carries out a memory access according to a memory access sequencing model that prescribes a limit to the sequence of issuing the memory access instructions and the sequence of executing the memory access instructions, the processing unit comprising: an interruption level monitoring unit (corresponding to a synchronization instruction signal generator circuit 30 in a first embodiment to be described later) that monitors a change in the interruption levels; a memory access sequencing model monitoring unit (corresponding to the synchronization instruction signal generator circuit 30 in the first embodiment to be described later) that monitors a change in the memory access sequencing model; and a control unit (corresponding to an instruction issuing unit $12_1$ in the first embodiment to be described later) that restricts the issuing of memory access instructions corresponding to a interruption level after a change until when the execution of memory access instructions issued before the change in the interruption level has been finished, when there has been a change in the memory access sequencing model following the change in the interruption level, based on a result of monitoring by the interruption level monitoring unit and a result of monitoring by the memory access sequencing model monitoring unit.

According to the first aspect, when the memory access sequencing model has been changed following a change in the interruption level, the control unit executes a synchronization control that restricts the issuing of memory access instructions corresponding to the interruption level after the change until when the execution of the memory access instructions issued before the change in the interruption level has been finished. Therefore, even if the interruption level has been changed, the synchronization control is not executed when the memory access sequencing model has not been changed.

As explained above, according to the first aspect, it is monitored whether there has been a change in the memory access sequencing model from before a change in the interruption level to after the change in the interruption level. The synchronization control is carried out only when the memory access sequencing model has been changed. On the other hand, when the memory access sequencing model has not been changed, the synchronization control is not carried out. Therefore, as compared with the conventional processing unit which unconditionally carries out the synchronization control when the interruption level has been changed, the processing unit of the first aspect of the invention can reduce the number of executing the synchronization control. Therefore, it is possible to improve the processing capacity.

According to a second aspect of the invention, there is provided a processing unit of the first aspect, wherein the memory access sequencing model monitoring unit compares the memory access sequencing model before a change in the interruption level with the memory access sequencing model after the change in the interruption level, and when the two memory access sequencing models do not coincide with each other, the memory access sequencing model monitoring unit changes the result of monitoring.

According to the second aspect, when a result of the comparison between the memory access sequencing model before a change in the interruption level and the memory access sequencing model after the change in the interruption level shows that the two memory access sequencing models do not coincide with each other, the memory access sequencing model monitoring unit changes the monitoring result. Accordingly, in this case, the control unit executes the synchronization control to restrict the issuing of memory access instructions corresponding to a interruption level after the change until when the execution of memory access instructions issued before the change in the interruption level has been finished.

As explained above, according to the second aspect, a decision is made as to whether or not there has been a change in the memory model from before a change in the interruption level to after the change in the interruption level. The synchronization control is carried out only when the memory model has been changed. On the other hand, when the memory model has not been changed, the synchronization control is not carried out. Therefore, as compared with the conventional processing unit which unconditionally carries out the synchronization control when the interruption level has been changed, the processing unit of the second aspect of the invention can reduce the number of executing the synchronization control. Therefore, it is possible to improve the processing capacity.

According to a third aspect of the invention, there is provided a processing unit of the first aspect, wherein the control unit (corresponding to an instruction issuing unit $12_1$ in a second embodiment to be described later) restricts the issuing of memory access instructions corresponding to the interruption level after the change until when the execution of the memory access instructions issued before the change in the interruption level has been finished, only when the memory access sequencing model has been changed so that the limit prescribed by the memory access sequencing model is mitigated along with the change in the interruption level, based on a result of monitoring by the interruption level monitoring unit and a result of monitoring by the memory access sequencing model monitoring unit.

According to the third aspect, when the memory access sequencing model has been changed so that the limit prescribed by the memory access sequencing model is mitigated along with the change in the interruption level, the control unit executes the synchronization control to restrict the issuing of memory access instructions corresponding to the interruption level after the change until when the execution of the memory access instructions issued before the change in the interruption level has been finished. Accordingly, the synchronization control is not carried out when the memory access sequencing model has not been changed, or when the limit prescribed by the memory access sequencing model becomes severer even if the memory access sequencing model has been changed.

As explained above, according to the third aspect, it is monitored whether there has been a change in the memory access sequencing model from before a change in the interruption level to after the change in the interruption level. The synchronization control is carried out only when the memory access sequencing model has been changed so that the limit prescribed by the memory access sequencing model is mitigated. Therefore, as compared with the conventional processing unit which unconditionally carries out the synchronization control when the interruption level has been changed, the processing unit of the third aspect of the invention can reduce the number of executing the synchronization control. Therefore, it is possible to substantially improve the processing capacity.

According to a fourth aspect of the invention, there is provided a processing unit of the third aspect, wherein the memory access sequencing model monitoring unit (corresponding to the synchronization instruction signal generator circuit $201_1$ in the second embodiment to be described later) obtains a monitoring result based on a result of a comparison between a limit in the memory access sequencing model before a change in the interruption level and a limit in the memory access sequencing model after the change in the interruption level.

According to the fourth aspect of the invention, the memory access sequencing model monitoring unit obtains a monitoring result based on a result of a comparison between a limit in the memory access sequencing model before a change in the interruption level and a limit in the memory access sequencing model after the change in the interruption level. The control unit executes the synchronization control to restrict the issuing of memory access instructions corresponding to the interruption level after the change until when the execution of memory access instructions issued before the change in the interruption level has been finished, based on this monitoring result. Accordingly, the synchronization control is not carried out when the memory access sequencing model has not been changed, or when the limit prescribed by the memory access sequencing model becomes severer even if the memory access sequencing model has been changed.

As explained above, according to the fourth aspect, it is monitored whether there has been a change in the memory access sequencing model from before a change in the interruption level to after the change in the interruption level. The synchronization control is carried out only when the memory access sequencing model has been changed so that the limit prescribed by the memory access sequencing model is mitigated. Therefore, as compared with the conventional processing unit which unconditionally carries out the synchronization control when the interruption level has been changed, the processing unit of the third aspect of the invention can reduce the number of executing the synchronization control. Therefore, it is possible to substantially improve the processing capacity.

According to a fifth aspect of the invention, there is provided a processing unit comprising: a plurality of interruption level memory units (corresponding to a memory model setting register $312_2$ for the interruption level 2 to a memory model setting register $312_4$ for the interruption level 4 in a third embodiment to be described later) that are provided corresponding to a plurality of stages of interruption levels respectively and that store data of memory access sequencing models at the interruption levels; a common memory unit (corresponding to a common memory model setting register 313 in the third embodiment to be described later) that stores data of the memory access sequencing models; a control unit that, following a change in a interruption level, writes data of the memory access sequencing models stored in the common memory unit into the interruption level memory units corresponding to a interruption level after a change, and writes back into the common memory unit the data of the memory access sequencing models written in the interruption level memory units, when the interruption level returns to the original interruption level; an overwrite monitoring unit (corresponding to a synchronization instruction signal generator 350 in the third embodiment to be described later) that monitors an overwriting of data of the memory access sequencing models into the interruption level memory units and the common memory unit; and a control unit (corresponding to the synchronization instruction signal generator 350 in the third embodiment to be described later) that restricts the issuing of memory access instructions corresponding to a interruption level after a change until when the execution of memory access instructions issued before the change in the interruption level has been finished, when there has been an overwriting of the data of the memory access sequencing models, based on a result of monitoring by the overwrite monitoring unit.

According to the fifth aspect of the invention, when an interruption level has been changed, the data of a memory access sequencing model stored in the common memory unit is written into the interruption level memory unit corresponding to the interruption level after the change in the interruption level. When the interruption level has recovered to the original interruption level, the data of the memory access sequencing model written in the interruption level memory unit is written back, to the common memory unit. Further, during the period from the writing to the writing back, the overwrite monitoring unit monitors the overwriting of the data of the memory access sequencing model into the interruption level memory unit and the common memory unit.

Further, when the data of the memory access sequencing model has been overwritten, the control unit restricts the issuing of memory access instructions corresponding to a interruption level after a change until when the execution of memory access instructions issued before the change in the interruption level has been finished. Accordingly, the synchronization control is not executed when the data has not been overwritten into the interruption level memory unit and the common memory unit even if the interruption level has been changed. In other words, when the memory access sequencing model has not been changed, the synchronization control is not executed.

As explained above, according to the fifth aspect of the invention, the synchronization control is carried out only when the data of the memory access sequencing model has been overwritten into the interruption level memory unit and the common memory unit. Therefore, as compared with the conventional processing unit which unconditionally carries out the synchronization control when the interruption level has been changed, the processing unit of the fifth aspect of the invention can reduce the number of executing the synchronization control. Therefore, it is possible to improve the processing capacity.

According to a sixth aspect of the invention, there is provided a processing unit of the fifth aspect, wherein the control unit (corresponding to a synchronization instruction signal generator 350 in a fourth embodiment to be described later) restricts the issuing of memory access instructions corresponding to a interruption level after a change until when the execution of memory access instructions issued before the change in the interruption level has been finished, by making a decision that there has been an updating of data when the data before the overwriting does not coincide with the data after the overwriting, based on a result of monitoring by the overwrite monitoring unit.

According to the sixth aspect of the invention, when an interruption level has been changed, the data of a memory access sequencing model stored in the common memory unit is written into the interruption level memory unit corresponding to the interruption level after the change in the interruption level. When the interruption level has recovered to the original interruption level, the data of the memory access sequencing model written in the interruption level memory unit is written back to the common memory unit. Further, during the period from the writing to the writing back, the overwrite monitoring unit monitors the overwriting of the data of the memory access sequencing model into the interruption level memory unit and the common memory unit.

Further, when the data of the memory access sequencing model has been overwritten and also when the data has been updated, the control unit restricts the issuing of memory access instructions corresponding to a interruption level after a change until when the execution of memory access instructions issued before the change in the interruption level has been finished. Accordingly, the synchronization control is not executed when the data has not been updated even if the data has been overwritten into the interruption level memory unit and the common memory unit. In other words, when the memory access sequencing model has not been changed, the synchronization control is not executed.

As explained above, according to the sixth aspect of the invention, the synchronization control is carried out only when the data of the memory access sequencing model has been overwritten into the interruption level memory unit and the common memory unit and also when the data has been updated. Therefore, as compared with the conventional processing unit which unconditionally carries out the synchronization control when the interruption level has been changed, the processing unit of the sixth aspect of the invention can reduce the number of executing the synchronization control. Therefore, it is possible to substantially improve the processing capacity.

According to a seventh aspect of the invention, there is provided a processing unit that can at least execute memory access instructions at a plurality of stages of interruption levels and that carries out a memory access according to a memory access sequencing model that prescribes a limit to the sequence of issuing the memory access instructions and the sequence of executing the memory access instructions, the processing unit comprising: an interruption level monitoring unit that monitors a change in the interruption levels; a memory access sequencing model monitoring unit that monitors a change in the memory access sequencing model; and a control unit that executes instructions other than memory access instructions issued after a change in a memory access sequencing model prior to the execution of the memory access instructions, and that restricts the issuing of memory access instructions corresponding to a interruption level after a change until when the execution of memory access instructions issued before the change in the interruption level has been finished, when there has been a change in the memory access sequencing model following the change in the interruption level, based on a result of monitoring by the interruption level monitoring unit and a result of monitoring by the memory access sequencing model monitoring unit.

According to the seventh aspect, when the memory access sequencing model has been changed following a change in the interruption level, the control unit executes instructions other than memory access instructions issued after a change in the memory access sequencing model prior to the execution of the memory access instructions, and restricts the issuing of memory access instructions corresponding to the interruption level after the change until when the execution of memory access instructions issued before the change in the interruption level has been finished. Therefore, even if the interruption level has been changed, the synchronization control is not executed when the memory access sequencing model has not been changed.

As explained above, according to the seventh aspect of the invention, the synchronization control is carried out only when the interruption level has been changed and also when the memory access instructions have been issued. Therefore, when instructions other than memory access instructions (for example, processing instructions) have been issued, these instructions are executed prior to the synchronization control. As a result, it is possible to improve the processing capacity.

Other objects and features of this invention will become understood from the following description with reference to the accompanying drawings.

BRIEF DESCRIPTION OF THE DRAWINGS

FIG. 5A to FIG. 5D are diagrams that explain the operation of the first embodiment.

FIG. 7 is a block diagram that shows a structure of a second embodiment relating to the present invention.

FIG. 8 is a diagram that shows a structure of a synchronization instruction signal generator circuit $201_1$ shown in FIG. 7.

FIG. 9A to FIG. 9E are diagrams that explain the operation of the second embodiment.

FIG. 12A to FIG. 12C are diagrams that explain the operation of the third and fourth embodiments respectively.

FIG. 13A and FIG. 13B are diagrams that explain the operation of the third and fourth embodiments respectively.

FIG. 14 is a diagram that explains the operation of the third embodiment.

FIG. 26 is a diagram that shows one example of a memory model in the conventional processing unit.

FIG. 29 is a diagram that shows a relationship between the shift of memory models and presence/absence of a synchronization control.

DESCRIPTION OF THE PREFERRED EMBODIMENTS

A first embodiment to a fifth embodiment of a processing unit relating to the present invention will be explained below with reference to the drawings.

Figure 1:
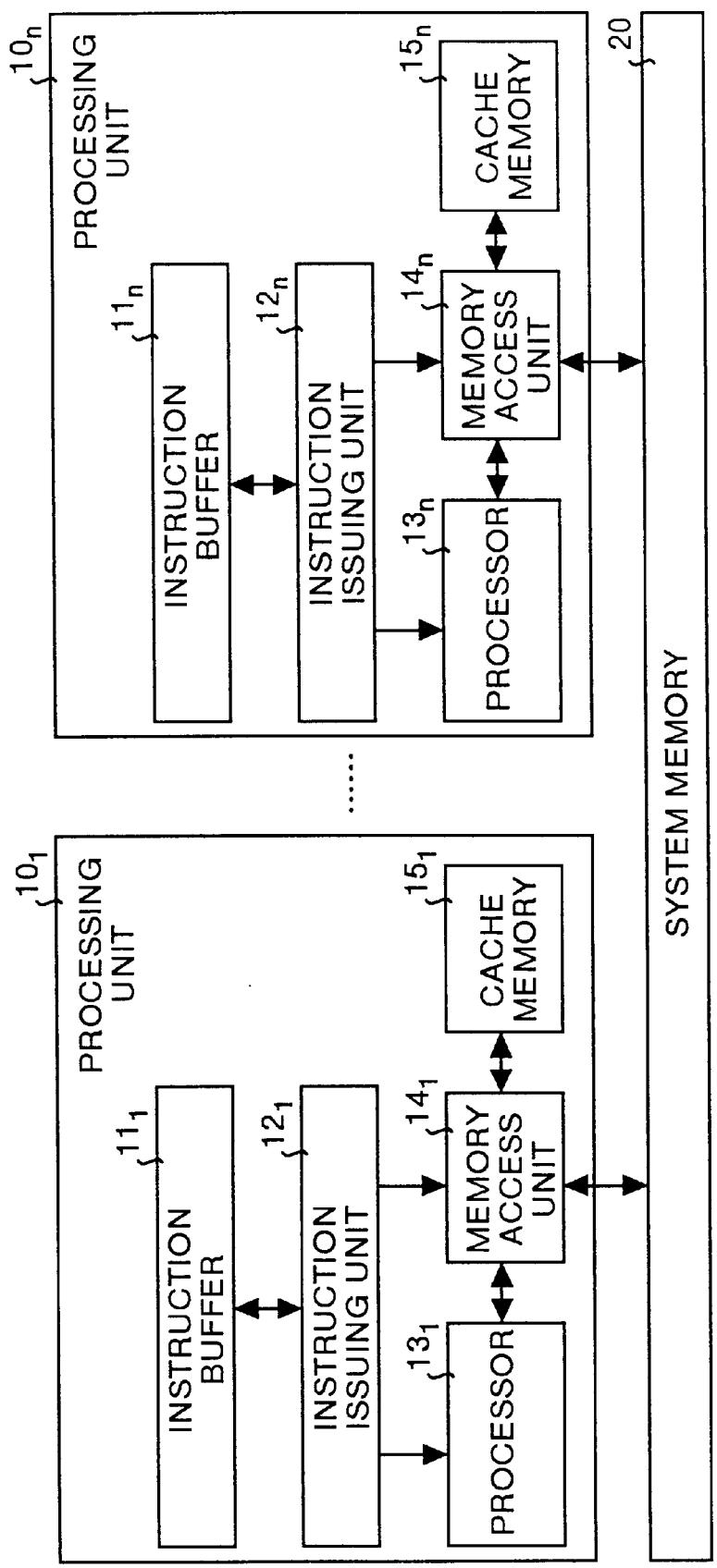
FIG. 1 is a block diagram that shows a structure of a first embodiment relating to the present invention.
Figure 25A:
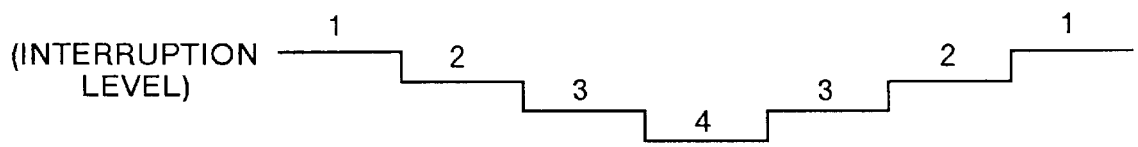
FIG. 25A to FIG. 25C are diagrams that explain interruption levels.
Figure 25B:
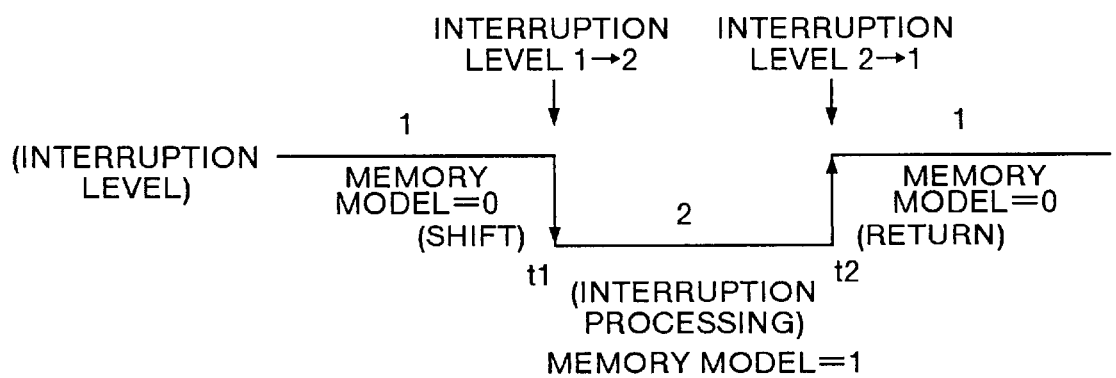
Figure 25C:
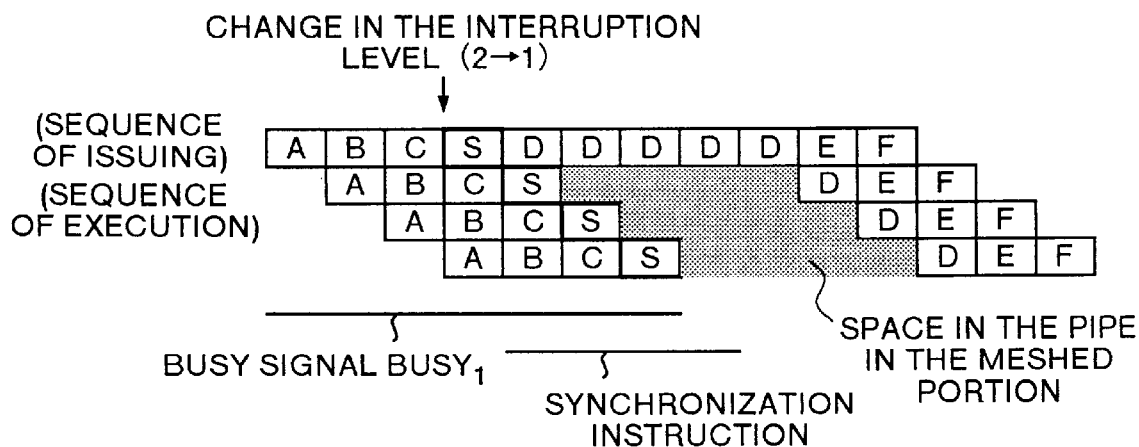
Figure 27A:
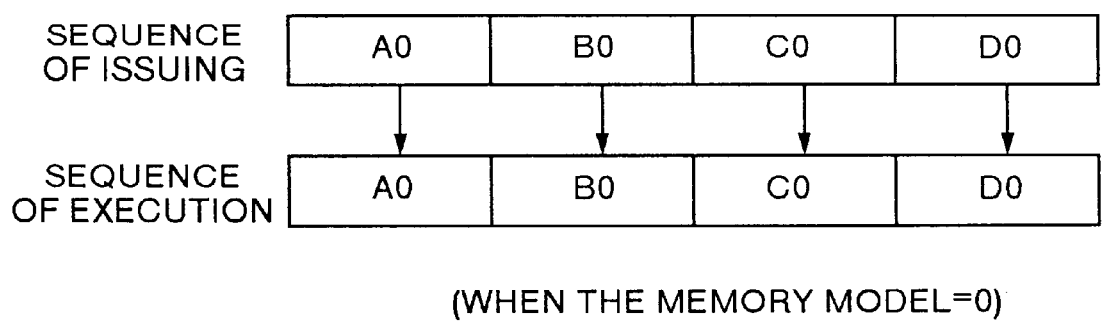
FIG. 27A and FIG. 27B are diagrams that explain the operation of the conventional processing unit.
Figure 27B:
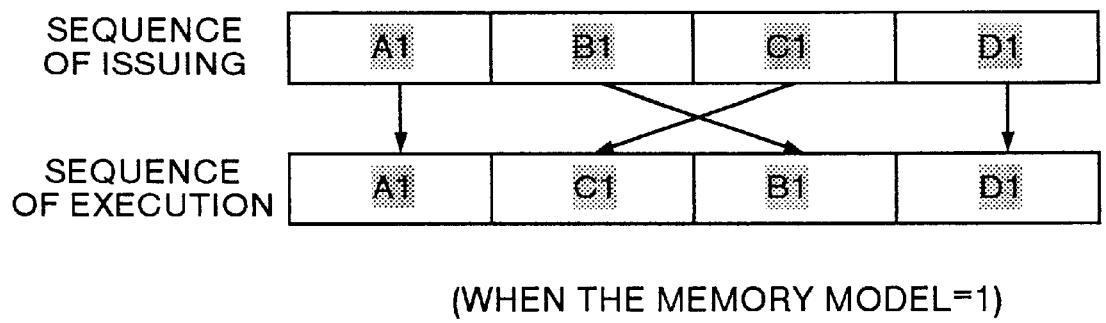
Figure 28:
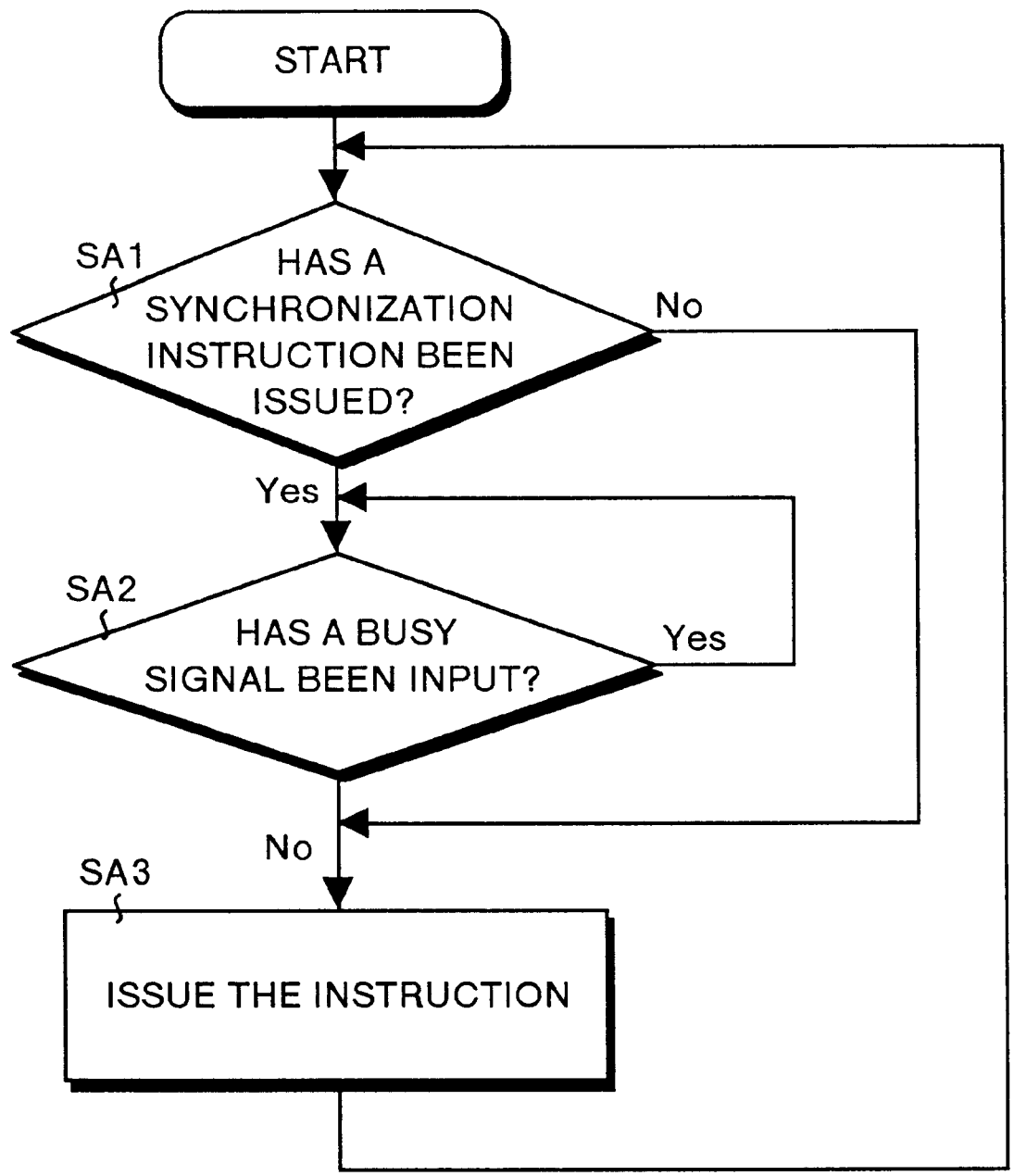
FIG. 28 is a flowchart that explains the operation of the conventional processing unit.

FIG. 1 is a block diagram that shows a structure of a first embodiment relating to the present invention. FIG. 1 shows a structure that one system memory 20 is shared by n processing units $10_1$ to $10_n$. The first embodiment explained below is the case where a synchronization control is not carried out when there has been no change in the memory model among shifts of memory models following a change in the interruption level (refer to FIG. 25A) as shown in FIG. 29.

Each of the processing units $10_1$ to $10_n$ shown in FIG. 1 makes access to the system memory 20 (or a cache memory $15_1$) according to load/store instructions, thereby to execute loading/storing of data. Further, each of the processing units $10_1$ to $10_n$ executes various kinds of processing based on processing instructions such as an addition instruction and a subtraction instruction.

In the processing unit $10_1$, an instruction buffer $11_1$ buffers the processing instructions and load/store instructions in the sequence of issuance of the instructions. An instruction issuing unit $12_1$ issues the processing instruction or the load/store instruction buffered in the instruction buffer $11_1$ to a processor $13_1$ or to a memory access unit $14_1$. The processor $13_1$ executes various kinds of processing according to the processing instruction issued from the instruction issuing unit $12_1$.

The memory access unit $14_1$ stores data into the system memory 20 (or the cache memory $15_1$) or loads data from the system memory 20 (or the cache memory $15_1$), according to the load/store instruction issued from the instruction issuing unit $12_1$.

The processing unit $10_n$ has a structure and functions that are the same as the structure and the functions of the processing unit $10_1$. In other words, the processing unit $10_n$ consists of an instruction buffer $11_n$, an instruction issuing unit $12_n$, a processor $13_n$, a memory access unit $14_n$, and a cache memory $15_n$.

Figure 2:
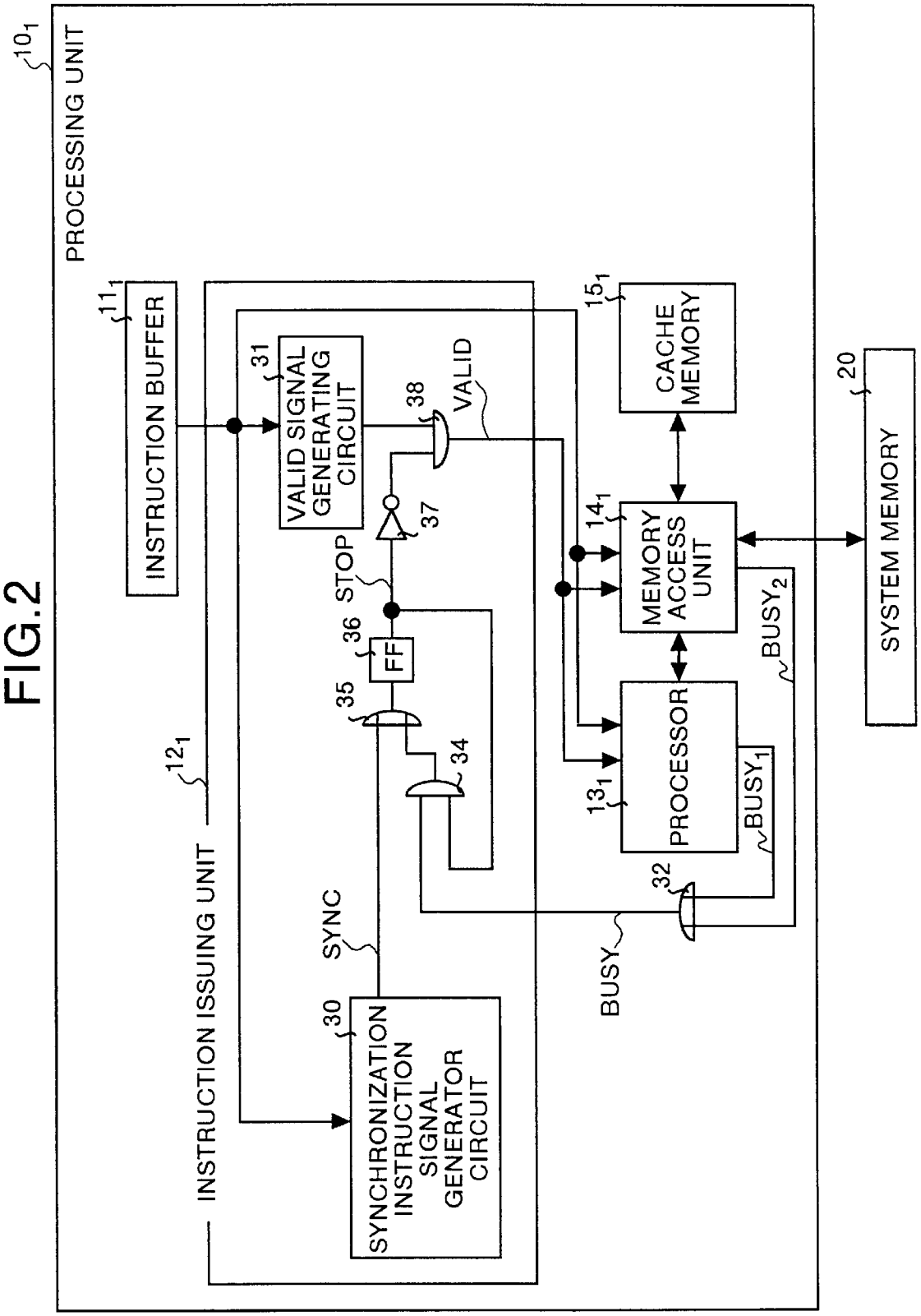
FIG. 2 is a block diagram that shows a structure of a processing unit $10_1$ shown in FIG. 1.

The structure of the processing unit $10_1$ shown in FIG. 1 will be explained in detail with reference to FIG. 2. In FIG. 2, portions corresponding to those in FIG. 1 will be attached with identical reference numbers. In the instruction issuing unit $12_1$ shown in FIG. 2, a synchronization instruction signal generator circuit 30 generates a synchronization instruction signal SYNC for issuing the synchronization instruction. As explained above, when there has been a change in the interruption level, the synchronization instruction signal is generated to restrict the issuing of instructions buffered in the instruction buffer $11_1$ after the change in the interruption level until when the execution of all the instructions buffered in the instruction buffer $11_1$ has been finished.

The synchronization instruction signal SYNC is output based on the following condition. The synchronization instruction signal SYNC is output when the interruption level (refer to FIG. 25A) has been changed and when the memory model has also been changed following the change in the interruption level. On the other hand, the synchronization instruction signal SYNC is not output based on the following condition. The synchronization instruction signal SYNC is not output when the memory model has not been changed even if the interruption level has been changed.

Figure 3:
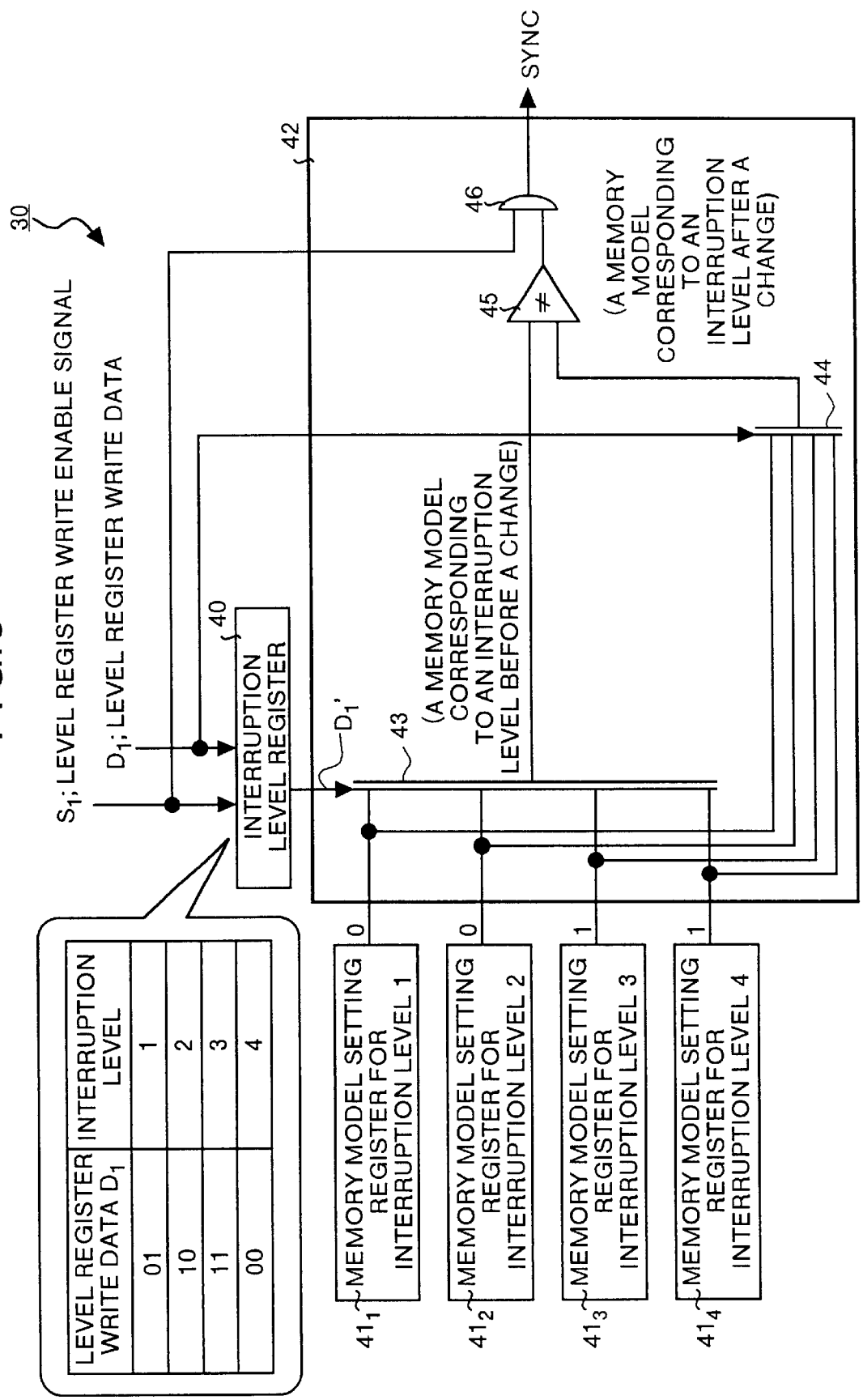
FIG. 3 is a block diagram that shows a structure of a synchronization instruction signal generator circuit 30 shown in FIG. 2.

FIG. 3 is a block diagram that shows a structure of the synchronization instruction signal generator circuit 30 shown in FIG. 2. In this drawing, an interruption level register 40 holds a level register write data $D_1$ (=$D_1$') that shows one of four interruption levels 1 to 4. The level register write data $D_1$ (=$D_1$') is "01", "10", "11" and "00" corresponding to the interruption levels 1, 2, 3 and 4 (refer to FIG. 25A) respectively. In other words, when the level register write data $D_1$ (=$D_1$') of "01" is being held in the interruption level register 40, this shows that the current interruption level is 1.

When the interruption level is changed, the level register write data $D_1$ corresponding to the interruption level after the change as well as a level register write enable signal $S_1$ are input to the interruption level register 40. A memory model setting register $41_1$ for the interruption level 1 to a memory model setting register $41_4$ for the interruption level 4 are provided corresponding to the interruption level 1 to the interruption level 4 (refer to FIG. 25A) respectively. Either a memory model 0 or a memory model 1 (refer to FIG. 26) is set to each of the memory model setting register $41_1$ for the interruption level 1 to the memory model setting register $41_4$ for the interruption level 4.

In the example shown in FIG. 3, the memory model=0 is being set to the memory model setting register $41_1$ for the interruption level 1, and the memory model=0 is being set to the memory model setting register $41_2$ for the interruption level 2. Similarly, the memory model=1 is being se to the memory model setting register $41_3$ for the interruption level 3, and the memory model=1 is being set to the memory model setting register $41_4$ for the interruption level 4.

A synchronization instruction signal generator 42 generates a synchronization instruction signal SYNC according to the above-described conditions, based on the level register write data $D_1$' held in the interruption level register 40 and the data of memory models held in the memory model setting register $41_1$ for the interruption level 1 to the memory model setting register $41_4$ for the interruption level 4 respectively. In this synchronization instruction signal generator 42, a multiplexer 43 selects one of the memory model setting register $41_1$ for the interruption level 1 to the memory model setting register $41_4$ for the interruption level 4, according to the level register write data $D_1'$ from the interruption level register 40.

For example, when the level register write data $D_1'$ shows the interruption level 1, the multiplexer 43 selects the memory model setting register $41_1$ for the interruption level 1 corresponding to the interruption level 1. Based on this operation, the data of the memory model=0 held in the memory model setting register $41_1$ for the interruption level 1 is output from the multiplexer 43. The data of the memory model=0 is the data corresponding to the interruption level before the change.

The multiplexer 44 selects one of the memory model setting register $41_1$ for the interruption level 1 to the memory model setting register $41_4$ for the interruption level 4 according to the level register write data $D_1$ corresponding to the interruption level after the change. For example, when the level register write data $D_1$ shows the interruption level 2, the multiplexer 44 outputs the data of the memory model=0 held in the memory model setting register $41_1$ for the interruption level 2 corresponding to the interruption level 2. The data of the memory model=0 is the data corresponding to the interruption level after the change.

A non-coincidence detector 45 detects a non-coincidence between the data from the multiplexer 43 (a memory model) and the data from the multiplexer 44 (a memory model). In other words, the non-coincidence detector 45 detects whether the memory model has been changed from before a change in the interruption level to after the change in the interruption level. An AND circuit 46 takes an AND of a level register write enable signal $S_1$ and an output signal of the non-coincidence detector 45. When both signals are "1", the AND circuit 46 outputs a synchronization instruction signal SYNC.

As explained above, the synchronization instruction signal SYNC is output when the memory model has been changed from before a change in the interruption level to after the change in the interruption level and also when the level register write enable signal $S_1$ is "1". On the other hand, the synchronization instruction signal SYNC is not generated when the interruption level has not been changed from before a change in the interruption level to after the change in the interruption level.

Referring back to FIG. 2, a valid signal generating circuit 31 is a circuit that generates a valid signal VALID. The valid signal VALID is output to the processor $13_1$ and the memory access unit $14_1$. This signal makes valid the issuance of instructions buffered in the instruction buffer $11_1$. Accordingly, the instructions are being issued only during the period while the valid signal VALID is being output. On the other hand, the instructions are not issued during a period while the valid signal VALID is not being output.

An OR circuit 32 takes an OR of a processor busy signal $BUSY_1$ that shows that the processor $13_1$ is currently executing an instruction and a memory access unit busy signal $BUSY_2$ that shows that the memory access unit $14_1$ is currently executing an instruction. The OR circuit 32 outputs a result of the OR operation as a busy signal BUSY. An AND circuit 34 takes an AND of an output signal of the OR circuit 32 and an output signal of an FF (flip-flop circuit) 36.

An OR circuit 35 takes an OR of a synchronization instruction signal SYNC from the synchronization instruction signal generator circuit 30 and an output signal of the AND circuit 34. The FF 36 holds an output signal of the OR circuit 35. A NOT circuit 37 inverts an instruction restriction signal STOP of the FF 36. An AND circuit 38 takes an AND of a signal from the valid signal generating circuit 31 and an output signal of the NOT circuit 37. An output signal of the NOT circuit 37 is output to the processor $13_1$ and the memory access unit $14_1$ as a valid signal VALID.

The operation of the first embodiment will be explained next with reference to a flowchart shown in FIG. 4 and FIG. 5A to FIG. 5D. The operation of the case where the memory model is not changed (0→0, 1→1) from before a change in the interruption level to after the change in the interruption level (1→2 and 3→4) as shown in FIG. 5A and FIG. 5D and the operation of the case where the memory model is changed (0→1, 1→0) from before a change in the interruption level to after the change in the interruption level (2→3 and 3→2) as shown in FIG. 5B and FIG. 5C will be explained.

In an instruction A0, an instruction B1, and etc. shown in FIG. 5A to FIG. 5D, an alphabet part denotes an instruction itself, and a numeral part denotes a memory model. For example, in the instruction A0, the alphabet A denotes a load instruction, and the numeral 0 denotes the memory model 0. Similarly, in the instruction B1, the alphabet B denotes a store instruction, and the numeral 1 denotes the memory model 1.

It is assumed that the level register write data $D_1'$ of "01" corresponding to the interruption level 1 is being held in the instruction level register 40 shown in FIG. 3. It is also assumed that a valid signal VALID is being output to the processor $13_1$ and the memory access unit $14_1$ from the AND circuit 38 shown in FIG. 2. Further, it is also assumed that the memory model corresponding to the interruption level 1 is the memory model 0 (refer to FIG. 3).

Figure 4:
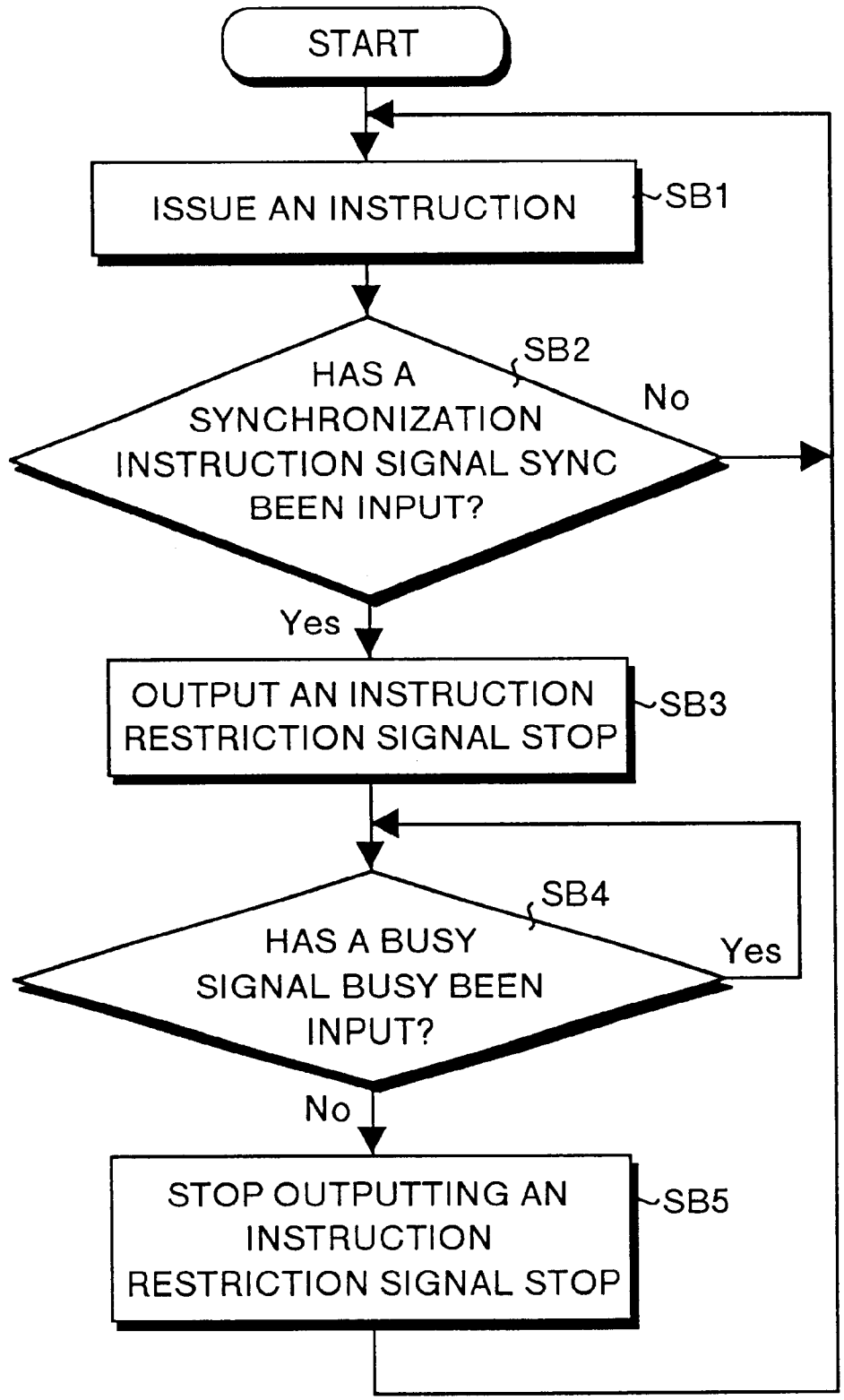
FIG. 4 is a flowchart that explains the operation of the first embodiment.

Based on the above state, at step SB1 shown in FIG. 4, as the "valid signal VALID is being output, the instruction A0 shown in FIG. 5A buffered in the instruction buffer $11_1$ is issued, for example, to the memory access unit $14_1$. As a result, the instruction A0 is executed by pipeline processing.

At step SB2, a decision is made as to whether the synchronization control SYNC has been input or not. A result of the decision is "No". Therefore, the instruction B0 shown in FIG. 5A is issued at the step SB1. In this case, the memory model setting register $41_1$ for the interruption level 1 is being selected in FIG. 3, as the level register write data $D_1'$ corresponding to the interruption level 1 has been input to the multiplexer 43. Therefore, the data of the memory model=0 is output to the non-coincidence detector 45 from the multiplexer 43.

When the interruption level 1 has been changed to the interruption level 2 because of an occurrence of an error or the like, a level register write data $D_1$ of "10" corresponding to the interruption level 2 after the change and the level register write enable signal $S_1$ are input to the interruption level register 40 shown in FIG. 3. Based on this operation, the contents of the interruption level register 40 are updated (the interruption level 1→2).

Further, when the level register write data $D_1$ ("10") corresponding to the interruption level 2 has been input to the multiplexer 44, the multiplexer 44 selects the memory model setting register $41_2$ for the interruption level 2 corresponding to the interruption level 2. Therefore, the multiplexer 44 outputs the data of the memory model=0 to the non-coincidence detector 45. As the data of the memory model=0 that has been previously input to the non-coincidence detector 45 and the data of the memory model=0 coincide with each other, the non-coincidence detector 45 outputs no signal. Therefore, the AND circuit 46 does not output the synchronization instruction signal SYNC (refer to FIG. 2).

In this case, the synchronization instruction signal SYNC shown in FIG. 2 is "0", and the output signal of the AND circuit 34 is also "0". Therefore, the FF 36 is holding "0". Accordingly, the instruction restriction signal STOP is also "0", and the AND circuit 38 outputs the valid signal VALID.

As the memory model has not been changed from before a change in the interruption level to after the change in the interruption level, a result of the decision made at the step SB2 shown in FIG. 4 becomes "No". Thereafter, at the step SB1, the instructions C0 and D0 shown in FIG. 5A relating to the interruption level 2 are issued. In other words, as shown in FIG. 5A, when the memory model has not been changed from before a change in the interruption level to after the change in the interruption level, the synchronization control is not carried out, and instructions are issued continuously without an occurrence of a waiting for the execution of instructions. In the example shown in FIG. 5A, as the memory model is 0, the sequence of the issuance of the instructions A0 to D0 is the same as the sequence of executing these instructions.

Next, the operation of the case where the memory model has been changed in a direction in which the limit becomes mild will be explained. In other words, the operation of the case where the memory model 0 has been changed to the memory model 1 from before a change in the interruption level to after the change in the interruption level (2→3) as shown in FIG. 5B will be explained. It is assumed that the level register write data $D_1'$ of "10" corresponding to the interruption level 2 is being held in the instruction level register 40 shown in FIG. 3. It is also assumed that a valid signal VALID is being output to the processor $13_1$ and the memory access unit $14_1$ from the AND circuit 38 shown in FIG. 2. Further, it is also assumed that the memory model corresponding to the interruption level 2 is the memory model 0 (refer to FIG. 3).

Based on the above state, as the valid signal VALID is being output, at the step SB1 shown in FIG. 4, the instruction A0 and, the instruction B0 shown in FIG. 5B buffered in the instruction buffer $11_1$ are issued, for example, to the memory access unit $14_1$. As a result, the instruction A0 and the instruction B0 are executed by pipeline processing as shown in FIG. 5B.

At the step SB2, a decision is made as to whether the synchronization control SYNC has been input or not. In this case, the memory model setting register $41_2$ for the interruption level 2 is being selected in FIG. 3, as the level register write data $D_1'$ corresponding to the interruption level 2 has been input to the multiplexer 43. Therefore, the data of the memory model=0 is output to the non-coincidence detector 45 from the multiplexer 43.

When the interruption level 2 has been changed to the interruption level 3, a level register write data $D_1$ of "11" corresponding to the interruption level 3 after the change and the level register write enable signal $S_1$ are input to the interruption level register 40 shown in FIG. 3. Based on this operation, the contents of the interruption level register 40 are updated (the interruption level 2→3).

Further, when the level register write data $D_1$ ("11") corresponding to the interruption level 3 has been input to the multiplexer 44, the multiplexer 44 selects the memory model setting register $41_3$ for the interruption level 3 corresponding to the interruption level 3. Therefore, the multiplexer 44 outputs the data of the memory model=1 to the non-coincidence detector 45. In this case, as the data of the memory model=0 that has been previously input to the non-coincidence detector 45 and the data of the memory model=1 do not coincide with each other, the non-coincidence detector 45 produces an output signal of "1". As the level register write enable signal $S_1$ and the output signal of the non-coincidence detector 45 are both "1", the AND circuit 46 outputs the synchronization instruction signal SYNC to the OR circuit 35 shown in FIG. 2.

Then, a result of the decision made at the step SB2 shown in FIG. 4 becomes "Yes". At step SB3, the instruction restriction signal STOP shown in FIG. 2 is output. In other words, when the synchronization instruction signal SYNC of "1" has been set to the FF 36 in FIG. 2, the instruction restriction signal STOP becomes "1". This instruction restriction signal STOP is inverted by the NOT circuit 37 to become "0".

The output of the valid signal VALID from the AND circuit 38 is stopped by the above operation. Then, the execution of the synchronization control S is continued until when the execution of the instructions A0 and B0 relating to the interruption level 2 has been completed as shown in FIG. 5B. Therefore, until when the execution of the instructions A0 and B0 by pipeline processing has been completed, the issuance of the instructions C1 and D1 relating to the interruption level 3 is restricted. In other words, there occurs an execution waiting state that the instructions C1 and D1 cannot be executed during the period while the instructions A0 and B0 are executed by pipeline processing until when this execution has been completed.

At step SB4, a decision is made as to whether a busy signal BUSY shown in FIG. 2 has been input or not. In other words, a decision is made as to whether the instructions A0 and B0 relating to the interruption level 2 are currently being executed or not. In this case, a result of the decision at the step SB4 is "Yes", and the same step of making a decision is repeated.

When the execution of the instructions A0 and B0 relating to the interruption level 2 by pipeline processing shown in FIG. 5B has been completed, the memory access unit $14_1$ stops outputting the memory access unit busy signal $BUSY_2$. Then, the output of the busy signal BUSY is also stopped. The output signal of the AND circuit 34 becomes "0", and the FF 36 is reset. Thus, the instruction restriction signal STOP becomes "0" (step SB5). As the instruction restriction signal STOP is inverted by the NOT circuit 37, the AND circuit 38 outputs the valid signal VALID again.

As the valid signal VALID is being output, at the step SB1, the instruction C1 and the instruction D1 relating to the interruption level 3 shown in FIG. 5B buffered in the instruction buffer $11_1$ are issued, for example, to the memory access unit $14_1$. As a result, the instruction C1 and the instruction D1 are executed by pipeline processing as shown in FIG. 5B.

At the interruption level 3, as the memory model is 1 (refer to FIG. 26), the instruction C1 and the instruction D1 are executed by pipeline processing in a state that the sequence of executing these instructions is different from the issued sequence of these instructions. In other words, as shown in FIG. 5B, when the memory model has been changed from before a change in the interruption level to after the change in the interruption level, the synchronization control is carried out in a similar manner to that of the conventional method.

Next the operation of the case where the memory model 1 has been changed to the memory model 0 from before a change in the interruption level to after the change in the interruption level (3→2) as shown in FIG. 5C will be explained. It is assumed that the level register write data $D_1'$ of "11" corresponding to the interruption level 3 is being held in the instruction level register 40 shown in FIG. 3. It is also assumed that a valid signal VALID is being output to the processor $13_1$ and the memory access unit $14_1$ from the AND circuit 38 shown in FIG. 2. Further, it is also assumed that the memory model corresponding to the interruption level 3 is the memory model 1 (refer to FIG. 3).

Based on the above state, as the valid signal VALID is being output, at the step SB1 shown in FIG. 4, the instruction A1 and the instruction B1 shown in FIG. 5C buffered in the instruction buffer $11_1$ are issued, for example, to the memory access unit $14_1$.

As a result, the instruction A1 and the instruction B1 are executed by pipeline processing as shown in FIG. 5C. In this case, it should be noted that, as the memory model is 1 (refer to FIG. 26) at the interruption level 3, the instruction A1 and the instruction B1 are executed by pipeline processing in a state that the sequence of executing these instructions is different from the issued sequence of these instructions.

At the step SB2, a decision is made as to whether the synchronization control SYNC has been input or not. In this case, the memory model setting register $41_3$ for the interruption level 3 is being selected in FIG. 3, as the level register write data $D_1'$ corresponding to the interruption level 3 has been input to the multiplexer 43. Therefore, the data of the memory model=1 is output to the non-coincidence detector 45 from the multiplexer 43.

When the interruption level 3 has been changed to the interruption level 2, a level register write data $D_1$ of "10" corresponding to the interruption level 2 after the change and the level register write enable signal $S_1$ are input to the interruption level register 40 shown in FIG. 3. Based on this operation, the contents of the interruption level register 40 are updated (the interruption level 3→2).

Further, when the level register write data $D_1$ ("10") corresponding to the interruption level 2 has been input to the multiplexer 44, the multiplexer 44 selects the memory model setting register $41_2$ for the interruption level 2 corresponding to the interruption level 2. Therefore, the multiplexer 44 outputs the data of the memory model=0 to the non-coincidence detector 45.

In this case, as the data of the memory model=1 that has been previously input to the non-coincidence detector 45 and the data of the memory model=0 do not coincide with each other, the non-coincidence detector 45 produces an output signal of "1". As the level register write enable signal $S_1$ and the output signal of the non-coincidence detector 45 are both "1", the AND circuit 46 outputs the synchronization instruction signal SYNC to the OR circuit 35 shown in FIG. 2.

Then, a result of the decision made at the step SB2 shown in FIG. 4 becomes "Yes". At the step SB3, the instruction restriction signal STOP shown in FIG. 2 is output. In other words, when the synchronization instruction signal SYNC of "1" has been set to the FF 36 in FIG. 2, the instruction restriction signal STOP becomes "1". This instruction restriction signal STOP is inverted by the NOT circuit 37 to become "0".

The output of the valid signal VALID from the AND circuit 38 is stopped by the above operation. Then, the execution of the synchronization control S is continued until when the execution of the instructions A1 and B1 relating to the interruption level 3 has been completed as shown in FIG. 5C. Therefore, until when the execution of the instructions A1 and B1 by pipeline processing has been completed, the issuance of the instructions C0 and D0 relating to the interruption level 2 is restricted. In other words, there occurs an execution waiting state that the instructions C0 and D0 cannot be executed during the period while the instructions A1 and B1 are executed by pipeline processing until when this execution has been completed.

At the next step SB4, a decision is made as to whether a busy signal BUSY shown in FIG. 2 has been input or not. In other words, a decision is made as to whether the instructions A1 and B1 relating to the interruption level 3 are currently being executed or not. In this case, a result of the decision at the step SB4 is "Yes", and the same step of making a decision is repeated.

When the execution of the instructions A1 and B1 relating to the interruption level 3 by pipeline processing shown in FIG. 5C has been completed, the memory access unit $14_1$ stops outputting the memory access unit busy signal $BUSY_2$. A result of the decision at the step SB4 becomes "No", and the output of the busy signal BUSY is also stopped.

The output signal of the AND circuit 34 becomes "0", and the FF 36 is reset. Thus, the instruction restriction signal STOP becomes "0" (step SB5). As the instruction restriction signal. STOP is inverted by the NOT circuit 37, the AND circuit 38 outputs the valid signal VALID again.

As the valid signal VALID is being output, at the step SB1, the instruction C0 and the instruction D0 relating to the interruption level 2 shown in FIG. 5C buffered in the instruction buffer $11_1$ are issued, for example, to the memory access unit $14_1$. As a result, the instruction C0 and the instruction D0 are executed by pipeline processing as shown in FIG. 5C. As shown in FIG. 5C, when the memory model has been changed (1→0) from before a change in the interruption level to after the change in the interruption level (3→2), the synchronization control is carried out in a similar manner to that of the conventional method.

Next the operation of the case where the memory model has not been changed (1→1) from before a change in the interruption level to after the change in the interruption level (3→4) as shown in FIG. 5D will be explained. It is assumed that the level register write data $D_1'$ of "11" corresponding to the interruption level 3 is being held in the instruction level register 40 shown in FIG. 3. It is also assumed that a valid signal VALID is being output to the processor $13_1$ and the memory access unit $14_1$ from the AND circuit 38 shown in FIG. 2. Further, it is also assumed that the memory model corresponding to the interruption level 3 is the memory model 1 (refer to FIG. 3).

Based on the above state, at the step SB1 shown in FIG. 4, as the valid signal VALID is being output, the instruction A1 shown in FIG. 5D buffered in the instruction buffer $11_1$ is issued, for example, to the memory access unit $14_1$. As a result, the instruction A1 is executed by pipeline processing as shown in FIG. 5D.

At the step SB2, a decision is made as to whether the synchronization control SYNC has been input or not. A result of the decision is "No". Therefore, the instruction B1 shown in FIG. 5D is issued at the step SB1. In this case, the memory model setting register $41_3$ for the interruption level 3 is being selected in FIG. 3, as the level register write data $D_1'$ corresponding to the interruption level 3 has been input to the multiplexer 43. Therefore, the data of the memory model=1 is output to the non-coincidence detector 45 from the multiplexer 43.

When the interruption level 3 has been changed to the interruption level 4 because of an occurrence of an error or the like, a level register write data $D_1$ of "00" corresponding to the interruption level 4 after the change and the level register write enable signal $S_1$ are input to the interruption level register 40 shown in FIG. 3. Based on this operation, the contents of the interruption level register 40 are updated (the interruption level 3→4).

Further, when the level register write data $D_1$ ("00") corresponding to the interruption level 4 has been input to the multiplexer 44, the multiplexer 44 selects the memory model setting register $41_4$ for the interruption level 4 corresponding to the interruption level 4. Therefore, the multiplexer 44 outputs the data of the memory model=1 to the non-coincidence detector 45. As the data of the memory model=1 that has been previously input to the non-coincidence detector 45 and the data of the memory model=1 coincide with each other, the non-coincidence detector 45 outputs no signal. Therefore, the AND circuit 46 does not output the synchronization instruction signal SYNC (refer to FIG. 2).

In this case, the synchronization instruction signal SYNC shown in FIG. 2 is "0", and the output signal of the AND circuit 34 is also "0". Therefore, the FF 36 is holding "0". Accordingly, the instruction restriction signal STOP is also "0", and the AND circuit 38 outputs the valid signal VALID.

As the memory model has not been changed from before a change in the interruption level to after the change in the interruption level, a result of the decision made at the step SB2 shown in FIG. 4 becomes "No". Thereafter, at the step SB1, the instructions C1 and D1 shown in FIG. 5C relating to the interruption level 4 are issued. In other words, as shown in FIG. 5D, when the memory model has not been changed from before a change in the interruption level to after the change in the interruption level, the synchronization control is not carried out, and instructions are issued continuously.

As explained above, according to the first embodiment, the synchronization control is carried out when the memory model has been changed following a change in the interruption level, and the synchronization control is not carried out when the memory model has not been changed following a change in the interruption level, as shown in FIG. 29. In other words, according to the first embodiment, the number of executing the synchronization control is reduced to two from four according to the conventional method, as can be understood from FIG. 29.

As explained above, according to the first embodiment, it is monitored whether there has been a change in the memory model from before a change in the interruption level to after the change in the interruption level. The synchronization control is carried out only when the memory model has been changed. On the other hand, when the memory model has not been changed, the synchronization control is not carried out. Therefore, as compared with the conventional processing unit which unconditionally carries out the synchronization control when the interruption level has been changed, the processing unit of the first embodiment of the invention can reduce the number of executing the synchronization control. Therefore, it is possible to improve the processing capacity.

Figure 6:
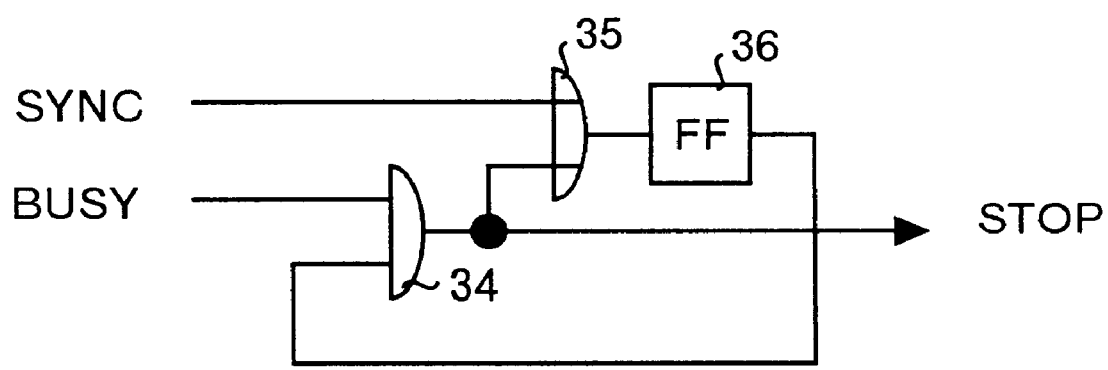
FIG. 6 is a diagram that shows a modification of the first embodiment.

In the first embodiment, it has been explained that the output signal of the FF 36 shown in FIG. 2 is used as the instruction restriction signal STOP. Alternately, the output signal of the AND circuit 34 can also be used as the instruction restriction signal STOP as shown in FIG. 6. In this case, the instruction restriction signal STOP shown in FIG. 6 is input to the NOT circuit 37 shown in FIG. 2.

In the above first embodiment, there has been explained a case that when a memory model has been changed from before a change in the interruption level to after the change in the interruption level, a synchronization control is carried out indiscriminately regardless of the contents of the change. However, it is also possible to carry out a synchronization control by taking into consideration the contents of the change in the memory model. This will be explained below as a second embodiment.

As shown in the column of "second embodiment" in FIG. 29, a synchronization control is carried out when the memory model 0 has been changed to the memory model 1, and a synchronization control is not carried out when the memory model 1 has been changed to the memory model 0. When the memory model 1 has been changed to the memory model 0 in FIG. 26, it is not possible to bypass the execution of the instructions. The present method has been obtained in the light of the fact that a malfunction does not occur even when a synchronization control is not carried out under this severe condition.

On the other hand, when the memory model 0 has been changed to the memory model 1, the limit of bypass execution becomes mild that it is possible to bypass the execution of the instructions. Therefore, when a synchronization control is not carried out, a malfunction occurs that the instructions relating to the memory model 0 (of which execution should not be bypassed) are executed in bypass. Accordingly, it is essential to carry out the synchronization control when the memory model 0 has been changed to the memory model 1.

FIG. 7 is a block diagram that shows a structure of a second embodiment relating to the present invention. In FIG. 7, portions corresponding to those in FIG. 2 and FIG. 1 are attached with identical reference numbers, and their explanation will be omitted. In FIG. 7, there are provided processing units $200_1$ to $200_n$ in place of the processing units $10_1$ to $10_n$ shown in FIG. 1, and there is provided a synchronization instruction signal generator circuit $201_1$ in place of the synchronization instruction signal generator circuit 30 shown in FIG. 2.

Each of the processing units $200_1$ to $200_n$ shown in FIG. 7 makes access to a system memory 20 (or a cache memory $15_1$) according to load/store instructions, thereby to execute loading/storing of data. Further, each of the processing units $200_1$ to $200_n$ executes various kinds of processing based on processing instructions such as an addition instruction and a subtraction instruction. The processing unit $200_n$ has a structure and functions that are the same as the structure and the functions of the processing unit $200_1$.

In the processing unit $200_1$, a synchronization instruction signal generator circuit $201_1$ generates a synchronization instruction signal SYNC for issuing the synchronization instruction as explained in the first embodiment. The synchronization instruction signal SYNC is output based on the following condition. The synchronization instruction signal SYNC is output only when the interruption level (refer to FIG. 25A) has been changed and when the memory model 0 has been changed to the memory model 1 (refer to FIG. 26) as shown in FIG. 29 following the change in the interruption level. The synchronization instruction signal SYNC is not output in other conditions than the above.

FIG. 8 is a block diagram that shows a structure of the synchronization instruction signal generator circuit $201_1$ shown in FIG. 7. In this drawing, portions corresponding to those in FIG. 3 are attached with identical reference numbers. In FIG. 8, a size comparator 202 is provided in place of the non-coincidence detector 45 shown in FIG. 3.

The size comparator 202 compares the size of the data (the memory model) from a multiplexer 43 with the size of the data (the memory model) from a multiplexer 44. In this case, the sizes of the memory models mean the sizes of the levels (0 or 1) of the memory models. Accordingly, the memory model=1 is larger than the memory model=0. On the contrary, the memory model=0 is smaller than the memory model=1.

Specifically, the size comparator 202 produces an output signal "1" when the data (the memory model=0) from the multiplexer 43 is smaller than the data (the memory model=1) from the multiplexer 44. In other words, the size comparator 202 produces the output signal "1" when the memory model 0 has been changed to the memory model 1 (refer to FIG. 26), that is, when the memory model has been changed in a direction that the limit of the memory model becomes mild.

On the other hand, the size comparator 202 produces an output signal "0" when the data (the memory model=1) from the multiplexer 43 is larger than the data (the memory model=0) from the multiplexer 44. In other words, the size comparator 202 produces the output signal "0" when the memory model 1 has been changed to the memory model 0 (refer to FIG. 26), that is, when the memory model has been changed in a direction that the limit of the memory model becomes severe. The size comparator 202 produces the output signal "0", in a similar manner to that in the first embodiment, when the data (the memory model) from the multiplexer 43 is equal to the data (the memory model) from the multiplexer 44. In other words, when the memory model has not been changed from before a change in the interruption level to after the change in the interruption level, the size comparator 202 produces the output signal "0".

An AND circuit 46 takes an AND of a level register write enable, signal $S_1$ and an output signal of the size comparator 202, and produces an output of a synchronization instruction signal SYNC when both signals are "1". The synchronization instruction signal SYNC is output when the memory model 0 has been changed to the memory model 1 from before a change in the interruption level to after the change in the interruption level and when the level register write enable signal $S_1$ is "1", as explained above. On the other hand, the synchronization instruction signal SYNC is not output when the memory model has not been changed from before a change in the interruption level to after the change in the interruption level and also when the memory model 1 has been changed to the memory model 0.

The operation of the second embodiment will be explained next with reference to the flowchart shown in FIG. 4 and FIG. 9A to FIG. 9D. The operation will be explained in a similar manner to that explained for the first embodiment (refer to FIG. 5A to FIG. 5D). First, there will be explained the operation of the case where the memory model is not changed (0→0, 1→1) from before a change in the interruption level to after the change in the interruption level (1→2 and 3→4) as shown in FIG. 9A and FIG. 9D. Next, there will be explained the operation to be carried out when the memory model is changed (0→1, 1→0) from before a change in the interruption level to after the change in the interruption level (2→3 and 3→2) as shown in FIG. 9B and FIG. 9C.

It is assumed that a level register write data $D_1'$ of "01" corresponding to the interruption level 1 is being held in an instruction level register 40 shown in FIG. 8. It is also assumed that a valid signal VALID is being output to a processor $13_1$ and a memory access unit $14_1$ from an AND circuit 38 shown in FIG. 7. Further, it is also assumed that the memory model corresponding to the interruption level 1 is the memory model 0 (refer to FIG. 8).

Based on the above state, at the step SB1 shown in FIG. 4, as the valid signal VALID is being output, the instruction A0 shown in FIG. 9A buffered in an instruction buffer $11_1$ is issued, for example, to the memory access unit $14_1$. As a result, the instruction A0 is executed by pipeline processing.

At the step SB2, a decision is made as to whether the synchronization control SYNC has been input or not. A result of the decision is "No". Therefore, the instruction B0 shown in FIG. 9A is issued at the step SB1. In this case, a memory model setting register $41_1$ for the interruption level 1 is being selected in FIG. 8, as the level register write data $D_1'$ corresponding to the interruption level 1 has been input to the multiplexer 43. Therefore, the data of the memory model=0 is output to the size comparator 202 from the multiplexer 43.

When the interruption level 1 has been changed to the interruption level 2 because of an occurrence of an error or the like, a level register write data $D_1$ of "10" corresponding to the interruption level 2 after the change and the level register write enable signal $S_1$ are input to the interruption level register 40 shown in FIG. 8. Based on this operation, the contents of the interruption level register 40 are updated (the interruption level 1→2).

Further, when the level register write data $D_1$ ("10") corresponding to the interruption level 2 has been input to the multiplexer 44, the multiplexer 44 selects a memory model setting register $41_2$ for the interruption level 2 corresponding to the interruption level 2. Therefore, the multiplexer 44 outputs the data of the memory model=0 to the size comparator 202.

In this case, as the data of the memory model=0 that has been previously input to the size comparator 202 coincides with the data of the memory model=0, the size comparator 202 produces no output. As the synchronization instruction signal SYNC shown in FIG. 7 is "0", and an instruction restriction signal STOP is also "0", the AND circuit 38 produces a valid signal VALID, in a similar manner to that of the first embodiment.

As the memory model has not been changed from before a change in the interruption level to after the change in the interruption level, a result of the decision made at the step SB2 shown in FIG. 4 becomes "No". Thereafter, at the step SB1, instructions C0 and D0 shown in FIG. 9A relating to the interruption level 2 are issued. In other words, as shown in FIG. 9A, when the memory model has not been changed from before a change in the interruption level to after the change in the interruption level, the synchronization control is not carried out, and instructions are issued continuously without an occurrence of a waiting for the execution of instructions, in a similar manner to that as described in the first embodiment.

Next, the operation of the case where the memory model has been changed in a direction in which the limit becomes mild will be explained. In other words, the operation of the case where the memory model 0 has been changed to the memory model 1 from before a change in the interruption level to after the change in the interruption level (2→3) as shown in FIG. 9B will be explained. It is assumed that the level register write data $D_1'$ of "10" corresponding to the interruption level 2 is being held in the instruction level register 40 shown in FIG. 8. It is also assumed that a valid signal VALID is being output to the processor 13₁ and the memory access unit 14₁ from the AND circuit 38 shown in FIG. 7. Further, it is also assumed that the memory model corresponding to the interruption level 2 is the memory model 0 (refer to FIG. 8).

Based on the above state, as the valid signal VALID is being output, at the step SB1 shown in FIG. 4, the instruction A0 and the instruction B0 shown in FIG. 9B buffered in the instruction buffer 11₁ are issued, for example, to the memory access unit 14₁. As a result, the instruction A0 and the instruction B0 are executed by pipeline processing as shown in FIG. 9B.

At the step SB2, a decision is made as to whether the synchronization control SYNC has been input or not. In this case, the memory model setting register 41₂ for the interruption level 2 is being selected in FIG. 8, as the level register write data $D_1'$ corresponding to the interruption level 2 has been input to the multiplexer 43. Therefore, the data of the memory model=0 is output to the size comparator 202 from the multiplexer 43.

When the interruption level 2 has been changed to the interruption level 3, a level register write data $D_1$ of "11" corresponding to the interruption level 3 after the change and the level register write enable signal $S_1$ are input to the interruption level register 40 shown in FIG. 8. Based on this operation, the contents of the interruption level register 40 are updated (the interruption level 2→3).

Further, when the level register write data $D_1$ ("11") corresponding to the interruption level 3 has been input to the multiplexer 44, the multiplexer 44 selects a memory model setting register 41₃ for the interruption level 3 corresponding to the interruption level 3. Therefore, the multiplexer 44 outputs the data of the memory model=1 to the size comparator 202.

In this case, as the data (the memory model=0) that has been previously input from the multiplexer 43 to the size comparator 202 is smaller than the data (the memory model=1) from the multiplexer 44, the size comparator 202 produces an output signal of "1". As the level register write enable signal $S_1$ and the output signal of the size comparator 202 are both "1", the AND circuit 46 outputs the synchronization instruction signal SYNC to an OR circuit 35 shown in FIG. 7.

Then, a result of the decision made at the step SB2 shown in FIG. 4 becomes "Yes" in a similar manner to that as described in the first embodiment (refer to FIG. 5B). At the step SB3, an instruction restriction signal STOP shown in FIG. 7 is output. Thus, the output of the valid signal VALID from the AND circuit 38 is stopped. Then, the execution of the synchronization control S is continued until when the execution of the instructions A0 and B0 relating to the interruption level 2 has been completed as shown in FIG. 9B. In other words, there occurs an execution waiting state that instructions C1 and D1 cannot be executed during the period while the instructions A0 and B0 are executed by pipeline processing until when this execution has been completed.

At the step SB4, a decision is made as to whether the instructions A0 and B0 relating to the interruption level 2 are currently being executed or not. In this case, a result of the decision at the step SB4 is "Yes", and the same step of making a decision is repeated. When the execution of the instructions A0 and B0 relating to the interruption level 2 by pipeline processing shown in FIG. 9B has been completed, the memory access unit 14₁ stops outputting the busy signal BUSY in a similar manner to that of the first embodiment (refer to FIG. 5B). Thus, the instruction restriction signal STOP becomes "0" (step SB5). Accordingly, the AND circuit 38 shown in FIG. 7 outputs the valid signal VALID again.

As the valid signal VALID is being output, at the step SB1, the instruction C1 and the instruction D1 relating to the interruption level 3 shown in FIG. 9B buffered in the instruction buffer 11₁ are issued, for example, to the memory access unit 14₁. As a result, the instruction C1 and the instruction D1 are executed by pipeline processing as shown in FIG. 9B.

At the interruption level 3, as the memory model is 1 (refer to FIG. 26), the instruction C1 and the instruction D1 are executed by pipeline processing in a state that the sequence of executing these instructions is different from the issued sequence of these instructions. In other words, as shown in FIG. 9B and FIG. 29, when the memory model has been changed from before a change in the interruption level to after the change in the interruption level, the synchronization control is carried out in a similar manner to that of the conventional method and the first embodiment.

When the synchronization control S has not been carried out in the above condition (the change in the interruption level: 2→3, and the change in the memory model: 0→1) shown in FIG. 9B, a malfunction occurs as shown in FIG. 9E. In other words, in FIG. 9E, when the instruction C1 and the instruction D1 of the memory model=1 (the bypass execution is possible) have been issued in a state of waiting for the execution of the instruction B0 of the memory model=0 (the bypass execution is not possible), the instructions D1 and C1 are executed prior to the execution of the instruction B0. In this case, a malfunction occurs. Therefore, when the memory model 0 has been changed to the memory model 1 from before a change in the interruption level to after the change in the interruption level, it is essential to carry out the synchronization control S in order to prevent the erroneous operation. In other words, when the state that it is not possible to bypass the execution of the instructions has been changed to the state that it is possible to bypass the execution, it is essential to carry out the synchronization control S.

Next, the operation of the case where the memory model 1 has been changed to the memory model 0 from before a change in the interruption level to after the change in the interruption level (3→2) as shown in FIG. 9C will be explained. It is assumed that the level register write data $D_1'$ of "11" corresponding to the interruption level 3 is being held in the instruction level register 40 shown in FIG. 8. It is also assumed that the valid signal VALID is being output to the processor 13₁ and the memory access unit 14₁ from the AND circuit 38 shown in FIG. 7. Further, it is also assumed that the memory model corresponding to the interruption level 3 is the memory model 1 (refer to FIG. 8).

Based on the above state, as the valid signal VALID is being output, at the step SB1 shown in FIG. 4, the instruction A1 and the instruction B1 shown in FIG. 9C buffered in the instruction buffer 11₁ are issued, for example, to the memory access unit 14₁. As a result, the instruction A1 and the instruction B1 are executed by pipeline processing as shown in FIG. 9C.

At the next step SB2, a decision is made as to whether the synchronization control SYNC has been input or not. In this case, the memory model setting register 41₃ for the interruption level 3 is being selected in FIG. 8, as the level register write data $D_1'$ corresponding to the interruption level 3 has been input to the multiplexer 43. Therefore, the data of the memory model=1 is output to the size comparator 202 from the multiplexer 43.

When the interruption level 3 has been changed to the interruption level 2, a level register write data $D_1$ of "10" corresponding to the interruption level 2 after the change and the level register write enable signal $S_1$ are input to the interruption level register 40 shown in FIG. 8. Based on this operation, the contents of the interruption level register 40 are updated (the interruption level 3→2).

Further, when the level register write data $D_1$ ("10") corresponding to the interruption level 2 has been input to the multiplexer 44, the multiplexer 44 selects the memory model setting register $41_2$ for the interruption level 2 corresponding to the interruption level 2. Therefore, the multiplexer 44 outputs the data of the memory model=0 to the size comparator 202. In this case, as the data (the memory model=0) that has been previously input from the multiplexer 44 to the size comparator 202 is smaller than the data (the memory model=1) from the multiplexer 43, the size comparator 202 outputs no signal. Therefore, the AND circuit 46 outputs no synchronization instruction signal SYNC (refer to FIG. 7).

As the synchronization instruction signal SYNC shown in FIG. 7 is "0" and an output signal of the AND circuit 34 is also "0", an FF 36 is holding "0". Accordingly, the instruction restriction signal STOP is also "0", and the AND circuit 38 produces a valid signal VALID. As the synchronization instruction signal SYNC is "0", a result of the decision made at the step SB2 shown in FIG. 4 becomes "No".

Thereafter, at the step SB1, the instructions C0 and D0 shown in FIG. 9C relating to the interruption level 4 are issued. As shown in FIG. 9C, when the memory model 1 has been changed to the memory model 0 from before a change in the interruption level to after the change in the interruption level, the synchronization control is not carried out, and instructions are issued continuously. In other words, when the state that it is possible to bypass the execution of the instructions has been changed to the state that it is not possible to bypass the execution, the synchronization control is not carried out, and instructions are issued continuously.

Next, the operation of the case where the memory model has not been changed (1→1) from before a change in the interruption level to after the change in the interruption level (3→4) as shown in FIG. 9D will be explained. It is assumed that the level register write data $D_1'$ of "11" corresponding to the interruption level 3 is being held in the instruction level register 40 shown in FIG. 8. It is also assumed that the valid signal VALID is being output to the processor $13_1$ and the memory access unit $14_1$ from the AND circuit 38 shown in FIG. 7. Further, it is also assumed that the memory model corresponding to the interruption level 3 is the memory model 1 (refer to FIG. 8).

Based on the above state, as the valid signal VALID is being output, at the step SB1 shown in FIG. 4, the instruction A1 shown in FIG. 9D buffered in the instruction buffer $11_1$ is issued, for example, to the memory access unit $14_1$. As a result, the instruction A1 is executed by pipeline processing as shown in FIG. 9D.

At the next step SB2, a decision is made as to whether the synchronization control SYNC has been input or not. A result of the decision is made as "No". Therefore, the instruction B1 shown in FIG. 9D is issued at the step SB1. In this case, the memory model setting register $41_3$ for the interruption level 3 is being selected in FIG. 8, as the level register write data $D_1'$ corresponding to the interruption level 3 has been input to the multiplexer 43. Therefore, the data of the memory model=1 is output to the size comparator 202 from the multiplexer 43.

When the interruption level 3 has been changed to the interruption level 4 because of an occurrence of an error or like that, a level register write data $D_1$ of "00" corresponding to the interruption level 4 after the change and the level register write enable signal $S_1$ are input to the interruption level register 40 shown in FIG. 8. Based on this operation, the contents of the interruption level register 40 are updated (the interruption level 3→4).

Further, when the level register write data $D_1$ ("00") corresponding to the interruption level 4 has been input to the multiplexer 44, the multiplexer 44 selects a memory model setting register $41_4$ for the interruption level 4 corresponding to the interruption level 4. Therefore, the multiplexer 44 outputs the data of the memory model=1 to the size comparator 202. In this case, as the data of the memory model=1 that has been previously input to the size comparator 202 coincides with the data of the memory model=1, the size comparator 202 outputs no signal. Therefore, the AND circuit 46 outputs no synchronization instruction signal SYNC (refer to FIG. 7).

As the synchronization instruction signal SYNC shown in FIG. 7 is "0", the output signal of the AND circuit 34 is also "0", and the FF 36 is holding "0". Accordingly, the instruction restriction signal STOP is also "0", and the AND circuit 38 produces a valid signal VALID.

As the memory model has not been changed from before a change in the interruption level to after the change in the interruption level, a result of the decision made at the step SB2 shown in FIG. 4 becomes "No". Thereafter, at the step SB1, the instructions C1 and D1 shown in FIG. 9D relating to the interruption level 4 are issued. As shown in FIG. 9D, when the memory model has not been changed from before a change in the interruption level to after the change in the interruption level, the synchronization control is not carried out, and instructions are issued continuously.

As explained above, according to the second embodiment, the synchronization control is carried out only when the memory model 0 has been changed to the memory model 1 following the change in the interruption level as shown in FIG. 29. In other words, the synchronization control is carried out only when the state that it is not possible to bypass the execution of the instructions has been changed to the state that it is possible to bypass the execution. According to the second embodiment, the number of executing the synchronization control is reduced to one from four according to the conventional method, as can be understood from FIG. 29.

As explained above, according to the second embodiment, a decision is made about the direction of a change in the memory model from before a change in the interruption level to after the change in the interruption level. The synchronization control is carried out only when the memory model has been changed in a direction to relax the limit of bypass execution of instructions (the memory model: 0→1). Therefore, as compared with the conventional processing unit which unconditionally carries out the synchronization control when the interruption level has been changed, the processing unit of the second embodiment of the invention can further reduce the number of executing the synchronization control. As a result, it is possible to substantially improve the processing capacity.

Figure 10:
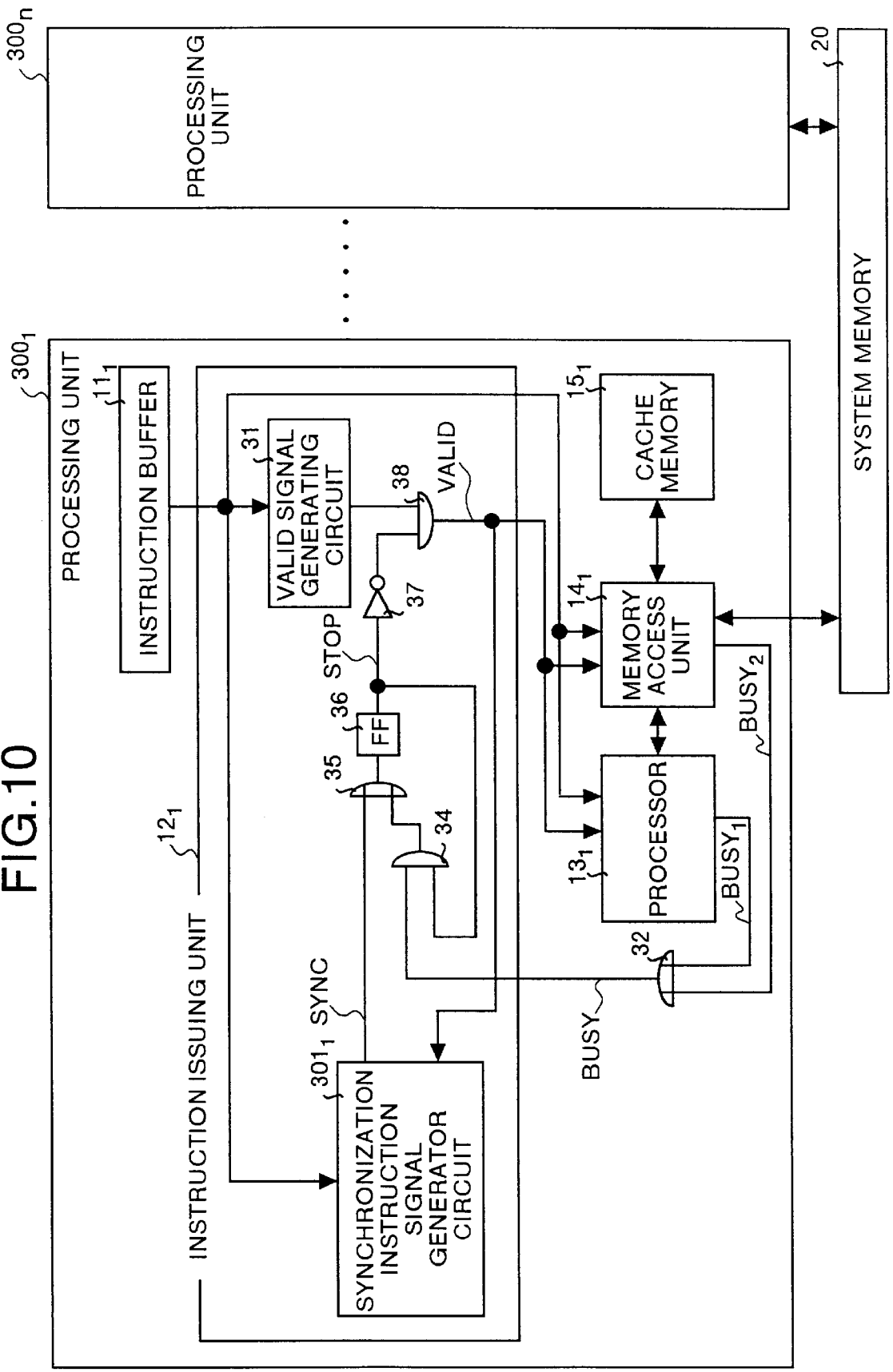
FIG. 10 is a block diagram that shows a structure of a third embodiment relating to the present invention.

FIG. 10 is a block diagram that shows a structure of a third embodiment relating to the present invention. In FIG. 10, portions corresponding to those in FIG. 1 and FIG. 2 are attached with identical reference numbers, and their explanation will be omitted. In FIG. 10, there are provided processing units $300_1$ to $300_n$ in place of the processing units $10_1$ to $10_n$ shown in FIG. 1, and there is provided a synchronization instruction signal generator circuit $301_1$ in place of the synchronization instruction signal generator circuit 30 shown in FIG. 2.

Each of the processing units $300_1$ to $300_n$ shown in FIG. 10 makes access to a system memory 20 (or a cache memory $15_1$) according to load/store instructions, thereby to execute loading/storing of data. Further, each of the processing units $300_1$ to $300_n$ executes various kinds of processing based on processing instructions such as an addition instruction and a subtraction instruction. The processing unit $300_n$ has a structure and functions that are the same as the structure and the functions of the processing unit $300_1$. In the processing unit $300_1$, a synchronization instruction signal generator circuit $301_1$ generates a synchronization instruction signal SYNC for issuing the synchronization instruction as explained in the first embodiment.

The structure of the synchronization instruction signal generator circuit $301_1$ shown in FIG. 10 will be explained in detail with reference to FIG. 11. The synchronization instruction signal generator circuit $301_1$ shown in FIG. 10 consists of a interruption level/memory model setting register 310 and a synchronization instruction signal generator 350. The interruption level/memory model setting register 310 consists of various kinds of registers for holding data of the interruption levels (FIG. 25A) and data of memory models corresponding to the interruption levels. The synchronization instruction signal generator 350 generates a synchronization instruction signal SYNC.

Figure 12A:
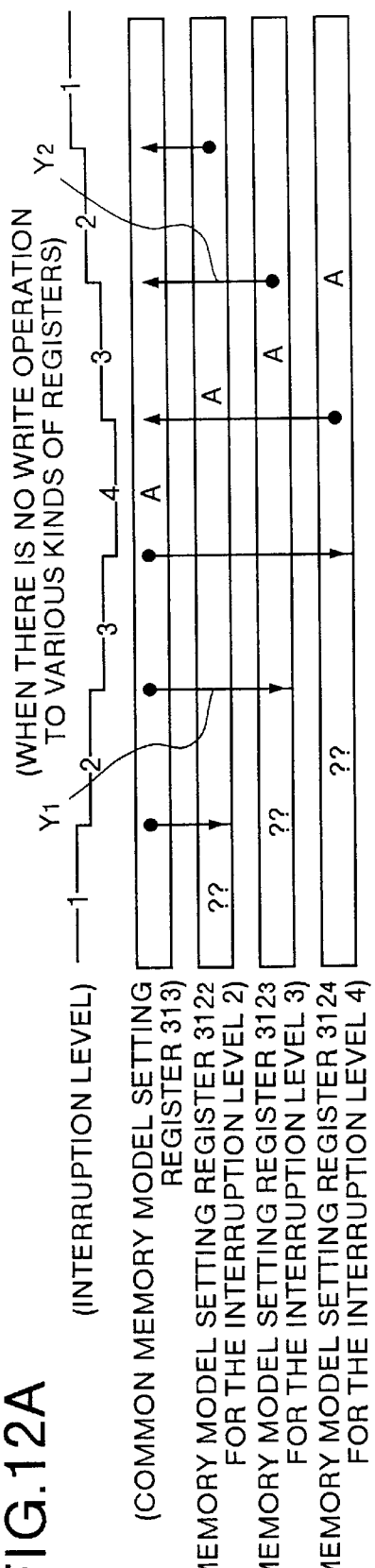

In the interruption level/memory model setting register 310, an interruption level register 311 holds a two-bit interruption level data $WD_L$ that shows one interruption level out of interruption levels 1 to 4 shown in FIG. 12A. This interruption level data $WD_L$ is "01", "10", "11" and "00" corresponding to the interruption levels 1, 2, 3 and 4 respectively. In other words, when the interruption level data $WD_L$ of "01" is being held in the interruption level register 311, this shows that the current interruption level is 1.

When the interruption level is changed, either an interruption level +1 instruction $LC_+$ or an interruption level –1 instruction $LC_-$ is issued. Specifically, when the interruption level is to be changed to a one-stage higher level, the interruption level +1 instruction $LC_+$ is issued. On the other hand, when the interruption level is to be changed to a one-stage lower level, the interruption level –1 instruction $LC_-$ is issued. An AND circuit 340 takes an AND of an interruption level +1 instruction $LC_+'$ which is an interruption level before the issuance that is being held in an instruction buffer $11_1$ (refer to FIG. 10) and a valid signal VALID (refer to FIG. 10). In other words, the interruption level +1 instruction $LC_+$ is issued when both the interruption level +1 instruction $LC_+'$ and the valid signal VALID have been input to the AND circuit 340. An AND circuit 341 takes an AND of an interruption level –1 instruction $LC_-'$ that is being held in the instruction buffer $11_1$ (refer to FIG. 10) and the valid signal VALID (refer to FIG. 10). In other words, the interruption level –1 instruction $LC_-$ is issued when both the interruption level –1 instruction $LC_-'$ and the valid signal VALID have been input to the AND circuit 341.

A memory model setting register $312_2$ for the interruption level 2 to a memory model setting register $312_4$ for the interruption level 4 are being set to the interruption levels 2 to 4 (refer to FIG. 12A) respectively. A memory model of A or B (refer to FIG. 12B) is being set to the memory model setting register $312_2$ for the interruption level 2 to the memory model setting register $312_4$ for the interruption level 4. The interruption level=A and the interruption level=B correspond to the interruption level=0 and the interruption level=1 (1 and 0) shown in FIG. 26 respectively.

A memory model data $WD_B$ or a common modify data $MW_K$ is set to a common memory model setting register 313. This memory model data $WD_B$ is set to the common memory model setting register 313 when the interruption level–1 instruction $LC_-$ has been input to the common memory model setting register 313 as a common write enable signal $WE_K$. In other words, the memory model data $WD_B$ is being set to the common memory model setting register 313 when the interruption level has been returned to the level before the change.

On the other hand, when a common modify signal $MF_K$ has been input, the common modify data $MW_K$ is set to the common memory model setting register 313. This common modify signal $MF_K$ is input to the common memory model setting register 313 at the time of modifying the set contents of the common memory model setting register 313. In this case, the term modify means to change the contents of the common memory model setting register 313 in a state that the interruption level does not change.

The common modify signal $MF_K$ is an output signal of an AND circuit 322. The valid signal VALID (refer to FIG. 10) and a common modify instruction $MC_K$ are input to the AND circuit 322. This common modify instruction $MC_K$ is an instruction that is issued at the time of modifying the set contents of the common memory model setting register 313. The common memory model setting register 313 outputs the set contents (the memory model) as memory model data $WD_A$.

An increment circuit 314 increments by one the contents (the interruption level) of interruption level data $WD_L'$ from the interruption level register 311 when the interruption level +1 instruction $LC_+$ has been issued. A decrement circuit 315 decrements by one the interruption level data $WD_L'$ from the interruption level register 311 when the interruption level –1 instruction $LC_-$ has been issued.

A multiplexer 316 selects the output data of one of the increment circuit 314 and the decrement circuit 315 by using either the interruption level +1 instruction $LC_+$ or the interruption level –1 instruction $LC_-$ as a selective signal. The multiplexer 316 then outputs this selected output data to the common memory model setting register 311 as interruption level data $WD_L$. An AND circuit $317_2$ to an AND circuit $317_4$ are provided corresponding to the memory model setting register $312_2$ for the interruption level 2 to the memory model setting register $312_4$ for the interruption level 4 respectively, and these AND circuits take an AND of the interruption level data $WD_L'$ and the interruption level +1 instruction $LC_+$.

A second-bit data of the interruption level data $WD_L'$ is inverted by a NOT circuit 318, and is then input to an AND circuit $317_2$. A first-bit data of the interruption level data $WD_L'$ is inverted by a NOT circuit 319, and is then input to an AND circuit $317_3$.

Accordingly, the output data of the AND circuit $317_2$ becomes "1" when the interruption level data $WD_L'$ is "01" (the interruption level=1) when the interruption level +1 instruction $LC_+$ has been issued. The output data from the AND circuit $317_2$ is input to the memory model setting register $312_2$ for the interruption level 2 as a write enable signal $WE_2$ for the interruption level 2. When the write enable signal $WE_2$ for the interruption level 2 is "1", a memory model data $WD_A$ from the common memory model setting register 313 is set to the memory model setting register $312_2$ for the interruption level 2.

The output data of the AND circuit $317_3$ becomes "1" when the interruption level data $WD_L'$ is "10" (the interruption level 2) when the interruption level +1 instruction $LC_+$ has been issued. The output data from the AND circuit $317_3$ is input to the memory model setting register $312_3$ for the interruption level 3 as a write enable signal $WE_3$ for the interruption level 3. When the write enable signal $WE_3$ for the interruption level 3 is "1", the memory model data $WD_A$ from the common memory model setting register 313 is set to the memory model setting register $312_3$ for the interruption level 3.

Similarly, the output data of the AND circuit $317_4$ becomes "1" when the interruption level data $WD_L'$ is "11" (the interruption level=3) when the interruption level +1 instruction $LC_+$ has been issued. The output data from the AND circuit $317_4$ is input to the memory model setting register $312_4$ for the interruption level 4 as a write enable signal $WE_4$ for the interruption level 4. When the write enable signal $WE_4$ for the interruption level 4 is "1", the memory model data $WD_A$ from the common memory model setting register 313 is set to the memory model setting register $312_4$ for the interruption level 4.

The multiplexer 320 selects one of the memory model setting register $312_2$ for the interruption level 2 to the memory model setting register $312_4$ for the interruption level 4 by using the interruption level data $WD_L'$ as selective data. For example, when the level register write data $WD_L'$ shows the interruption level 2, the multiplexer 320 selects the memory model setting register $312_2$ for the interruption level 2 corresponding to the interruption level 2. As a result, the multiplexer 320 outputs a memory model data $WD_2$ for the interruption level 2 from the memory model setting register $312_2$ for the interruption level 2 to the common memory model setting register 313 as the memory model data $WD_B$.

Either the memory model data $WD_A$ or a modify data $MW_2$ for the interruption level 2 is set to the memory model setting register $312_2$ for the interruption level 2. This memory model data $WD_A$ is set to the memory model setting register $312_2$ for the interruption level 2 when the write enable signal $WE_2$ for the memory model 2 has been input to the memory model setting register $312_2$ for the interruption level 2. In other words, when the interruption level has been changed to a one-stage higher level from "01" to "10", the memory model data $WD_A$ is set to the memory model setting register $312_2$ for the interruption level 2.

On the other hand, the modify data $MW_2$ for the interruption level 2 is set to the memory model setting register $312_2$ for the interruption level 2 when a modify signal $MF_2$ for the interruption level 2 has been input to the memory model setting register $312_2$ for the interruption level 2. This modify signal $MF_2$ for the interruption level 2 is input to the memory model setting register $312_2$ for the interruption level 2 at the time of modifying the set contents of the memory model setting register $312_2$ for the interruption level 2. In this case, the term modify means to change the contents of the memory model setting register $312_2$ for the interruption level 2 in a state that the interruption level does not change.

The modify signal $MF_2$ for the interruption level 2 is an output signal of an AND circuit $321_2$. A valid signal VALID (refer to FIG. 10) and a modify instruction $MC_2$ for the interruption level 2 are input to this AND circuit $321_2$. The modify instruction $MC_2$ for the interruption level 2 is an instruction that is issued at the time of modifying the set contents of the memory model setting register $312_2$ for the interruption level 2. The modify instruction $MC_2$ for the interruption level 2 is an output of an AND circuit $330_2$. The AND circuit $330_2$ takes an AND of a modify instruction MC and an output signal of an AND circuit $352_2$ to be described later. The memory model setting register $312_2$ for the interruption level 2 outputs the set contents (the memory model) to the multiplexer 320 as the memory model data $WD_2$ for the interruption level 2.

Either the memory model data $WD_A$ or a modify data $MW_3$ for the interruption level 3 is set to the memory model setting register $312_3$ for the interruption level 3. This memory model data $WD_A$ is set to the memory model setting register $312_3$ for the interruption level 3 when the write enable signal $WE_3$ for the memory model 3 has been input to the memory model setting register $312_3$ for the interruption level 3. In other words, when the interruption level has been changed to a one-stage higher level from "10" to "11", the memory model data $WD_A$ is set to the memory model setting register $312_3$ for the interruption level 3.

On the other hand, the modify data $MW_3$ for the interruption level 3 is set to the memory model setting register $312_3$ for the interruption level 3 when a modify signal $MF_3$ for the interruption level 3 has been input to the memory model setting register $312_3$ for the interruption level 3. This modify signal $MF_3$ for the interruption level 3 is input to the memory model setting register $312_3$ for the interruption level 3 at the time of modifying the set contents of the memory model setting register $312_3$ for the interruption level 3. In this case, the term modify means to change the contents of the memory model setting register $312_3$ for the interruption level 3 in a state that the interruption level does not change.

The modify signal $MF_3$ for the interruption level 3 is an output signal of an AND circuit $321_3$. A valid signal VALID (refer to FIG. 10) and a modify instruction $MC_3$ for the interruption level 3 are input to this AND circuit $321_3$. The modify instruction $MC_3$ for the interruption level 3 is an instruction that is issued at the time of modifying the set contents of the memory model setting register $312_3$ for the interruption level 3. The modify instruction $MC_3$ for the interruption level 3 is an output of an AND circuit $330_3$. The AND circuit $330_3$ takes an AND of a modify instruction MC and an output signal of an AND circuit $352_3$ to be described later. The memory model setting register $312_3$ for the interruption level 3 outputs the set contents (the memory model) to the multiplexer 320 as a memory model data $WD_3$ for the interruption level 3.

Either the memory model data $WD_A$ or a modify data $MW_4$ for the interruption level 4 is set to the memory model setting register $312_4$ for the interruption level 4. This memory model data $WD_A$ is set to the memory model setting register $312_4$ for the interruption level 4 when the write enable signal $WE_4$ for the memory model 4 has been input to the memory model setting register $312_4$ for the interruption level 4. In other words, when the interruption level has been changed to a one-stage higher level from "11" to "00", the memory model data $WD_A$ is set to the memory model setting register $312_4$ for the interruption level 4.

On the other hand, the modify data $MW_4$ for the interruption level 4 is set to the memory model setting register $312_4$ for the interruption level 4 when a modify signal $MF_4$ for the interruption level 4 has been input to the memory model setting register $312_4$ for the interruption level 4. This modify signal $MF_4$ for the interruption level 4 is input to the memory model setting register $312_4$ for the interruption level 4 at the time of modifying the set contents of the memory model setting register $312_4$ for the interruption level 4. In this case, the term modify means to change the contents of the memory model setting register $312_4$ for the interruption level 4 in a state that the interruption level does not change.

The modify signal $MF_4$ for the interruption level 4 is an output signal of an AND circuit $321_4$. A valid signal VALID (refer to FIG. 10) and a modify instruction $MC_4$ for the interruption level 4 are input to this AND circuit $321_4$. The modify instruction $MC_4$ for the interruption level 4 is an instruction that is issued at the time of modifying the set contents of the memory model setting register $312_4$ for the interruption level 4. The modify instruction $MC_4$ for the interruption level 4 is an output of an AND circuit $330_4$. The AND circuit $330_4$ takes an AND of a modify instruction MC and an output signal of an AND circuit $352_4$ to be described later. The memory model setting register $312_4$ for the interruption level 4 outputs the set contents (the memory model) to the multiplexer 320 as a memory model data $WD_4$ for the interruption level 4.

On the other hand, in the synchronization instruction signal generator 350, a FF $351_2$ for the interruption level 2 is being set corresponding to the interruption level=2. A flag of "1" for the interruption level 2 is set to the FF $351_2$ for the interruption level 2 when the common memory model setting register 313 or the memory model setting register $312_2$ for the interruption level 2 has been modified when the interruption level=2 (or when the memory model setting register $312_3$ for the interruption level 3 has been modified when the interruption level =3). The FF $351_2$ for the interruption level 2 is cleared when the interruption level −1 instruction LC_ has been issued.

As auxiliary circuits of the FF $351_2$ for the interruption level 2, there are provided an AND circuit $352_2$, a NOT circuit 353, an AND circuit $356_2$, an AND circuit $357_2$, an AND circuit $358_2$, a NOT circuit $359_2$, an OR circuit $360_2$, and an AND circuit $361_2$. The AND circuit $352_2$ is a circuit that inputs the interruption level data $WD_L'$ of a two-bit structure. However, a first-bit data of the interruption level data $WD_L'$ is inverted by the NOT circuit 353. The AND circuit $356_2$ is a circuit that inputs an output signal of the AND circuit $352_2$ and the interruption level −1 instruction LC_.

The AND circuit $357_2$ is a circuit that inputs the common modify signal $MF_K$ and an output signal of the AND circuit $352_2$. The AND circuit $358_2$ is a circuit that inputs an output signal of the AND circuit $356_2$ and an output signal of the OR circuit $360_2$. However, the output signal of the AND circuit $356_2$ is inverted by the NOT circuit $359_2$ and is then input to the AND circuit $358_2$.

The OR circuit $360_2$ is a circuit that inputs an output signal of the AND circuit $357_2$, the modify signal $MF_2$ for the interruption level 2, the modify signal $MF_3$ for the interruption level 3, and an output signal of the FF $351_2$ for the interruption level 2. The AND circuit $361_2$ is a circuit that inputs an output signal of the AND circuit $356_2$ and an output signal (a flag for the interruption level 2) of the FF $351_2$ for the interruption level 2.

Further, a FF $351_3$ for the interruption level 3 is being set corresponding to the interruption level=3. A flag of "1" for the interruption level 3 is set to the FF $351_3$ for the interruption level 3 when the common memory model setting register 313 or the memory model setting register $312_3$ for the interruption level 3 has been modified when the interruption level=3 (or when the memory model setting register $312_4$ for the interruption level 4 has been modified at the interruption level=4). The FF $351_3$ for the interruption level 3 is cleared when the interruption level −1 instruction LC_ has been issued.

As auxiliary circuits of the FF $351_3$ for the interruption level 3, there are provided an AND circuit $352_3$, an AND circuit $356_3$, an AND circuit $357_3$, an AND circuit $358_3$, a NOT circuit $359_3$, an OR circuit $360_3$, and an AND circuit $361_3$. The AND circuit $352_3$ is a circuit that inputs the interruption level data $WD_L'$ of a two-bit structure. The AND circuit $356_3$ is a circuit that inputs an output signal of the AND circuit $352_3$ and the interruption level −1 instruction LC_.

The AND circuit $357_3$ is a circuit that inputs the common modify signal $MF_K$ and an output signal of the AND circuit $352_3$. The AND circuit $358_3$ is a circuit that inputs an output signal of the AND circuit $356_3$ and an output signal of the OR circuit $360_3$. However, the output signal of the AND circuit $356_3$ is inverted by the NOT circuit $359_3$ and is then input to the AND circuit $358_3$.

The OR circuit $360_3$ is a circuit that inputs an output signal of the AND circuit $357_3$, the modify signal $MF_3$ for the interruption level 3, the modify signal $MF_4$ for the interruption level, 4, and an output signal of the FF $351_3$ for the interruption level 3. The AND circuit $361_3$ is a circuit that inputs an output signal of the AND circuit $356_3$ and an output signal (a flag for the interruption level 3) of the FF $351_3$ for the interruption level 3.

Further, a FF $351_4$ for the interruption level 4 is being set corresponding to the interruption level=4. A flag of "1" for the interruption level 4 is set to the FF $351_4$ for the interruption level 4 when the common memory model setting register 313 or the memory model setting register $312_4$ for the interruption level 4 has been modified when the interruption level =4. The FF $351_4$ for the interruption level 4 is cleared when the interruption level −1 instruction LC_ has been issued.

As auxiliary circuits of the FF $351_4$ for the interruption level 4, there are provided an AND circuit $352_4$, a NOT circuit 354, a NOT circuit 355, an AND circuit $356_4$, an AND circuit $357_4$, an AND circuit $358_4$, a NOT circuit $359_4$, an OR circuit $360_4$, and an AND circuit $361_4$. The AND circuit $352_4$ is a circuit that inputs the interruption level data $WD_L'$ of a two-bit structure. However, a first-bit data and a second-bit data of the interruption level data $WD_L'$ are inverted by the NOT circuit 355 and the NOT circuit 354 respectively, and are then input to the AND circuit $352_4$. The AND circuit $356_4$ is a circuit that inputs an output signal of the AND circuit $352_4$ and the interruption level −1 instruction LC_.

The AND circuit $357_4$ is a circuit that inputs the common modify signal $MF_K$ and an output signal of the AND circuit $352_4$. The AND circuit $358_4$ is a circuit that inputs an output signal of the AND circuit $356_4$ and an output signal of the OR circuit $360_4$. However, the output signal of the AND circuit $356_4$ is inverted by the NOT circuit $359_4$ and is then input to the AND circuit $358_4$.

The OR circuit $360_4$ is a circuit that inputs an output signal of the AND circuit $357_4$, the modify signal $MF_4$ for the interruption level 4, and an output signal of the FF $351_4$ for the interruption level 4. The AND circuit $361_4$ is a circuit that inputs an output signal of the AND circuit $356_4$ and an output signal (a flag for the interruption level 4) of the FF $351_4$ for the interruption level 4. The OR circuit 362 takes an OR of output signals of the AND circuit $361_2$ to the AND circuit $361_4$ respectively, and outputs a result of the OR to an OR circuit 35 shown in FIG. 10 as a synchronization instruction signal SYNC.

The operation of the third embodiment will be explained below with reference to FIG. 12A to FIG. 12C, FIG. 13A to FIG. 13B and FIG. 14. FIG. 12A is a diagram that shows the contents (the memory model) of various kinds of registers (the common memory model setting register 313, the memory model setting register $312_2$ for the interruption level 2, the memory model setting register $312_3$ for the interruption level 3, and the memory model setting register $312_4$ for the interruption level 4: refer to FIG. 11) when there is no write operation to these registers.

The term of write operation means to write the common modify data $MW_K$, the modify data $MW_2$ for the interruption level 2, the modify data $MW_3$ for the interruption level 3, and the modify data $MW_4$ for the interruption level 4 respectively to the various kinds of registers within the same interruption level.

Figure 11:
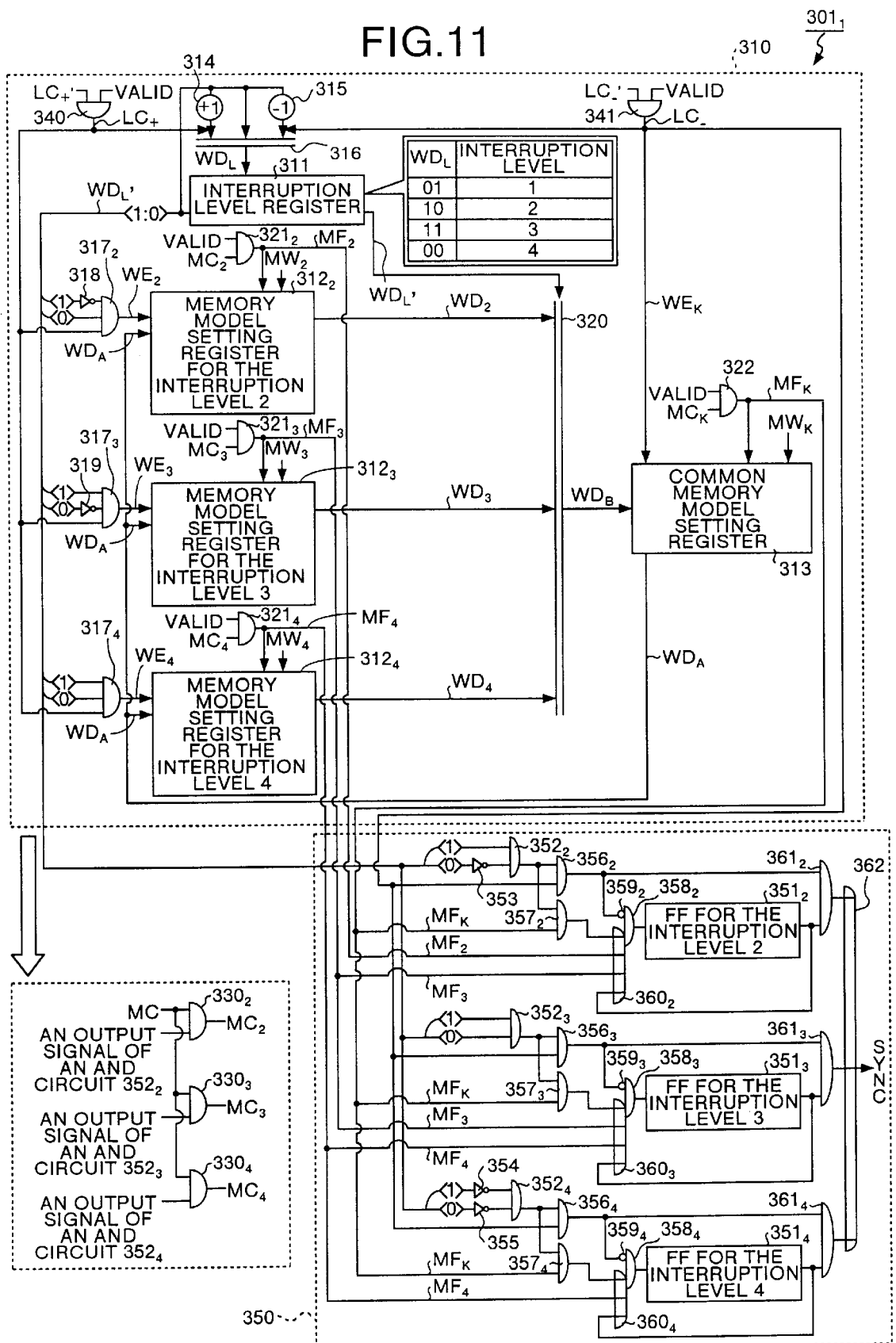
FIG. 11 is a diagram that shows a structure of a synchronization instruction signal generator circuit $301_1$ shown in FIG. 10.
Figure 12B:
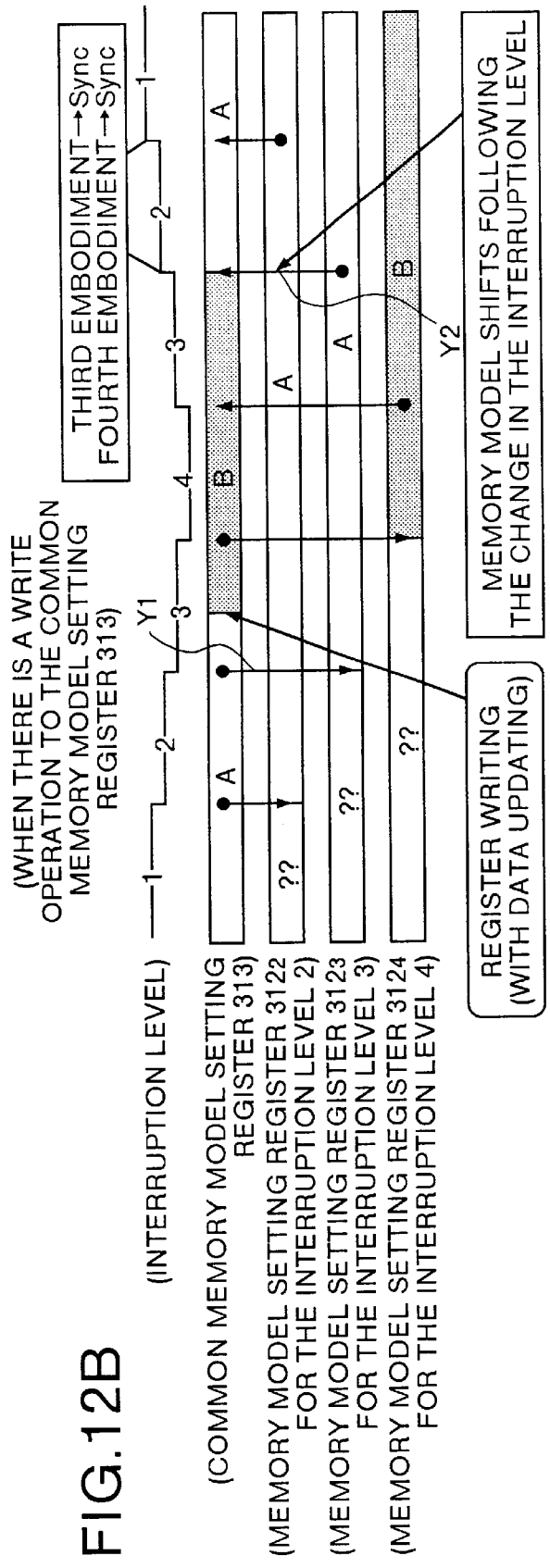

FIG. 12B is a diagram that shows a shift of the set contents (the memory model) of the common memory model setting register 13 (refer to FIG. 11) when there is a write operation to the common memory model setting register 313. However, FIG. 12B shows a case where there has been an updating of data by the write operation, that is, the case where the memory model has been changed.

FIG. 12C is a diagram that shows a shift of the set contents (the memory model) of the common memory model setting register 313 when there is a write operation to the common memory model setting register 313. However, FIG. 12C shows a case where there has been no updating of data by the write operation, that is, the case where the memory model has not been changed.

FIG. 13A is a diagram that shows a shift of the set contents (the memory model) of the common memory model setting register 313 when there is a write operation to the memory model setting register $312_3$ for the interruption level 3 (refer to FIG. 11). However, FIG. 13A shows a case where there has been an updating of data by the write operation, that is, the case where the memory model has been changed.

FIG. 13B is a diagram that shows a shift of the set contents (the memory model) of the common memory model setting register 313 when there is a write operation to the memory model setting register $312_3$ for the interruption level 3 (refer to FIG. 11). However, FIG. 13B shows a case where there has been no updating of data by the write operation, that is, the case where the memory model has not been changed.

First, the operation will be explained with reference to FIG. 12A. In this case, it is assumed that the interruption level data $WD_L'$ corresponding to the interruption level 2 has been held in the interruption level register 311 shown in FIG. 11. Accordingly, the interruption level at this time is the interruption level 2 shown in FIG. 12A.

Further, it is assumed that the valid signal VALID is being output from the AND circuit 38 shown in FIG. 10 to the synchronization instruction signal generator circuit $301_1$ (refer to FIG. 11), the processor $13_1$, and the memory access unit $14_1$. In other words, the processing unit $300_1$ is currently executing an interruption processing at the interruption level 2. Further, it is assumed that the data for the memory model A (refer to FIG. 12A) has been set to the common memory model setting register 313.

Accordingly, the common memory model setting register 313 is currently outputting the memory model data $WD_A$ (=the memory model A) to the memory model setting register $312_2$ for the interruption level 2, the memory model setting register $312_3$ for the interruption level 3, and the memory model setting register $312_4$ for the interruption level 4 respectively.

When an error or like that has occurred in a state that the interruption processing is being executed at the interruption level 2, the interruption level +1 instruction $LC_+'$ shown in FIG. 1 is buffered to the instruction buffer $11_1$ (refer to FIG. 10). At this time, the interruption level data $WD_L'$ ("10") corresponding to the interruption level=2 is being output from the interruption level register 311. When the interruption level +1 instruction $LC_+$ has been issued, the AND circuit $317_3$ outputs the write enable signal $WE_3$ for the interruption level 3 to the memory model setting register $312_3$ for the interruption level 3.

Based on the above operation, the memory model data $WD_A$ (=the memory model A) from the common memory model setting register 313 is written into the memory model setting register $312_3$ for the interruption level 3. In other words, as the interruption level 2 has been changed to the interruption level 3, the contents (the memory model A) of the common memory model setting register 313 are saved in the memory model setting register $312_3$ for the interruption level 3, as shown by an arrow mark $Y_1$ (refer to FIG. 12A)

When the interruption level +1 instruction $LC_+$ has been issued, the interruption level data $WD_L'$ (=the interruption level 2) from the interruption level register 311 is incremented by one by the increment circuit 314. At the same time, the increment circuit 314 is selected by the multiplexer 316.

Accordingly, the interruption level data $WD_L$ (=the interruption level 3) from the increment circuit 314 is written into the interruption level register 311, and the interruption level 2 is changed to the interruption level 3 (arrow mark $Y_1$: refer to FIG. 12A). Thus, the interruption level data $WD_L'$ (=the interruption level 3) of "11" is output from the interruption level register 311. Thereafter, at the interruption level 3, the instructions buffered in the instruction buffer $11_1$ shown in FIG. 10 are executed sequentially according to the memory model A.

When the interruption level −1 instruction $LC_-$ shown in FIG. 11 has been issued during the execution of the interruption processing at the interruption level 3, this interruption level −1 instruction $LC_-$ is input to the common memory model setting register 313 as the common write enable signal $WE_K$. At this time, as the interruption level data $WD_L'$ (=the interruption level 3) has been input to the multiplexer 320, the memory model setting register $312_3$ for the interruption level 3 is being selected.

Accordingly, the multiplexer 320 is outputting the memory model data $WD_3$ for the interruption level 3 (the memory model A) to the common memory model setting register 313 as the memory model data $WD_B$. Then, the memory model data $WD_B$ (=the memory model A) is written into the common memory model setting register 313. In other words, when the interruption level 3 has returned to the interruption level 2 (arrow mark $Y_2$: refer to FIG. 12A), the contents (the memory model A) of the memory model setting register $312_3$ for the interruption level 3 are written back into the common memory model setting register 313.

When the interruption level −1 instruction $LC_-$ has been issued, the interruption level data $WD_L'$ (=the interruption level 3) from the interruption level register 311 is decremented by one by the decrement circuit 315. At the same time, the decrement circuit 315 is selected by the multiplexer 316. Accordingly, the interruption level data $WD_L$ (=the interruption level 2) from the decrement circuit 315 is written into the interruption level register 311, and the interruption level 3 is changed to the interruption level 2 (arrow mark $Y_2$: refer to FIG. 12A).

In the example shown in FIG. 12A, when there has been no change in the contents (the memory model) of the various kinds of registers, the synchronization instruction signal SYNC of "1" shown in FIG. 11 is not generated. Therefore, the synchronization control is not carried out. As a result, even if the interruption level has been changed, there occurs no waiting for the execution of instructions, and instructions are issued sequentially.

Next, with reference to FIG. 12B, there will be explained a case where a synchronization control is carried out when the interruption level 3 has returned to the interruption level 2 when there is a write operation to the common memory model setting register 313 in the state of the interruption level 3. When an error or like that has occurred in a state that the interruption processing is being executed at the interruption level 2 shown in FIG. 12B, the interruption level +1 instruction $LC_+'$ shown in FIG. 11 is buffered to the instruction buffer $11_1$ (refer to FIG. 10).

At this time, the interruption level data $WD_L'$ ("10") corresponding to the interruption level=2 is being output from the interruption level register 311. When the interruption level +1 instruction $LC_+$ has been issued, the AND circuit $317_3$ outputs the write enable signal $WE_3$ for the interruption level 3 to the memory model setting register $312_3$ for the interruption level 3.

Based on the above operation, the memory model data $WD_A$ (=the memory model A) from the common memory model setting register 313 is written into the memory model setting register $312_3$ for the interruption level 3. In other words, as the interruption level 2 has been changed to the interruption level 3, the contents (the memory model A) of the common memory model setting register 313 are saved in the memory model setting register $312_3$ for the interruption level 3, as shown by an arrow mark $Y_1$ (refer to FIG. 12B).

When the interruption level +1 instruction $LC_+$ has been issued, the interruption level data $WD_L'$ (=the interruption level 2) from the interruption level register 311 is incremented by one by the increment circuit 314. At the same time, the increment circuit 314 is selected by the multiplexer 316.

Accordingly, the interruption level data $WD_L$ (=the interruption level 3) from the increment circuit 314 is written into the interruption level register 311, and the interruption level 2 is changed to the interruption level 3 (arrow mark $Y_1$: refer to FIG. 12B). Thereafter, at the interruption level 3, the instructions buffered in the instruction buffer $11_1$ shown in FIG. 10 are executed sequentially according to the memory model A.

It is assumed that a write operation (with an updating of data) has been carried out to the common memory model setting register 313 shown in FIG. 12B during the execution of the interruption processing at the interruption level 3. In other words, in this case, the common modify instruction $MC_K$ shown in FIG. 11 is issued, and the common modify data $MW_K$ (the memory model B: refer to FIG. 12B) is input to the common memory model setting register 313.

Based on the above operation, the AND circuit 322 outputs the common modify signal $MF_K$. At the same time, the common modify data $MW_K$ (=the memory model B) is written into the common memory model setting register 313. Accordingly, as shown in FIG. 12B, at the interruption level 3, the contents of the common memory model setting register 313 have been updated (modified) from the memory model A to the memory model B.

The synchronization instruction signal generator 350 takes an AND of the common modify signal $MF_K$ and the output signal from the AND circuit $352_3$. As a result, the output signal of the AND circuit $357_3$ becomes "1". As the output signal of the NOT circuit $359_3$ is also "1", the output signal of the AND circuit $358_3$ becomes "1". Accordingly, the flag "1" for the interruption level 3 is set to the FF $351_3$ for the interruption level 3. In this case, the flag "1" for the interruption level 3 means that there has been a write operation in the common memory model setting register 313 at the interruption level 3. When the interruption level −1 instruction $LC_-$ shown in FIG. 11 has been issued during the execution of the interruption processing at the interruption level 3, this interruption level −1 instruction $LC_-$ is input to the common memory model setting register 313 as the common write enable signal $WE_K$. At this time, as the interruption level data $WD_L'$ (=the interruption level 3) has been input to the multiplexer 320, the memory model setting register $312_3$ for the interruption level 3 is being selected.

Accordingly, the multiplexer 320 is outputting the memory model data $WD_3$ for the interruption level 3 (the memory model A) to the common memory model setting register 313 as the memory model data $WD_B$. Then, the memory model data $WD_B$ (=the memory model A) is written into the common memory model setting register 313. In other words, when the interruption level 3 has returned to the interruption level 2 (arrow mark $Y_2$: refer to FIG. 12B), the contents (the memory model A) of the memory model setting register $312_3$ for the interruption level 3 are written into the common memory model setting register 313.

When the interruption level −1 instruction $LC_-$ has been issued, the interruption level data $WD_L'$ (=the interruption level 3) from the interruption level register 311 is decremented by one by the decrement circuit 315. At the same time, the decrement circuit 315 is selected by the multiplexer 316. Accordingly, the interruption level data $WD_L$ (=the interruption level 2) from the decrement circuit 315 is written into the interruption level register 311, and the interruption level 3 is changed to the interruption level 2 (arrow mark $Y_2$: refer to FIG. 12B).

When the interruption level −1 instruction $LC_-$ has been issued, the output signal of the AND circuit $356_3$ also becomes "1". As a result, the output signal of the AND circuit $361_3$ becomes "1", and the synchronization instruction signal SYNC of "1" is output to the OR circuit 35 shown in FIG. 10.

The synchronization control (Sync: FIG. 12B) is carried out in a similar manner to that as described above. As shown in FIG. 14, the synchronization control S is carried out until when the execution of the instructions A to C by pipeline processing at the interruption level 3 has been finished, even if the interruption level 3 has returned to the interruption level 2. When the execution of all the instructions A to C has been finished, the output of the busy signal BUSY shown in FIG. 10 stops. Then, the output signal of the AND circuit 34 and the output signal of the OR circuit 35 become "0". As a result, the instruction restriction signal STOP also becomes "0", and the output of the synchronization instruction signal SYNC stops.

In the example shown in FIG. 12B, when there has been a write operation to the common memory model setting register 313 during a period while the interruption level has not been changed, the synchronization instruction signal SYNC of "1" shown in FIG. 11 is generated. As a result, the synchronization control is carried out.

According to the third embodiment, when there has been a write operation to the common memory model setting register 313 and also when there has been no data change as shown by the arrow mark $Y_2$ in FIG. 12C, a synchronization control (Sync) is carried out in a similar manner to that as explained with reference to FIG. 12B. The case that there has been a write operation and also there has been no data change means the case where the common modify data $MW_K$ corresponding to the same contents (the memory model) as the contents (the memory model) already set to the common memory model setting register 313 shown in FIG. 11 has been written into the common memory model setting register 313. The synchronization control is not carried out when there has been no write operation.

Further, according to the third embodiment, when there has been a write operation to the memory model setting register $312_3$ for the interruption level 3 at the interruption level 3 and also when there has been a data updating as shown by the arrow mark $Y_2$ in FIG. 13A (or when there has been a write operation to the memory model setting register $312_2$ for the interruption level 2 at the interruption level 2 and also when there has been a data updating as shown by an arrow mark $Y_3$ in FIG. 13A), a synchronization control (Sync) is carried out in a similar manner to that as explained with reference to FIG. 12B. The synchronization control is not carried out when there has been no write operation.

Further, according to the third embodiment, when there has been a write operation to the memory model setting register $312_3$ for the interruption level 3 and also when there has been no data updating as shown by the arrow mark $Y_2$ in FIG. 13B, a synchronization control (Sync) is carried out in a similar manner to that as explained with reference to FIG. 13A. The case that there has been a write operation and also there has been no data updating means the case where the modify data $MW_3$ for the interruption level 3 corresponding to the same contents (the memory model) as the contents (the memory model) already set to the memory model setting register $312_3$ for the interruption level 3 shown in FIG. 11 has been written into the memory model setting register $312_3$ for the interruption level 3. The synchronization control is not carried out when there has been no write operation.

As explained above, according to the third embodiment, the synchronization control is carried out only when there has been a write operation to the common memory model setting register 313, the memory model setting register $312_2$ for the interruption level 2, the memory model setting register $312_3$ for the interruption level 3, and the memory model setting register $312_4$ for the interruption level 4, at the same interruption level. Therefore, as compared with the conventional case where the synchronization control is carried out unconditionally when the interruption level has been changed, it is possible to reduce the number of the synchronization control. As a result, it is possible to improve the processing capacity.

Figure 15:
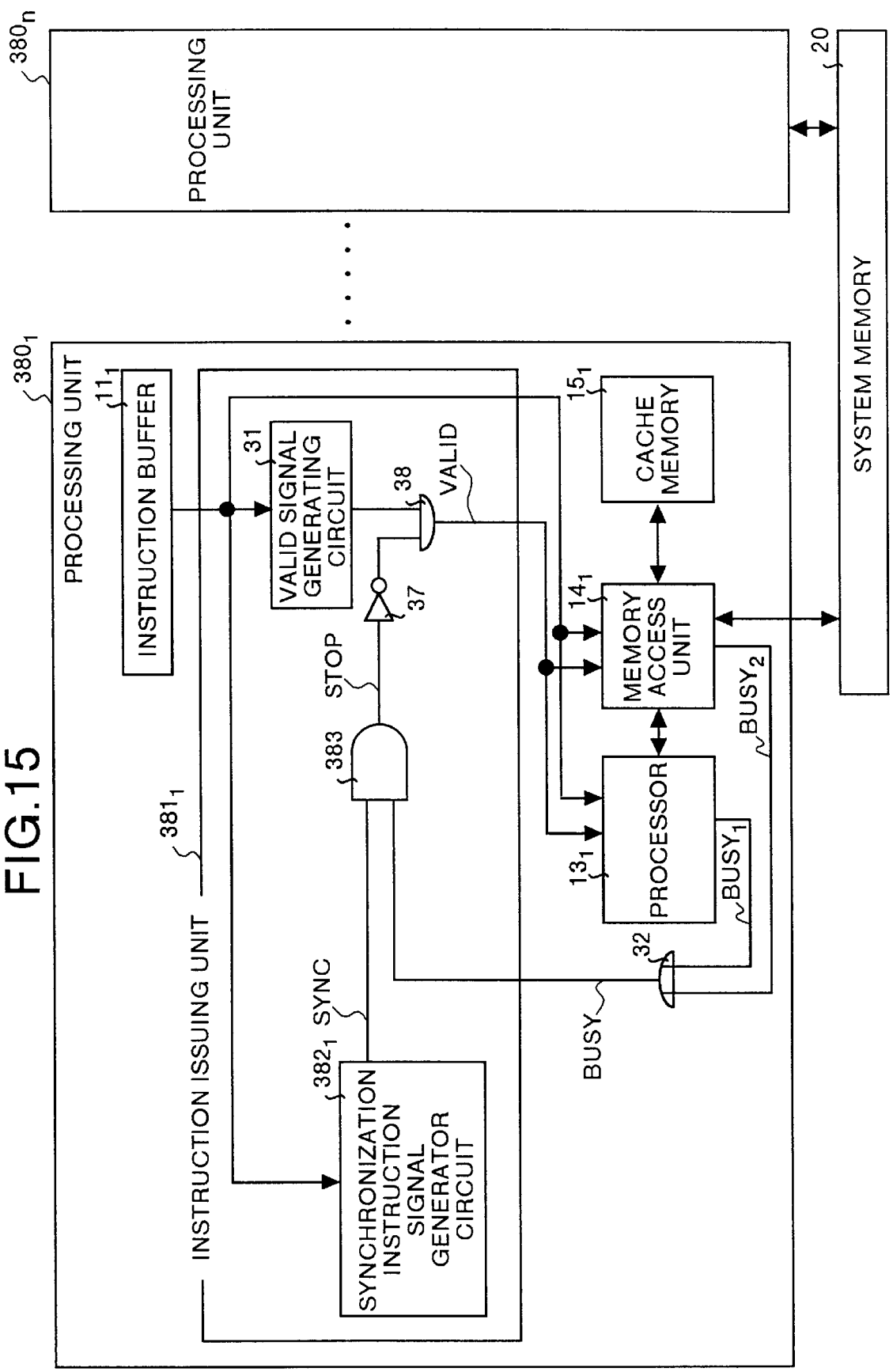
FIG. 15 is a block diagram that shows a structure of a modification of the third embodiment.

As a modification of the third embodiment, it is also possible to use an AND circuit 383 shown in FIG. 15 in place of the AND circuit 34, the OR circuit 35 and the FF 36 shown in FIG. 10. In FIG. 15, the AND circuit 383 takes an AND of the busy signal BUSY and the synchronization instruction signal SYNC, and produces an output signal of the AND circuit 383 is input to a NOT circuit 37. In FIG. 15, a synchronization instruction signal generator circuit $382_1$ is used in place of the synchronization instruction signal generator circuit $301_1$ shown in FIG. 10.

In FIG. 15, portions corresponding to those in FIG. 10 are attached with identical reference numbers. However, for the sake of convenience, processing units $380_1$ to $380_n$ are shown in FIG. 15 as processing units corresponding to the processing units $300_1$ to $300_n$ shown in FIG. 10. Similarly, an instruction issuing unit $381_1$ is shown in FIG. 15 as a unit corresponding to the instruction issuing unit $12_1$ shown in FIG. 10.

Figure 16:
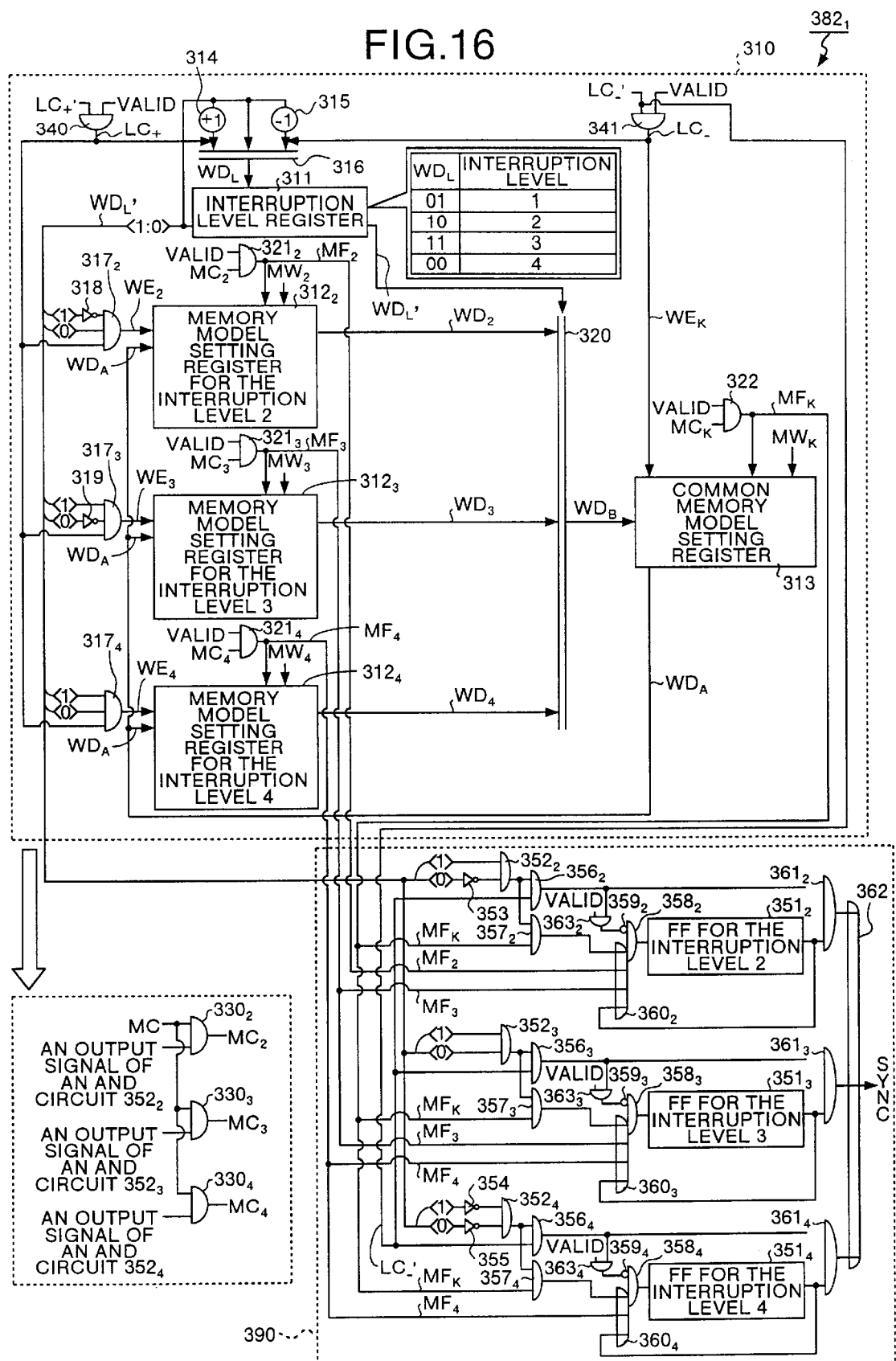
FIG. 16 is a diagram that shows a structure of a synchronization instruction signal generator circuit $382_1$ shown in FIG. 15.

The instruction issuing unit $381_1$ has a structure as shown in FIG. 16. In FIG. 16, portions corresponding to those in FIG. 11 are attached with identical reference numbers. In FIG. 16, an interruption level −1 instruction LC_' is being input to an AND circuit $356_2$ to an AND circuit $356_4$. FIG. 16 also includes an AND circuit $363_2$ to an AND circuit $363_4$. The AND circuit $363_2$ takes an AND of an output signal of the AND circuit $356_2$ and a valid signal VALID (refer to FIG. 16). The AND circuit $363_3$ takes an AND of an output signal of the AND circuit $356_3$ and a valid signal VALID (refer to FIG. 16). The AND circuit $363_4$ takes an AND of an output signal of the AND circuit $356_4$ and a valid signal VALID (refer to FIG. 16).

Figure 17:
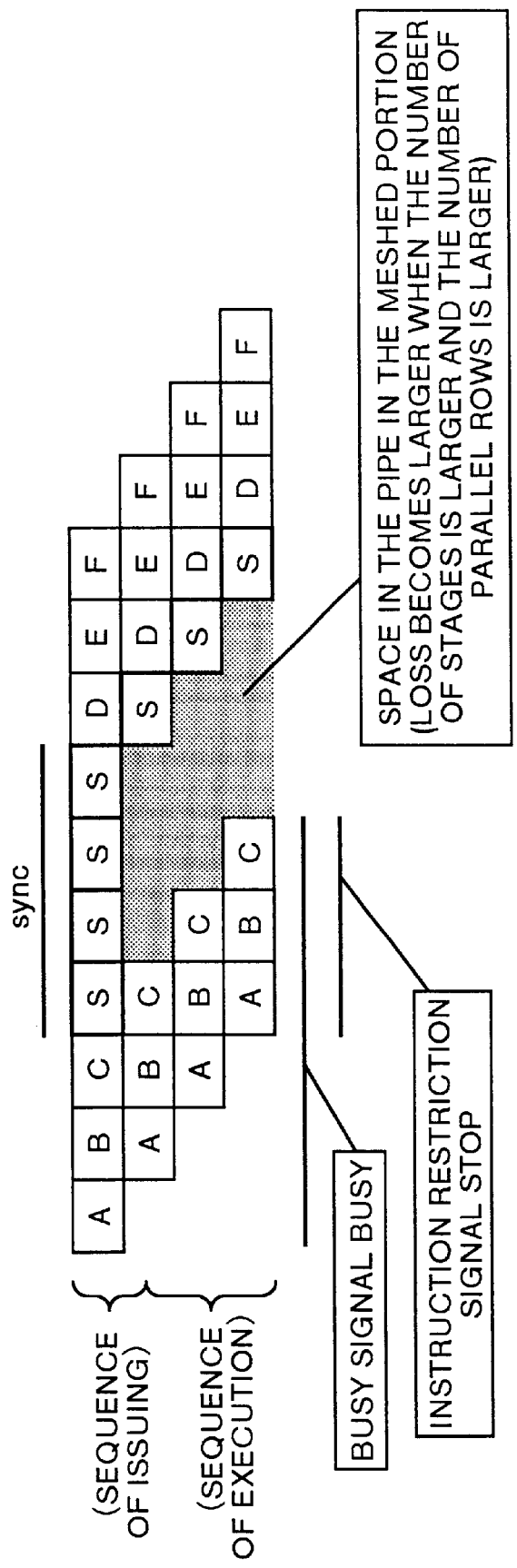
FIG. 17 is a block diagram that explains the operation of the modification of the third embodiment.

In the modification of the third embodiment, the output signal of the AND circuit 383 shown in FIG. 15 is used as an instruction restriction signal STOP, and the interruption level −1 instruction LC_' is input to the AND circuit $356_2$ to the AND circuit $356_4$ as shown in FIG. 16. Therefore, the synchronization control S is carried out as shown in FIG. 17. The basic operation of the modification of the third embodiment is the same as those described with reference to FIG. 12A to FIG. 12C and FIG. 13A and FIG. 13B.

In the above third embodiment, there has been explained the case where, when there has been a write operation to the common memory model setting register 313, a synchronization control is carried out when the interruption level 3 has returned to the interruption level 2, regardless of the presence or absence of a data updating when the interruption level=3, or regardless of the presence or absence of a change in the memory model, as shown in FIG. 12C.

Similarly, there has been explained the case where, when there has been a write operation to the memory model setting register $312_3$ for the interruption level 3, a synchronization control is carried out when the interruption level 3 has returned to the interruption level 2 (or when the interruption level 2 has returned to the interruption level 1), regardless of the presence or absence of a data updating, or regardless of the presence or absence of a change in the memory model, as shown in FIG. 13B. However, when there has been no updating of data, there has been no change in the memory model. Therefore, there occurs no malfunction in this case. A fourth embodiment explained below is based on the above point.

Figure 18:
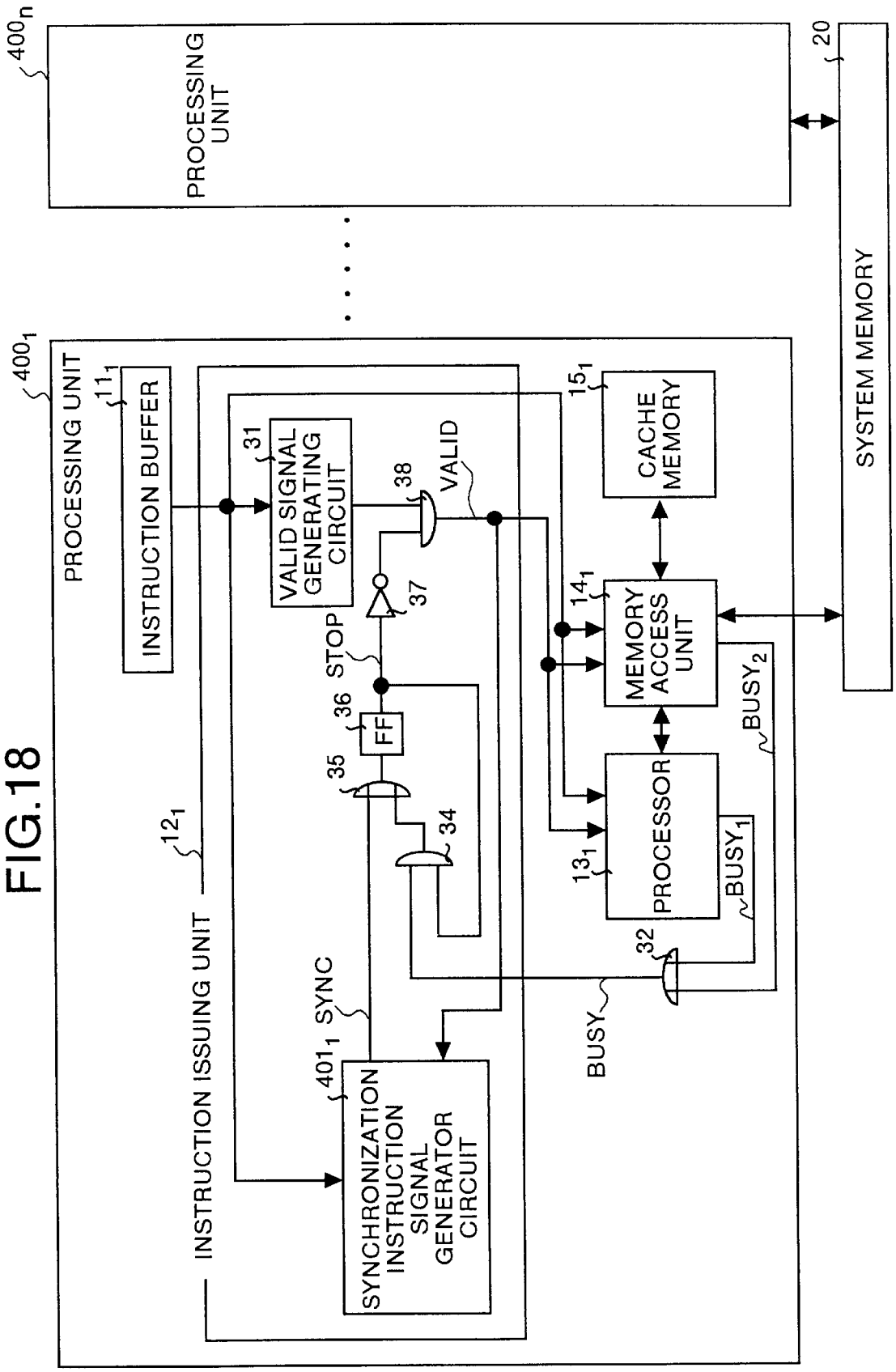
FIG. 18 is a block diagram that shows a structure of a fourth embodiment relating to the present invention.

FIG. 18 is a block diagram that shows a structure of a fourth embodiment relating to the present invention. In FIG. 18, portions corresponding to those in FIG. 10 are attached with identical reference numbers, and their explanation will be omitted. In FIG. 18, there are provided processing units $400_1$ to $400_n$ in place of the processing units $300_1$ to $300_n$ shown in FIG. 10, and there is provided a synchronization instruction signal, generator circuit $401_1$ in place of the synchronization instruction signal generator circuit $301_1$ shown in FIG. 10.

Each of the processing units $400_1$ to $400_n$ shown in FIG. 18 makes access to a system memory 20 (or a cache memory $15_1$) according to load/store instructions, thereby to execute loading/storing of data. Further, each of the processing units $400_1$ to $400_n$ executes various kinds of processing based on processing instructions such as an addition instruction and a subtraction instruction. The synchronization instruction signal generator circuit $401_1$ generates a synchronization instruction signal SYNC.

Figure 19:
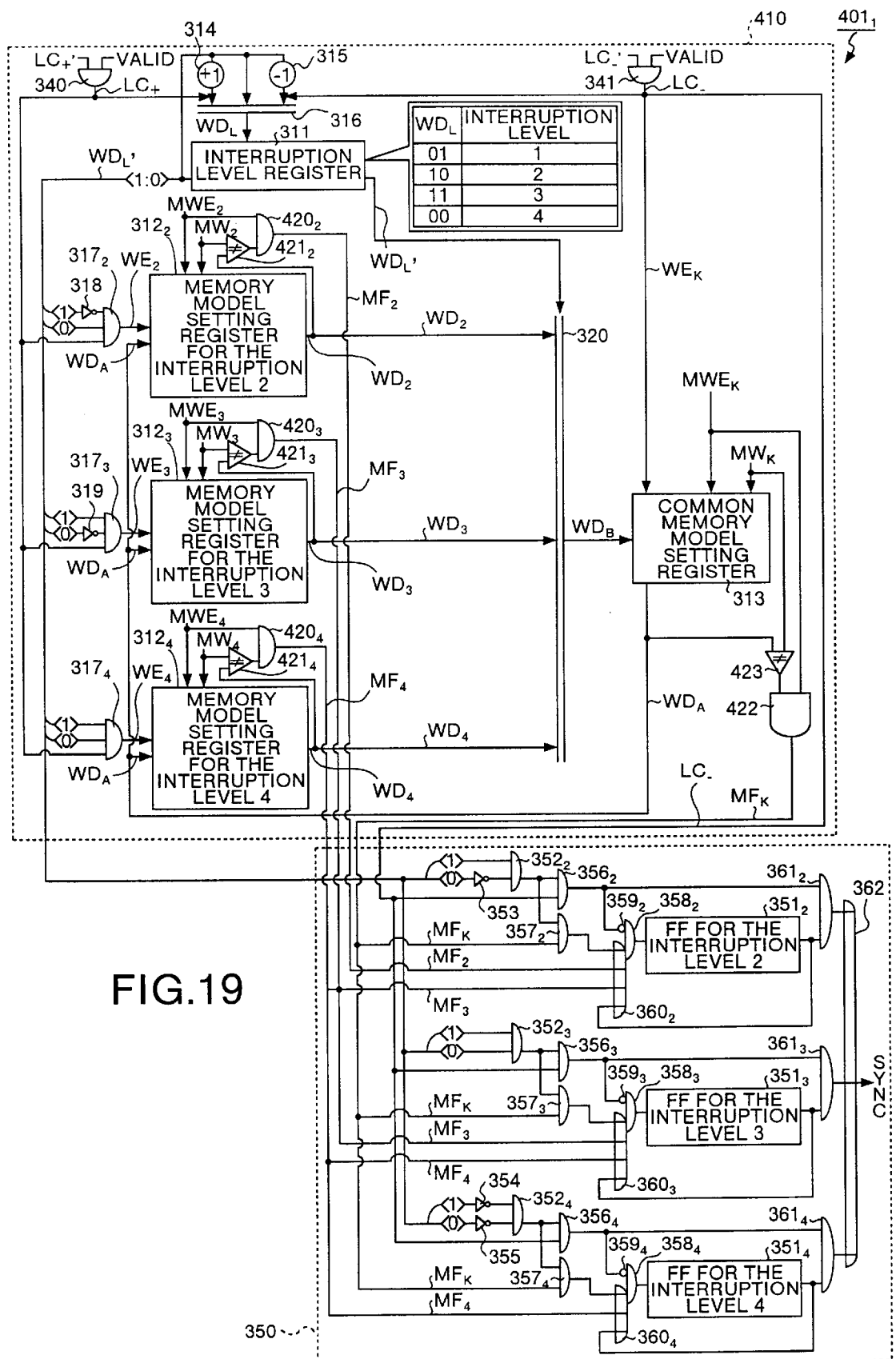
FIG. 19 is a diagram that shows a structure of a synchronization instruction signal generator circuit $401_1$ shown in FIG. 17.

The structure of the synchronization instruction signal generator circuit $401_1$ shown in FIG. 18 will be explained in detail with reference to FIG. 19. In FIG. 19, portions corresponding to those in FIG. 11 are attached with identical reference numbers. In FIG. 19, there is provided an interruption level/memory model setting register 410 in place of the interruption level/memory model setting register 310 shown in FIG. 11.

In the interruption level/memory model setting register 410, there are provided an AND circuit $420_2$ to an AND circuit $420_4$ and non-coincidence detectors $421_2$ to $421_4$ in place of the AND circuits $321_2$ to $321_4$ shown in FIG. 11. Further, in the interruption level/memory model setting register 410, there are provided an AND circuit 422 and a non-coincidence detector 423 in place of the AND circuit 322 shown in FIG. 11.

The non-coincidence detector $421_2$ is a circuit that detects a non-coincidence between a memory model data $WD_2$ for the interruption level 2 and a modify data $MW_2$ for the interruption level 2. When these data do not coincide with each other, the non-coincidence detector $421_2$ outputs a signal 1. In other words, the non-coincidence detector $421_2$ is a circuit that detects a data updating when a write operation for writing the modify data $MW_2$ for the interruption level 2 has been done to a memory model setting register $312_2$ for the interruption level 2.

The AND circuit $420_2$ takes an AND of a modify data write enable signal $MWE_2$ for the interruption level 2 and an output signal of the non-coincidence detector $421_2$. When both signals are "1", the AND circuit $420_2$ outputs a modify signal $MF_2$ for the interruption level 2. The modify data write enable signal $MWE_2$ for the interruption level 2 is a signal that permits the writing of the modify data $MW_2$ for the interruption level 2 to the memory model setting register $312_2$ for the interruption level 2.

The non-coincidence detector $421_3$ is a circuit that detects a non-coincidence between a memory model data $WD_3$ for the interruption level 3 and a modify data $MW_3$ for the interruption level 3. When these data do not coincide with each other, the non-coincidence detector $421_3$ outputs a signal 1. In other words, the non-coincidence detector $421_3$ is a circuit that detects a data updating when a write operation for writing the modify data $MW_3$ for the interruption level 3 has been done to a memory model setting register $312_3$ for the interruption level 3.

The AND circuit $420_3$ takes an AND of a modify data write enable signal $MWE_3$ for the interruption level 3 and an output signal of the non-coincidence detector $421_3$. When both signals are "1", the AND circuit $420_3$ outputs a modify signal $MF_3$ for the interruption level 3. The modify data write enable signal $MWE_3$ for the interruption level 3 is a signal that permits the writing of the modify data $MW_3$ for the interruption level 3 to the memory model setting register $312_3$ for the interruption level 3.

The non-coincidence detector $421_4$ is a circuit that detects a non-coincidence between a memory model data $WD_4$ for the interruption level 4 and a modify data $MW_4$ for the interruption level 4. When these data do not coincide with each other, the non-coincidence detector $421_4$ outputs a signal 1. In other words, the non-coincidence detector $421_4$ is a circuit that detects a data updating when a write operation for writing the modify data $MW_4$ for the interruption level 4 has been done to a memory model setting register $312_4$ for the interruption level 4.

The AND circuit $420_4$ takes an AND of a modify data write enable signal $MWE_4$ for the interruption level 4 and an output signal of the non-coincidence detector $421_4$. When both signals are "1", the AND circuit $420_4$ outputs a modify signal $MF_4$ for the interruption level 4. The modify data write enable signal $MWE_4$ for the interruption level 4 is a signal that permits the writing of the modify data $MW_4$ for the interruption level 4 to the memory model setting register $312_4$ for the interruption level 4.

The non-coincidence detector 423 is a circuit that detects a non-coincidence between a memory model data $WD_A$ and a common modify data $MW_K$. When these data do not coincide with each other, the non-coincidence detector 423 outputs a signal 1. In other words, the non-coincidence detector 423 is a circuit that detects a data updating when a write operation for writing the common modify data $MW_K$ has been done to a common memory model setting register 313.

The AND circuit 422 takes an AND of a common modify data write enable signal $MWE_K$ and an output signal of the non-coincidence detector 423. When both signals are "1", the AND circuit 422 outputs a common modify signal $MF_K$. The common modify data write enable signal $MWE_K$ is a signal that permits the writing of the common modify data $MW_K$ to the common memory model setting register 313.

The operation of the fourth embodiment will be explained next with reference to FIG. 12B, FIG. 12C, FIG. 13A, FIG. 13B and FIG. 20. First, with reference to FIG. 12B, there will be explained a case where a synchronization control is carried out when the interruption level 3 has returned to the interruption level 2 when there is a write operation to the common memory model setting register 313 in the state of the interruption level 3. When an error or the like has occurred in a state that the interruption processing is being executed at the interruption level 2 shown in FIG. 12B, an interruption level +1 instruction $LC_+'$ shown in FIG. 19 is buffered to an instruction buffer $11_1$ (refer to FIG. 18).

At this time, the interruption level data $WD_L'$ ("10") corresponding to the interruption level=2 is being output from the interruption level register 311. When the interruption level +1 instruction $LC_+$ has been issued, the AND circuit $317_3$ outputs the write enable signal $WE_3$ for the interruption level 3 to the memory model setting register $312_3$ for the interruption level 3.

Based on the above operation, the memory model data $WD_A$ (=the memory model A) from the common memory model setting register 313 is written into the memory model setting register $312_3$ for the interruption level 3. In other words, as the interruption level 2 has been changed to the interruption level 3, the contents (the memory model A) of the common memory model setting register 313 are saved in the memory model setting register $312_3$ for the interruption level 3, as shown by the arrow mark $Y_1$ (refer to FIG. 12B).

When the interruption level +1 instruction $LC_+$ has been issued, the interruption level data $WD_L'$ (=the interruption level 2) from the interruption level register 311 is incremented by one by the increment circuit 314. At the same time, the increment circuit 314 is selected by the multiplexer 316.

Accordingly, the interruption level data $WD_L$ (=the interruption level 3) from the increment circuit 314 is written into the interruption level register 311, and the interruption level 2 is changed to the interruption level 3 (arrow mark $Y_1$: refer to FIG. 12B). Thereafter, at the interruption level 3, the instructions buffered in the instruction buffer $11_1$ shown in FIG. 18 are executed sequentially according to the memory model A.

It is assumed that a write operation (with an updating of data) has been carried out to the common memory model setting register 313 shown in FIG. 12B during the execution of the interruption processing at the interruption level 3. In other words, in this case, the common modify data write enable signal $MWE_K$ shown in FIG. 19 is input to the common memory model setting register 313 and the AND circuit 422. At the same time, the common modify data $MW_K$ (=the memory model B: refer to FIG. 12B) is input to the common memory model setting register 313.

Accordingly, the common modify data $MW_K$ (=the memory model B) is written into the common memory model setting register 313. In this case, as shown in FIG. 12B, at the interruption level 3, the contents of the common memory model setting register 313 have been updated (modified) from the memory model A to the memory model B.

As the memory model data $WD_A$ (the memory model A) and the common modify data $MW_K$ (the memory model B) do not coincide with each other, the non-coincidence detector 423 outputs a signal of "1". Thus, the AND circuit 422 outputs a common modify signal $MF_K$.

The synchronization instruction signal generator 350 takes an AND of the common modify signal $MF_K$ and the output signal from the AND circuit $352_3$. As a result, the output signal of the AND circuit $357_3$ becomes "1". As the output signal of the NOT circuit $359_3$ is also "1", the output signal of the AND circuit $358_3$ becomes "1". Accordingly, the flag "1" for the interruption level 3 is set to the FF $351_3$ for the interruption level 3.

When the interruption level −1 instruction LC_ shown in FIG. 19 has been issued during the execution of the interruption processing at the interruption level 3, this interruption level −1 instruction LC_ is input to the common memory model setting register 313 as the common write enable signal $WE_K$. Then, based on the operation as explained in the third embodiment, the memory model data $WD_B$ (=the memory model A) is written into the common memory model setting register 313. In other words, when the interruption level 3 has returned to the interruption level 2 (arrow mark $Y_2$: refer to FIG. 12B), the contents (the memory model A) of the memory model setting register $312_3$ for the interruption level 3 are written into the common memory model setting register 313.

When the interruption level −1 instruction LC_ has been issued, the interruption level data $WD_L'$ (=the interruption level 3) from the interruption level register 311 is decremented by one by the decrement circuit 315. At the same time, the decrement circuit 315 is selected by the multiplexer 316. Accordingly, the interruption level data $WD_L$ (=the interruption level 2) from the decrement circuit 315 is written into the interruption level register 311, and the interruption level 3 is changed to the interruption level 2 (arrow mark $Y_2$: refer to FIG. 12B).

When the interruption level −1 instruction LC_ has been issued, the output signal of the AND circuit $356_3$ also becomes "1". As a result, the output signal of the AND circuit $361_3$ becomes "1", and the synchronization instruction signal SYNC of "1" is output to the OR circuit 35 shown in FIG. 18.

Figure 20:
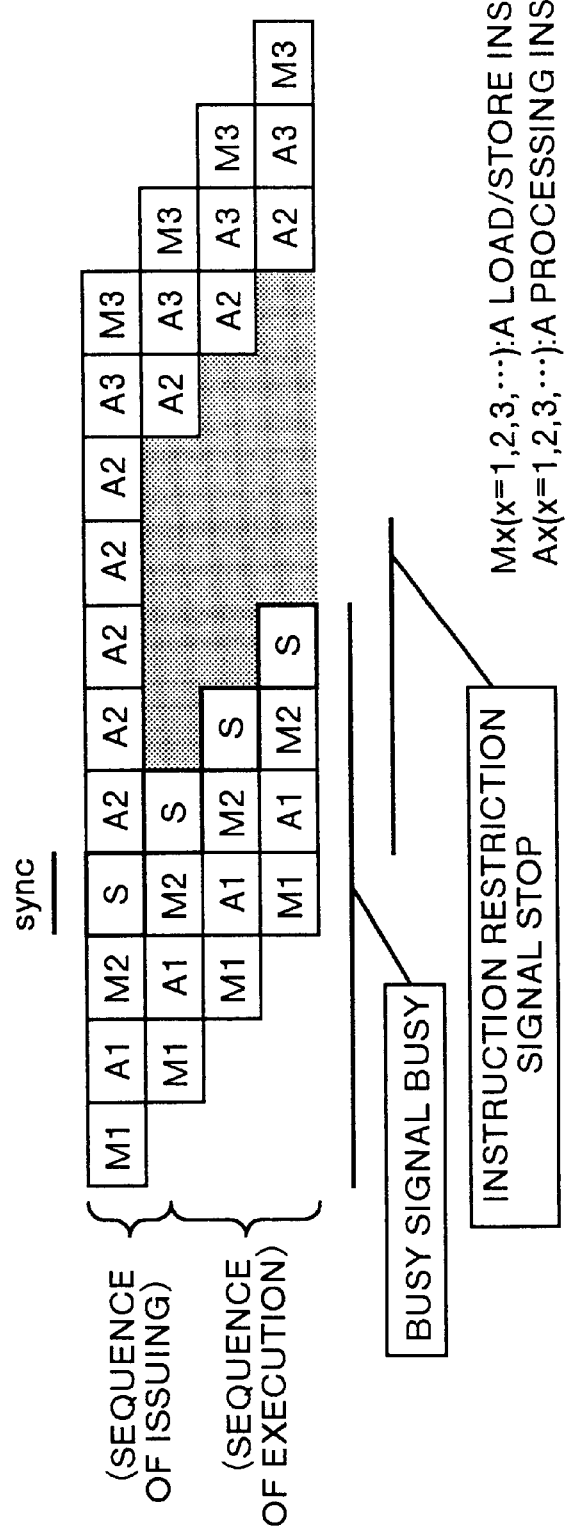
FIG. 20 is a diagram that explains the operation of the fourth embodiment.

Based on the above operation, the synchronization control (Sync: FIG. 12B) is carried out in a similar manner to that as described in the third embodiment. As shown in FIG. 20, the synchronization control S is carried out until when the execution of all the instructions by pipeline processing at the interruption level 3 has been finished, even if the interruption level 3 has returned to the interruption level 2. When the execution of all the instructions has been finished, the output of the busy signal BUSY shown in FIG. 18 stops. Then, the output signal of the AND circuit 34 and the output signal of the OR circuit 35 become "0". As a result, the instruction restriction signal STOP also becomes "0", and the output of the synchronization instruction signal SYNC stops.

In the example shown in FIG. 12B, when there has been a write operation to the common memory model setting register 313 during a period while the interruption level has not been changed, the synchronization instruction signal SYNC of "1" shown in FIG. 19 is generated. As a result, the synchronization control is carried out. The above operation is carried out in a similar manner to that as explained in the third embodiment.

According to the fourth embodiment, when there has been a write operation to the common memory model setting register 313 and also when there has been no data change as shown by the arrow mark $Y_2$ in FIG. 12C, a synchronization control is not carried out (=No Sync). This point is different from the third embodiment.

When there has been a write operation (no data updating) to the common memory model setting register 313 during the execution of an interruption processing at the interruption level 3 as shown in FIG. 12C, the common modify data write enable signal $MWE_K$ shown in FIG. 19 is input to the common memory model setting register 313 and the AND circuit 422. At the same time, the common modify data $MW_K$ (=the memory model A: refer to FIG. 12C) is input to the common memory model setting register 313.

The common modify data $MW_K$ (=the memory model A) is then written into the common memory model setting register 313. In this case, although the data is written into the common memory model setting register 313, the contents of the common memory model setting register 313 at the interruption level 3 are not updated as shown in FIG. 12C.

Further, as the memory model data $WD_A$ (the memory model A) coincides with the common modify data $MW_K$ (the memory model A), the non-coincidence detector 423 outputs a signal "0". Accordingly, the AND circuit 422 does not output the common modify signal $MF_K$.

In the example of the fourth embodiment shown in FIG. 12C, the synchronization instruction signal SYNC of "1" shown in FIG. 19 is not generated when there has been no data updating in the common memory model setting register 313 during a period while there is no change in the interruption level. Therefore, the synchronization control is not carried out. As a result, there arises no waiting for the execution of instructions even if there has been a change in the interruption level. Instructions are executed continuously in this case.

Further, in the fourth embodiment, when there has been a write operation to the memory model setting register $312_3$ for the interruption level 3 at the interruption level 3 and also when there has been a data updating, as shown by the arrow mark $Y_2$ in FIG. 13A, the synchronization control (Sync) is carried out in a similar manner to that of the third embodiment. When there is no write operation, the synchronization control is not carried out.

Further, in the fourth embodiment, when there has been a write operation to the memory model setting register $312_3$ for the interruption level 3 and also when there has been no data updating, as shown by the arrow mark $Y_2$ in FIG. 13B, the synchronization control is not carried out (=No Sync) in a similar manner to that as described with reference to FIG. 12C.

In other words, when there has been a write operation (no data updating) to the memory model setting register $312_3$ for the interruption level 3 during the execution of an interruption processing at the interruption level 3 shown in FIG. 13B, the modify data write enable signal $MWE_3$ at the interruption level 3 shown in FIG. 19 is input to the memory model setting register $312_3$ for the interruption level 3 and the AND circuit $420_3$. At the same time, the modify data $MW_3$ for the interruption level 3 (=the memory model A: refer to FIG. 13B) is input to the memory model setting register $312_3$ for the interruption level 3.

The modify data $MW_3$ for the interruption level 3 (=the memory, model A) is then written into the memory model setting register $312_3$ for the interruption level 3. In this case, although the data is written into the memory model setting register $312_3$ for the interruption level 3, the contents of the memory model setting register $312_3$ for the interruption level 3 at the interruption level 3 are not updated as shown in FIG. 13B.

Further, as the memory model data $WD_3$ for the interruption level 3 (the memory model A) coincides with the modify data $MW_3$ for the interruption level 3 (the memory model A), the non-coincidence detector $421_3$ outputs a signal "0". Accordingly, the AND circuit $420_3$ does not output the modify signal $MF_3$ for the interruption level 3.

In the example of the fourth embodiment shown in FIG. 13B, the synchronization instruction signal SYNC of "1" shown in FIG. 19 is not generated when there has been no data updating in the memory model setting register $312_3$ for the interruption level 3 during a period while there is no change in the interruption level. Therefore, the synchronization control is not carried out. As a result, there arises no waiting for the execution of instructions even if there has been a change in the interruption level. Instructions are executed continuously in this case.

As explained above, according to the fourth embodiment, the synchronization control is carried out only when there has been a write operation to the common memory model setting register 313, the memory model setting register $312_2$ for the interruption level 2, the memory model setting register $312_3$ for the interruption level 3, and the memory model setting register $312_4$ for the interruption level 4, at the same interruption level, and also when there has been a data updating. Therefore, as compared with the conventional case where the synchronization control is carried out unconditionally when the interruption level has been changed, it is possible to further reduce the number of the synchronization control. As a result, it is possible to substantially improve the processing capacity.

Figure 21:
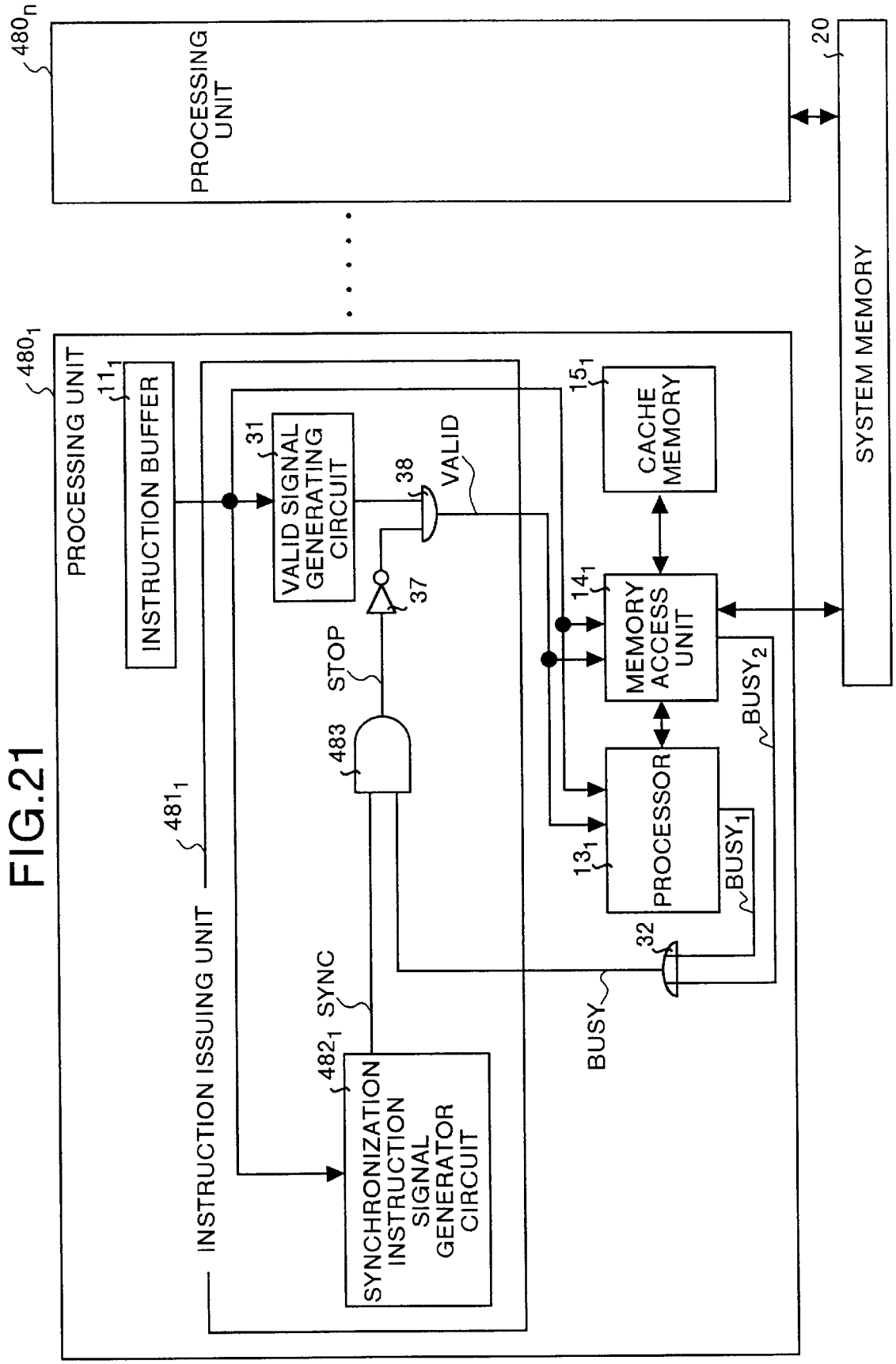
FIG. 21 is a block diagram that shows a structure of a modification of the fourth embodiment.

As a modification of the fourth embodiment, it is also possible to use an AND circuit 483 shown in FIG. 21 in place of the AND circuit 34, the OR circuit 35 and the FF 36 shown in FIG. 18. In FIG. 21, the AND circuit 483 takes an AND of the busy signal BUSY and the synchronization instruction signal SYNC, and produces an output signal of the AND circuit 483 is input to a NOT circuit 37. In FIG. 21, a synchronization instruction signal generator circuit $482_1$ is used in place of the synchronization instruction signal generator circuit $401_1$ shown in FIG. 18.

In FIG. 21, portions corresponding to those in FIG. 18 are attached with identical reference numbers. However, for the sake of convenience, processing units $480_1$ to $480_n$ are shown in FIG. 21 as processing units corresponding to the processing units $400_1$ to $400_n$ shown in FIG. 18. Similarly, an instruction issuing unit $481_1$ is shown in FIG. 21 as a unit corresponding to the instruction issuing unit $12_1$ shown in FIG. 18.

Figure 22:
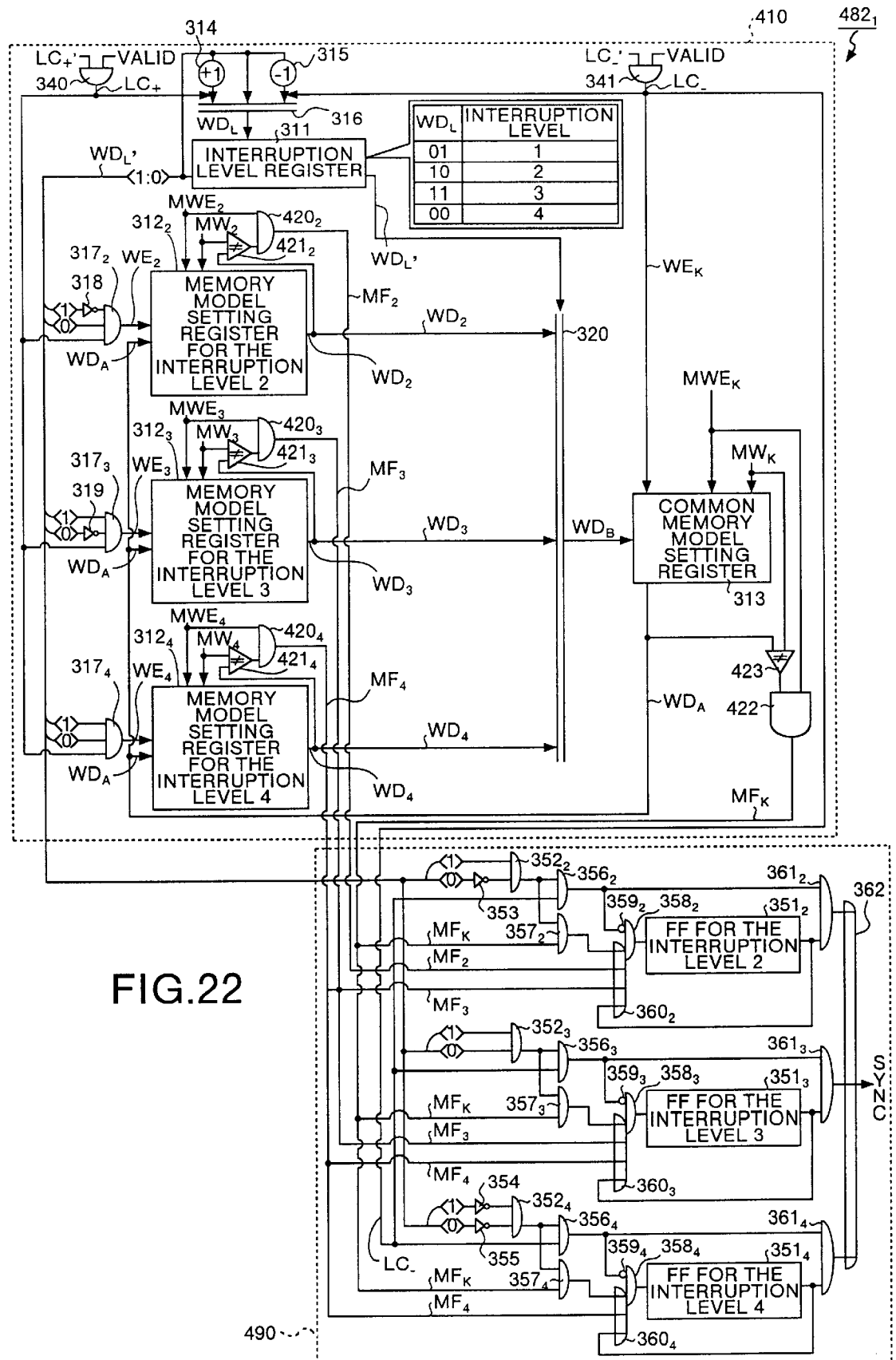
FIG. 22 is a diagram that shows a structure of a synchronization instruction signal generator circuit $482_1$ shown in FIG. 21.

The synchronization instruction signal generator circuit $482_1$ has a structure as shown in FIG. 22. In FIG. 22, portions corresponding to those in FIG. 19 are attached with identical reference numbers.

In the modification of the fourth embodiment, the output signal of the AND circuit 483 shown in FIG. 21 is used as an instruction restriction signal STOP. The basic operation of the modification of the fourth embodiment is the same as those described with reference to FIG. 12B and FIG. 12C and FIG. 13A and FIG. 13B.

In the fourth embodiment, there has been explained the case where the OR circuit 32 takes an OR of the processor busy signal $BUSY_1$ and the memory access unit busy signal $BUSY_2$, and the result of the OR is used as the busy signal BUSY as shown in FIG. 18. However, it is also possible to have the processor busy signal $BUSY_1$ not input to the OR circuit 32. In this case, the memory access unit busy signal $BUSY_2$ is the busy signal BUSY. This case will be explained below as a fifth embodiment.

In the fifth embodiment, an AND circuit (not shown) is provided between the NOT circuit 37 and the FF 36 shown in FIG. 18. A load/store instruction from the instruction buffer $11_1$ and an output signal of the FF 36 are input to this AND circuit. This load/store instruction is an instruction that is used by the memory access unit $14_1$. In the fifth embodiment, an output signal of the above AND circuit becomes an instruction restriction signal STOP.

Figure 23:
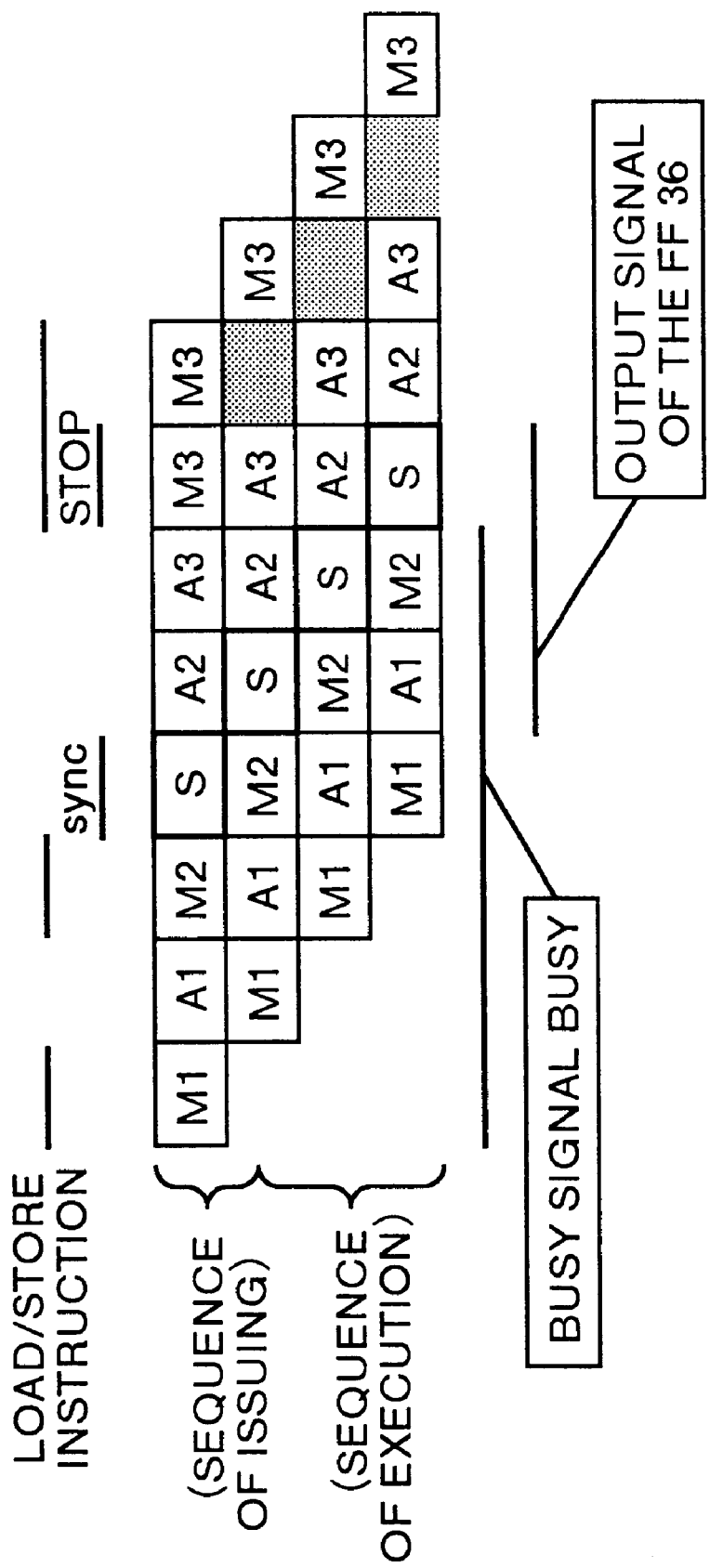
FIG. 23 is a diagram that explains the operation of a fifth embodiment relating to the present invention.
Figure 24:
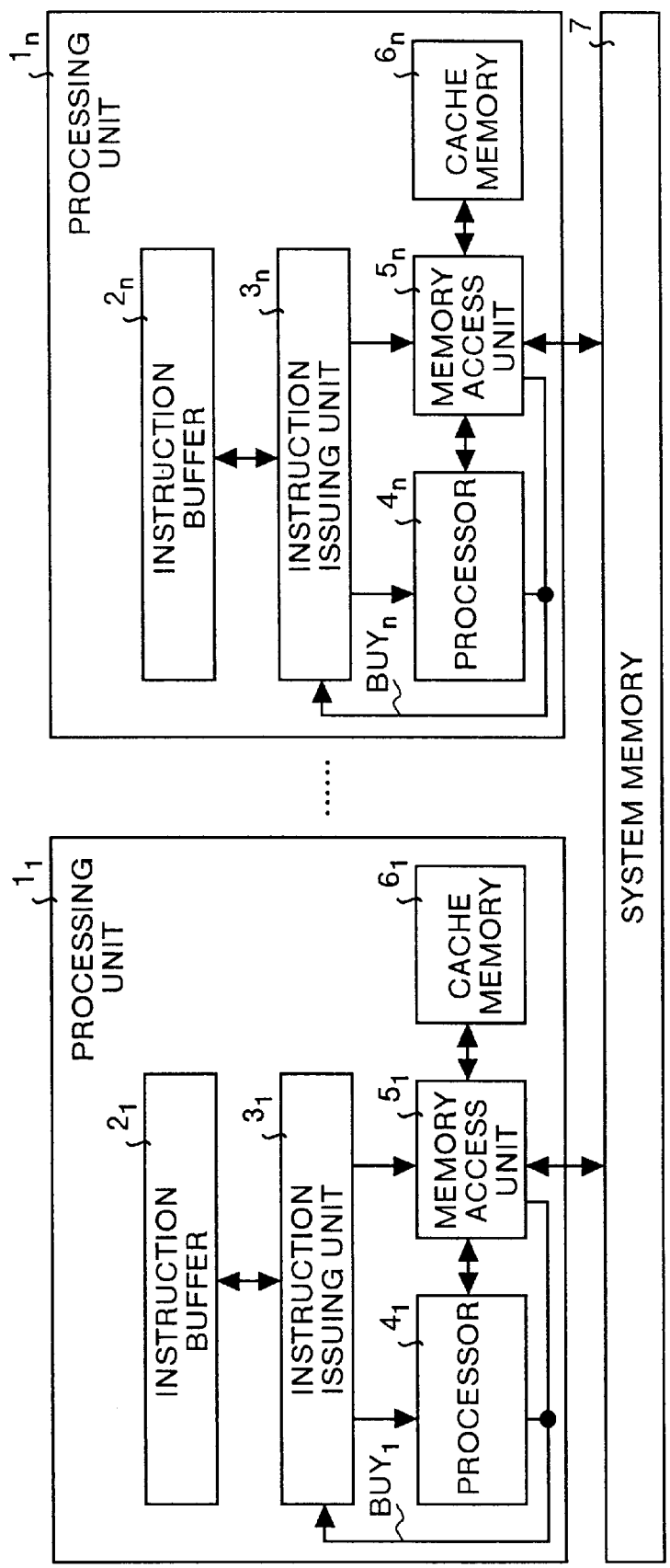
FIG. 24 is a block diagram that shows a structure of a conventional processing unit.

In the fifth embodiment, the output signal (the instruction restriction signal STOP) of the AND circuit (not shown) becomes "1" only when the instruction to be issued next is a load/store instruction Mx (x=1, 2, 3, - - -) when the busy signal BUSY (=the memory access unit busy signal $BUSY_2$) has been output and also when the synchronization instruction signal SYNC (refer to FIG. 18) has been output, as shown in FIG. 23. The synchronization control is executed in this case.

In this case, when an instruction other than the load/store instruction Mx (a processing instruction Ax (x=1, 2, 3, - - -) that is used by the processor $13_1$) is going to be issued from the instruction buffer $11_1$ after there has been a change in the interruption level, the output signal of the AND circuit (not shown) becomes "0". The synchronization control is not executed in this case. Therefore, the processing instruction is executed before the synchronization control. When the load/store instruction has been issued after the processing instruction has been issued, the synchronization control is carried out.

In other words, according to the fifth embodiment, the synchronization control is not carried out when the load/store instruction has not been output even if the instruction restriction signal STOP (the synchronization instruction signal SYNC) has been output. Therefore, the processing instruction issued after the change in the interruption level is executed by the processor $13_1$.

As explained above, according to the fifth embodiment, the synchronization control is carried out only when the load/store instruction has been issued when the interruption level has been changed. Therefore, when an instruction other than the load/store instruction (for example, the processing instruction) has been issued, this processing instruction is executed prior to the execution of the synchronization control. As a result, it is possible to improve the processing capacity.

As explained above, according to the present invention, it is monitored whether there has been a change in the memory access sequencing model from before a change in the interruption level to after the change in the interruption level. The synchronization control is carried out only when the memory access sequencing model has been changed. On the other hand, when the memory access sequencing model has not been changed, the synchronization control is not carried out. Therefore, as compared with the conventional processing unit which unconditionally carries out the synchronization control when the interruption level has been changed, the processing unit of the present invention can reduce the number of executing the synchronization control. Therefore, there is an effect that it is possible to improve the processing capacity.

Further, according to the present invention, a decision is made as to whether or not there has been a change in the memory model from before a change in the interruption level to after the change in the interruption level. The synchronization control is carried out only when the memory model has been changed. On the other hand, when the memory model has not been changed, the synchronization control is not carried out. Therefore, as compared with the conventional processing unit which unconditionally carries out the synchronization control when the interruption level has been changed, the processing unit of the present invention can reduce the number of executing the synchronization control. Therefore, there is an effect that it is possible to improve the processing capacity.

Further, according to the present invention, it is monitored whether there has been a change in the memory access sequencing model from before a change in the interruption level to after the change in the interruption level. The synchronization control is carried out only when the memory access, sequencing model has been changed so that the limit prescribed by the memory access sequencing model is mitigated. Therefore, as compared with the conventional processing unit which unconditionally carries out the synchronization control when the interruption level has been changed, the processing unit o the present invention can reduce the number of executing the synchronization control. Therefore, there is an effect that it is possible to substantially improve the processing capacity.

Further, according to the present invention, the synchronization control is carried out only when the data of the memory access sequencing model has been overwritten into the interruption level memory unit and the common memory unit. Therefore, as compared with the conventional processing unit which unconditionally carries out the synchronization control when the interruption level has been changed, the processing unit of the present invention can reduce the number of executing the synchronization control. Therefore, there is an effect that it is possible to improve the processing capacity.

Further, according to the present invention, the synchronization control is carried out only when the data of the memory access sequencing model has been overwritten into the interruption level memory unit and the common memory unit and also when the data has been updated. Therefore, as compared with the conventional processing unit which unconditionally carries out the synchronization control when the interruption level has been changed, the processing unit of the present invention can reduce the number of executing the synchronization control. Therefore, there is an effect that it is possible to substantially improve the processing capacity.

Further, according to the present invention, the synchronization control is carried out only when the interruption level has been changed and also when the memory access instructions have been issued. Therefore, when instructions other than memory access instructions (for example, processing instructions) have been issued, these instructions are executed prior to the synchronization control. As a result, there is an effect that it is possible to improve the processing capacity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A processing unit that executes memory access instructions at an interruption level out of a plurality of interruption levels and that carries out a memory access according to a memory access sequencing model prescribing a limitation to a sequence of issuing the memory access instructions and a sequence of executing the memory access instructions, the processing unit comprising:

an interruption level monitor that monitors a change in the interruption level;

a memory access sequencing model monitor that monitors a change in the memory access sequencing model; and a controller, when a result of monitoring by the interruption level monitor indicates that there has been a change in the interruption level and a result of monitoring by the memory access sequencing model monitor indicates that there has been the change in the memory access sequencing model following the change in the interruption level, restricting the issuing of memory access instructions corresponding to the changed interruption level until an execution of memory access instructions issued before the change in the interruption level has been finished.

2. The processing unit according to claim 1, wherein the memory access sequencing model monitor compares the memory access sequencing model before the change in the interruption level with the memory access sequencing model after the change in the interruption level, and when the two memory access sequencing models do not coincide with each other, a result of the monitoring by the memory access sequencing model monitor indicates that there has been the change.

3. The processing unit according to claim 1, wherein the controller, based on a result of monitoring by the interruption level monitor and the result of monitoring by the memory access sequencing model monitor, restricts an issuing of the memory access instructions corresponding to a changed interruption level until the execution of the memory access instructions issued before the change in the interruption level has been finished, only when the memory access sequencing model has been changed, so that a limitation prescribed by the memory access sequencing model is mitigated along with the change in the interruption level.

4. The processing unit according to claim 3, wherein the memory access sequencing model monitor obtains the result based on a result of a comparison between the limitations prescribed by the memory access sequencing model before and after the change in the interruption level.

5. A processing unit that executes memory access instructions at an interruption level out of a plurality of interruption levels, comprising:

a plurality of interruption level memories, each corresponding to one of the plurality of interruption levels and each storing data of a memory access sequencing model corresponding to the interruption level;

a common memory unit that stores one of the data of the memory access sequencing models;

a first controller,
when there is a change in the interruption level, writing the data of the memory access sequencing model stored in the common memory unit into the interruption level memory corresponding to a changed interruption level, and
when the interruption level returns to the interruption level before the change, writing back into the common memory unit the data of the memory access sequencing models written into the interruption level memories, an overwrite monitor that monitors an overwriting of data of the memory access sequencing models in the interruption level memories and the common memory; and a second controller,
when a result of a monitoring by the overwrite monitor indicates that there has been the overwriting of the data of the memory access sequencing models, restricting issuing of memory access instructions corresponding to a changed interruption level after a change until the execution of memory access instructions issued before the change in the interruption level has been finished.

6. The processing unit according to claim 5, wherein the second controller, when the data before and after the overwriting do not coincide with each other, determines, based on the result of the monitoring by the overwrite monitor, that there has been an update in the data, and restricts the issuing of memory access-instructions corresponding to the changed interruption level until the execution of memory access instructions issued before the change in the interruption level has been finished.

7. A processing unit that at least executes memory access instructions at an interruption level out of a plurality of interruption levels and that carries out a memory access according to a memory access sequencing model prescribing a limitation to a sequence of issuing the memory access instructions and a sequence of executing the memory access instructions, the processing unit comprising:

an interruption level monitor that monitors a change in the interruption level;

a memory access sequencing model monitor that monitors a change in the memory access sequencing model; and a controller,
when a result of monitoring by the interruption level monitor indicates that there has been the change in the interruption model and a result of monitoring by the memory access sequencing model monitor indicates that there has been the change in the memory access sequencing model following the change in the interruption level, executing prior to the execution of memory access instructions, instructions other than memory access instructions issued after the change in the memory access sequencing model, and restricting the issuing of memory access instructions corresponding to the changed interruption level, until execution of the memory access instructions issued before the change in the interruption level has been finished.

8. A processing unit, comprising:

a first monitoring unit, to determine if there is an interruption indicating a change from an old state to a new state;

a second monitoring unit, to determine if there is a change in a memory access sequence associated with the interruption; and a controller to delay memory instructions associated with the new state until memory instructions associated with the old state have been completed, if there has been a change in the memory access sequence.

* * * * *